(12) United States Patent
Baur et al.

(10) Patent No.: US 10,473,133 B2
(45) Date of Patent: Nov. 12, 2019

(54) CONNECTING DEVICE AND METHOD FOR CONNECTING TWO PARTS

(71) Applicants: Franz Baur, Oberstaufen (DE); Franz Haser, Oberstaufen (DE); Lamello AG, Bubendorf (CH)

(72) Inventors: Franz Baur, Oberstaufen (DE); Franz Haser, Oberstaufen (DE); Philipp Seiler, Arboldswil (CH); Patrick Jeker, Brislach (CH); Samuel Haenni, Rothrist (CH)

(73) Assignees: Franz Baur, Oberstaufen (DE); Franz Haser, Oberstaufen (DE); Lamello AG, Bubendorf (CH)

( * ) Notice: Subject to any disclaimer, the term of this patent is extended or adjusted under 35 U.S.C. 154(b) by 464 days.

(21) Appl. No.: 15/222,467

(22) Filed: Jul. 28, 2016

(65) Prior Publication Data

US 2016/0333912 A1    Nov. 17, 2016

Related U.S. Application Data

(63) Continuation of application No. PCT/EP2015/051521, filed on Jan. 26, 2015.

(30) Foreign Application Priority Data

Jan. 30, 2014   (DE) .................. 10 2014 101 158

(51) Int. Cl.
  *F16B 12/20*   (2006.01)
  *F16B 12/24*   (2006.01)
  *F16B 12/26*   (2006.01)

(52) U.S. Cl.
  CPC .............. *F16B 12/20* (2013.01); *F16B 12/24* (2013.01); *F16B 12/26* (2013.01); *F16B 12/2036* (2013.01)

(58) Field of Classification Search
  CPC ...... E05C 19/007; E05C 19/02; E05C 19/022; E05C 19/06; E05C 19/063; E05C 19/066;
  (Continued)

(56) References Cited

U.S. PATENT DOCUMENTS 4,639,161 A    1/1987   Mazaki
5,096,328 A    3/1992   Knapp
(Continued)

FOREIGN PATENT DOCUMENTS

CN    1065321    10/1992
CN    1138891    12/1996
(Continued)

OTHER PUBLICATIONS

Meister, 2010, *Lighting and Accessories Catalog*.

Primary Examiner — Daniel J Wiley
(74) Attorney, Agent, or Firm — Womble Bond Dickinson (US) LLP

(57) ABSTRACT

A connecting device is provided including one or more connecting elements arranged on at least one connectable part. At least one connecting element includes non-self-cutting retaining projections having a curved supporting surface in the form of an arc of a circle in longitudinal section. A groove is provided in one of the connectable parts, the groove having a curved undercut surface in the form of an arc of a circle in longitudinal section and including a base section and two undercut sections which extend away from the base section in a thickness direction. The retaining projections are engageable with the undercut sections of the groove. One or more connecting elements include or are in the form of one or more screw elements, and one or more connecting elements include one or more moveable retaining elements by means of which the parts can be drawn towards and/or pressed against each other.

14 Claims, 54 Drawing Sheets

(58) Field of Classification Search
CPC .......... F16B 12/10; F16B 12/20; F16B 12/24; F16B 12/26; F16B 12/32; F16B 12/36; F16B 12/38; Y10T 403/55; Y10T 403/559; Y10T 403/5773; Y10T 403/5793; Y10T 403/7005; Y10T 403/7009; Y10T 403/7015
See application file for complete search history.

(56) References Cited

U.S. PATENT DOCUMENTS

| | | | |
|---|---|---|---|
| 5,404,675 A | | 4/1995 | Schmidhauser |
| 5,529,248 A | | 6/1996 | Sawamura et al. |
| 5,529,428 A | * | 6/1996 | Bischof .................. F16B 12/14 403/408.1 |
| 6,499,907 B1 | | 12/2002 | Baur |
| 8,092,114 B2 | * | 1/2012 | Baur ..................... E05B 63/123 403/254 |
| 8,240,942 B2 | * | 8/2012 | Baur ........................ B23C 5/08 403/292 |
| 8,882,416 B2 | * | 11/2014 | Baur ........................ B23C 5/08 409/143 |
| 9,624,959 B2 | * | 4/2017 | Baur ....................... F16B 12/26 |
| 10,113,575 B2 | * | 10/2018 | Baur ....................... F16B 12/20 |
| 2010/0111598 A1 | * | 5/2010 | Baur ..................... E05B 63/123 403/348 |
| 2010/0111599 A1 | * | 5/2010 | Baur ........................ B23C 5/08 403/350 |
| 2011/0255915 A1 | | 10/2011 | Chen et al. |
| 2014/0321934 A1 | | 10/2014 | Baur et al. |
| 2016/0333913 A1 | * | 11/2016 | Baur ....................... F16B 12/26 |
| 2017/0114812 A1 | * | 4/2017 | Jeker ....................... F16B 12/20 |

FOREIGN PATENT DOCUMENTS

| | | |
|---|---|---|
| DE | 23 22 258 | 11/1973 |
| DE | 30 11 562 | 10/1981 |
| DE | 196 04 243 | 8/1997 |
| DE | 20 022 759 | 5/2002 |
| DE | 20 2005 003 657 | 8/2006 |
| DE | 10 2008 012 491 | 9/2009 |
| DE | 10 2008 012 493 | 9/2009 |
| DE | 10 2008 012 492 | 11/2009 |
| DE | 10 2008 016 102 | 11/2009 |
| EP | 0 180 965 | 5/1986 |
| EP | 2 198 745 | 6/2010 |
| EP | 2 525 106 | 11/2012 |
| GB | 2 039 339 | 8/1980 |
| WO | WO 2005/047713 | 5/2005 |
| WO | WO 2013/167116 | 11/2013 |

\* cited by examiner

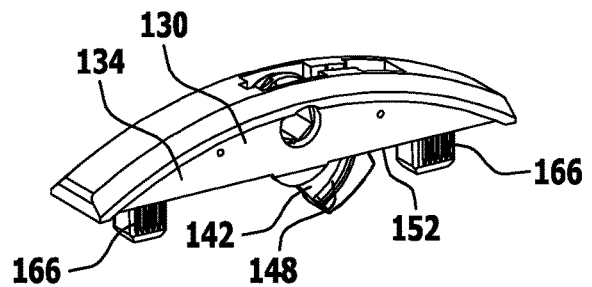
FIG.12
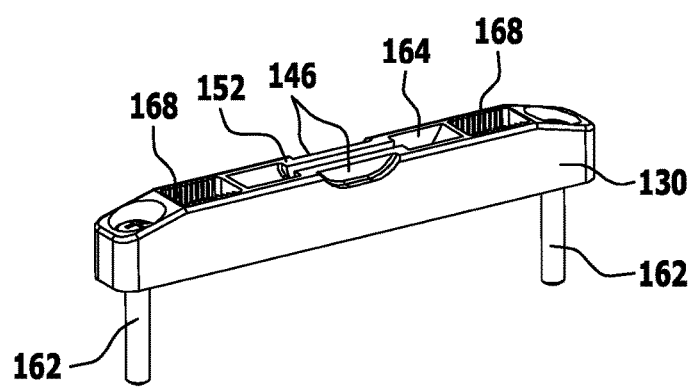
FIG.13
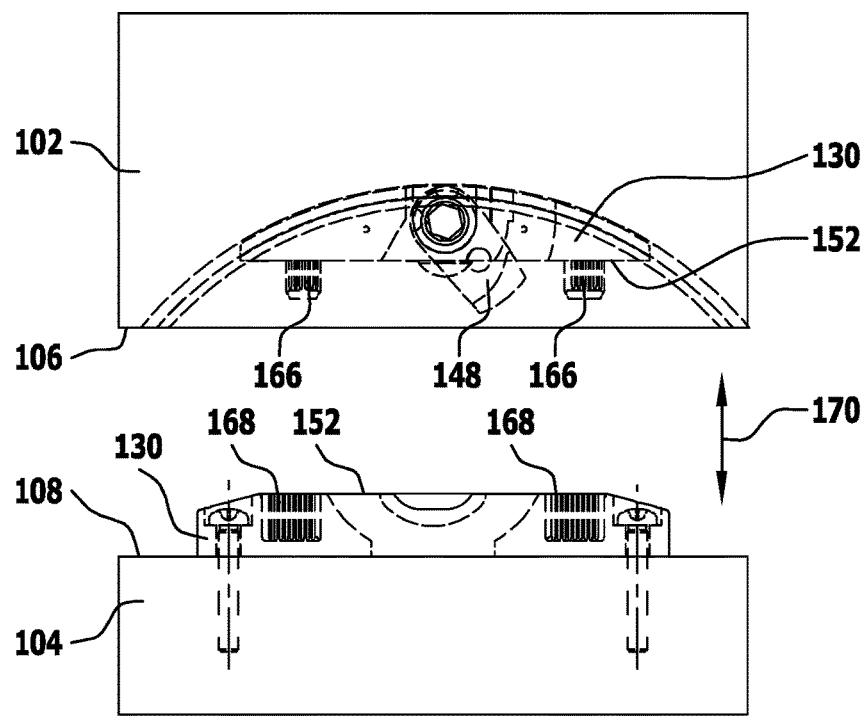
FIG.14
FIG.15

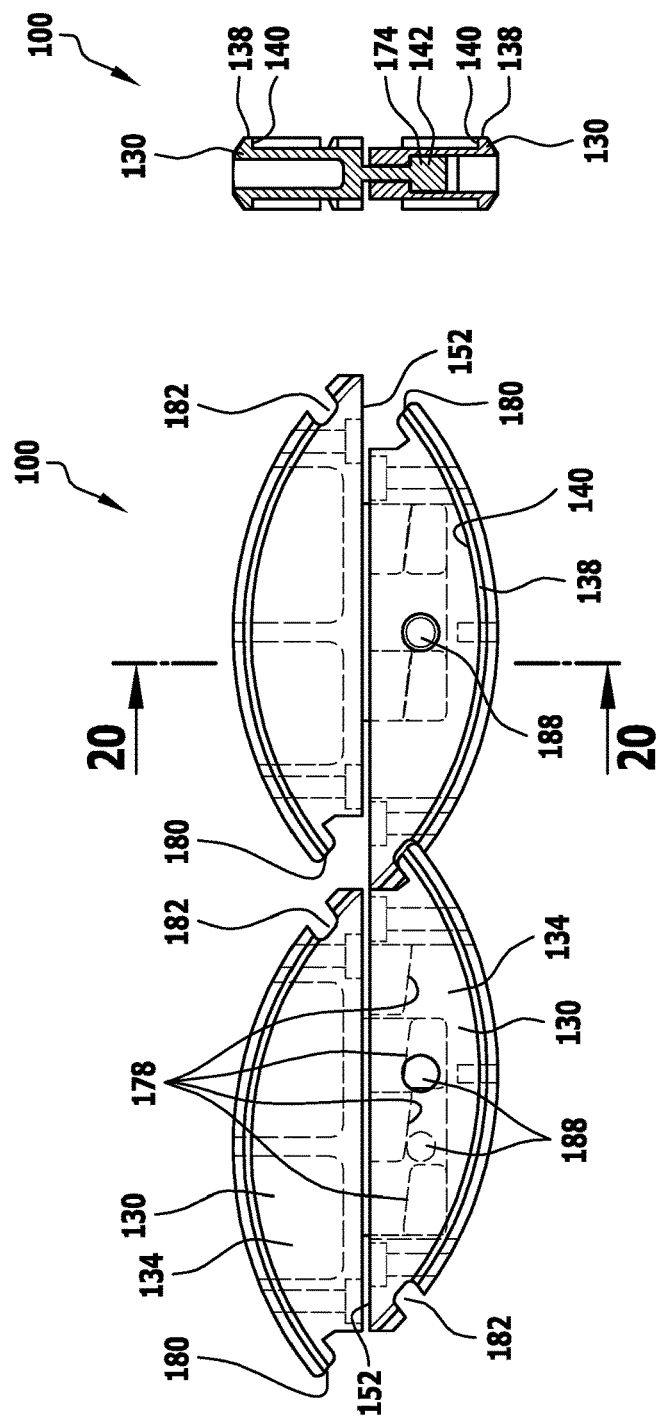

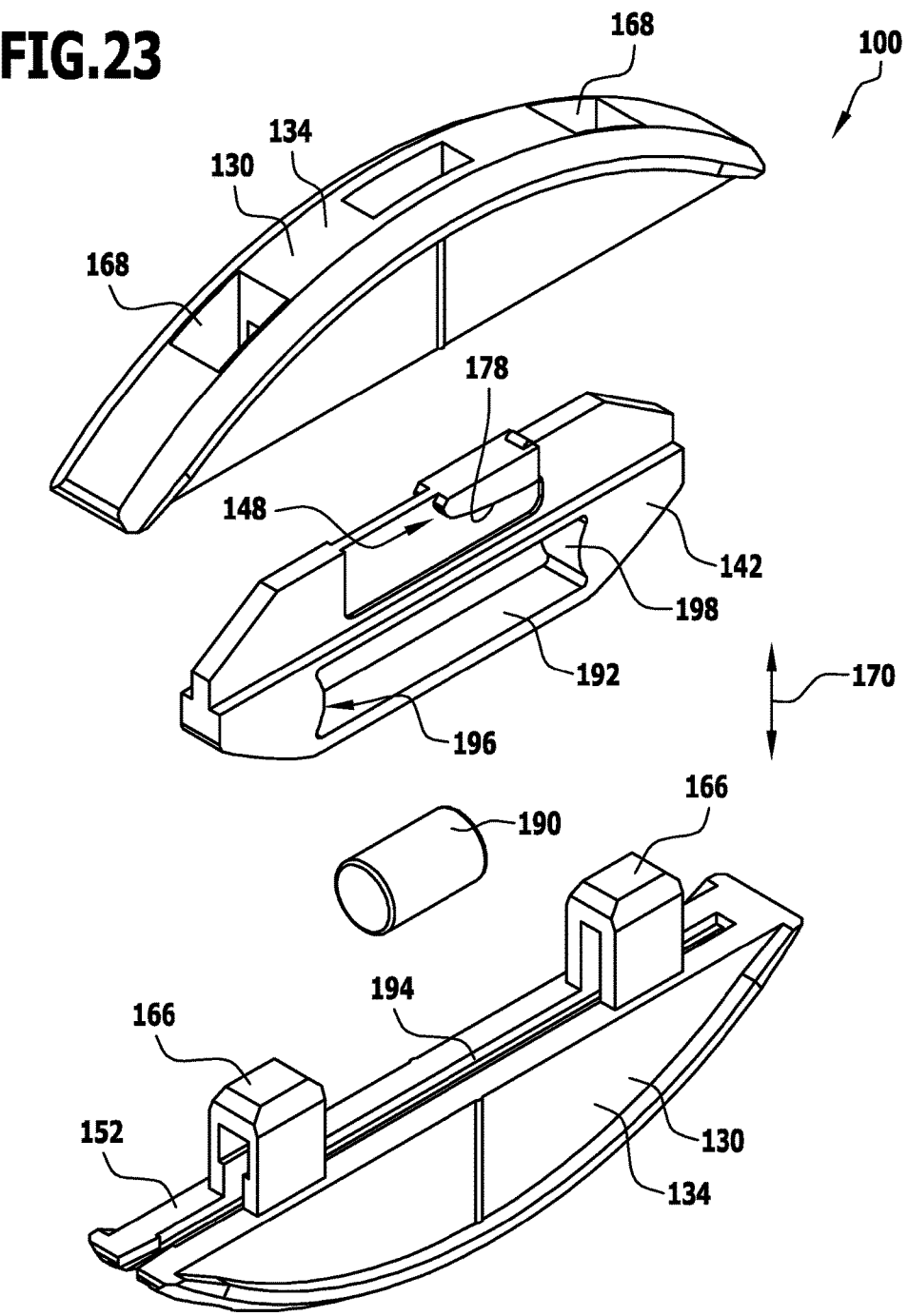

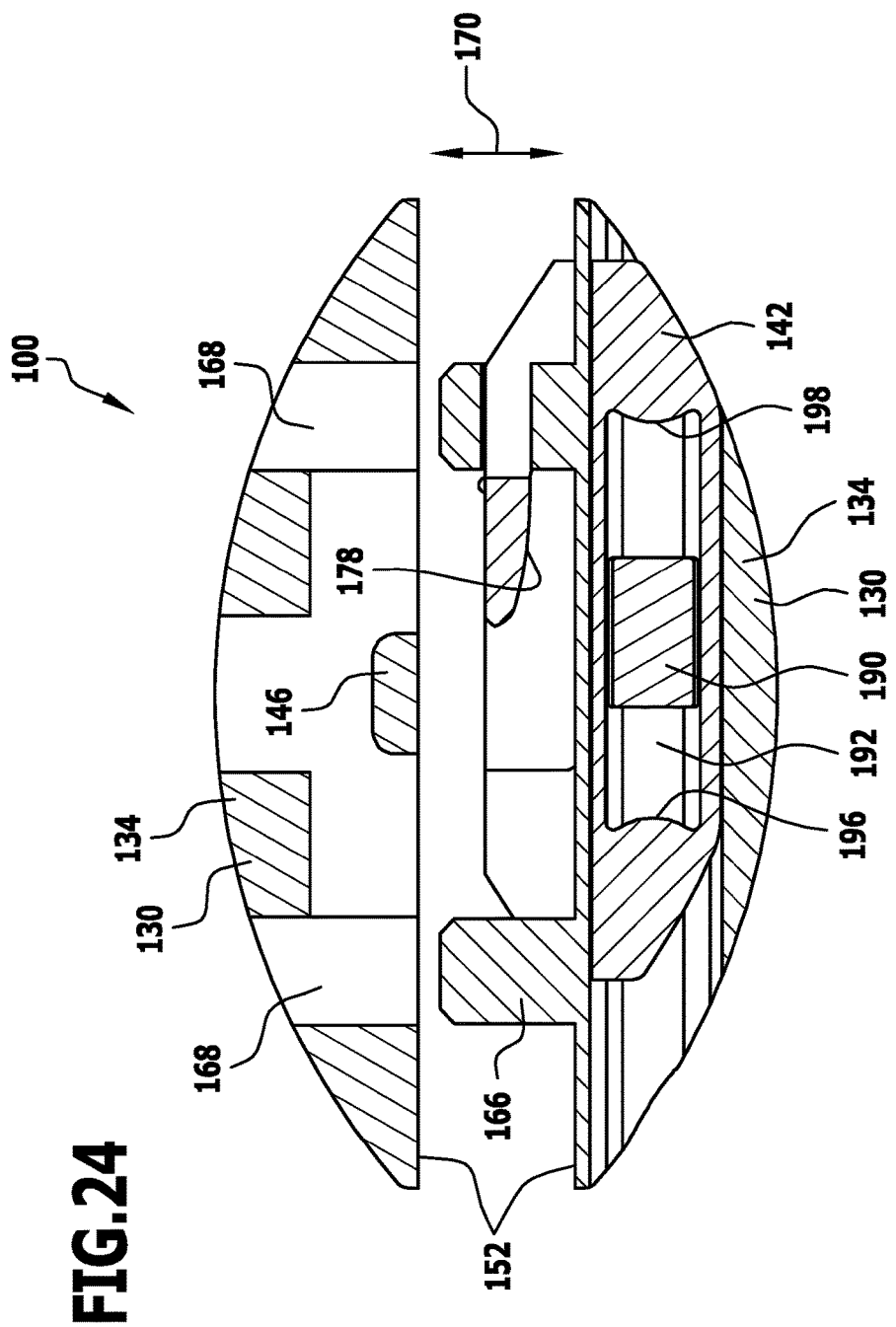

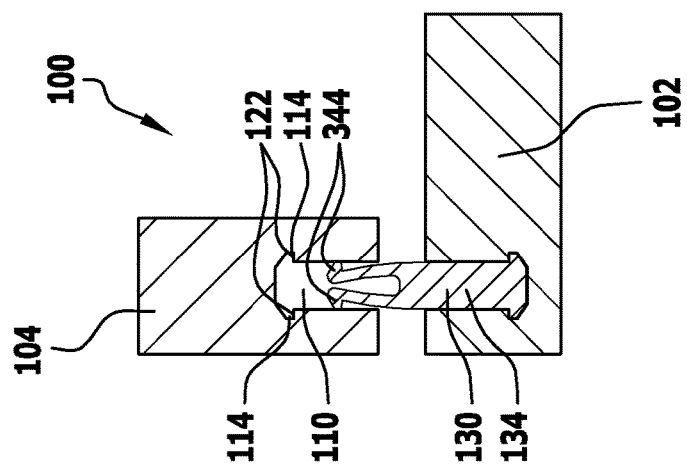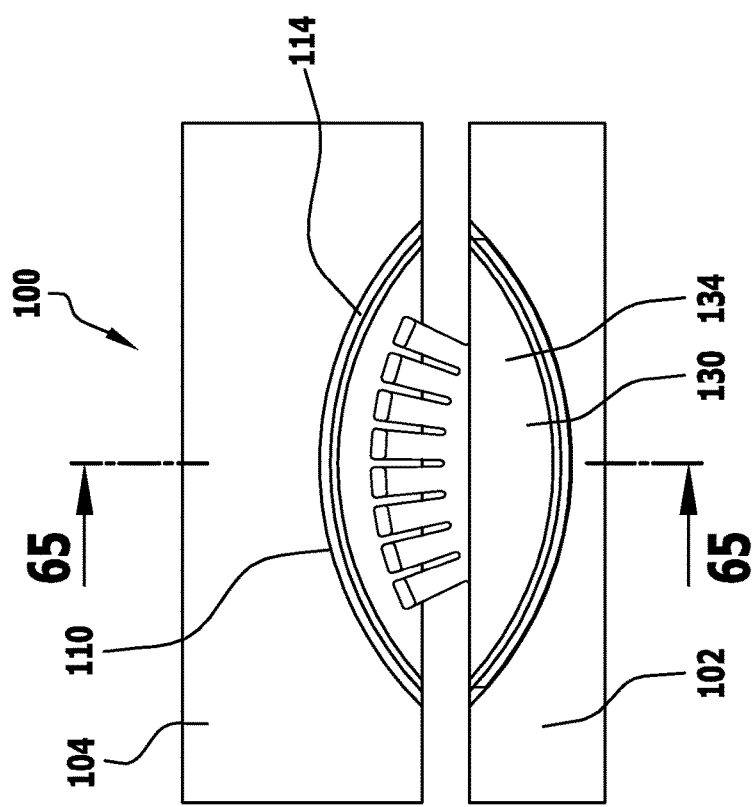

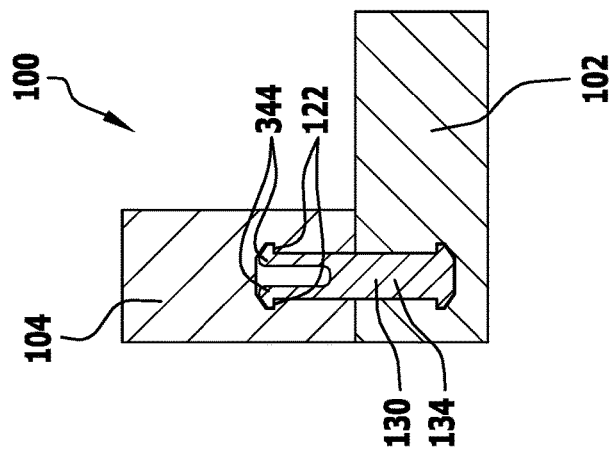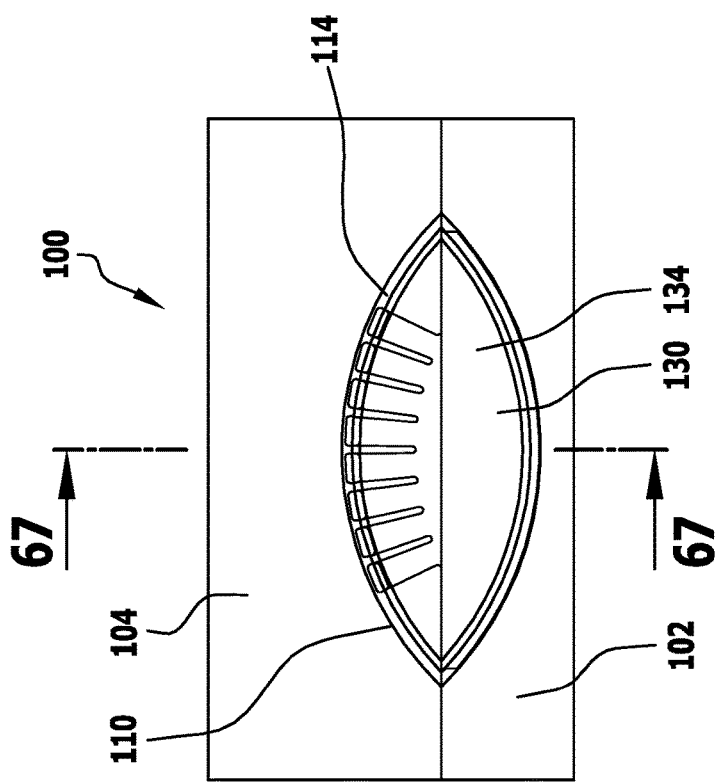

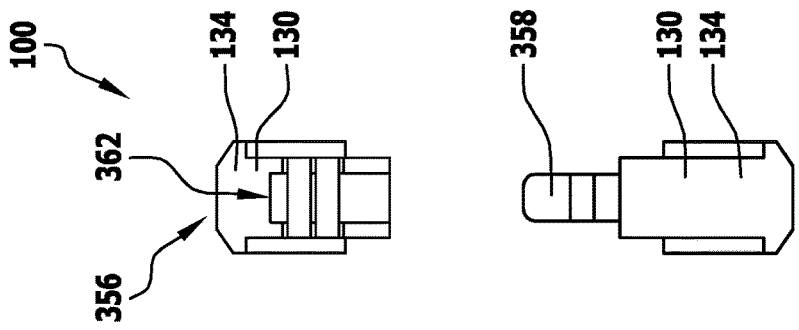
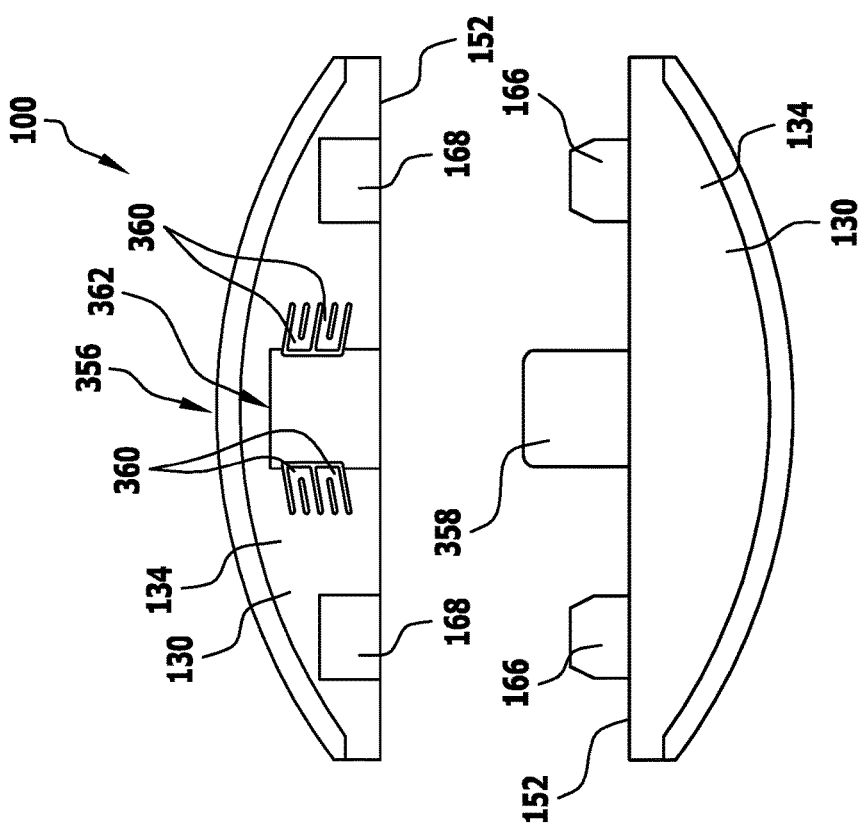

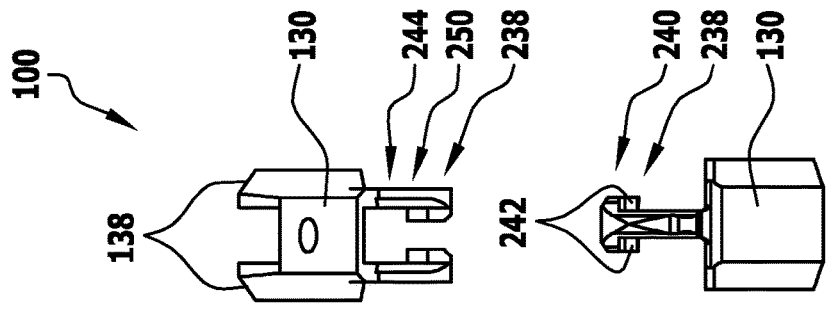
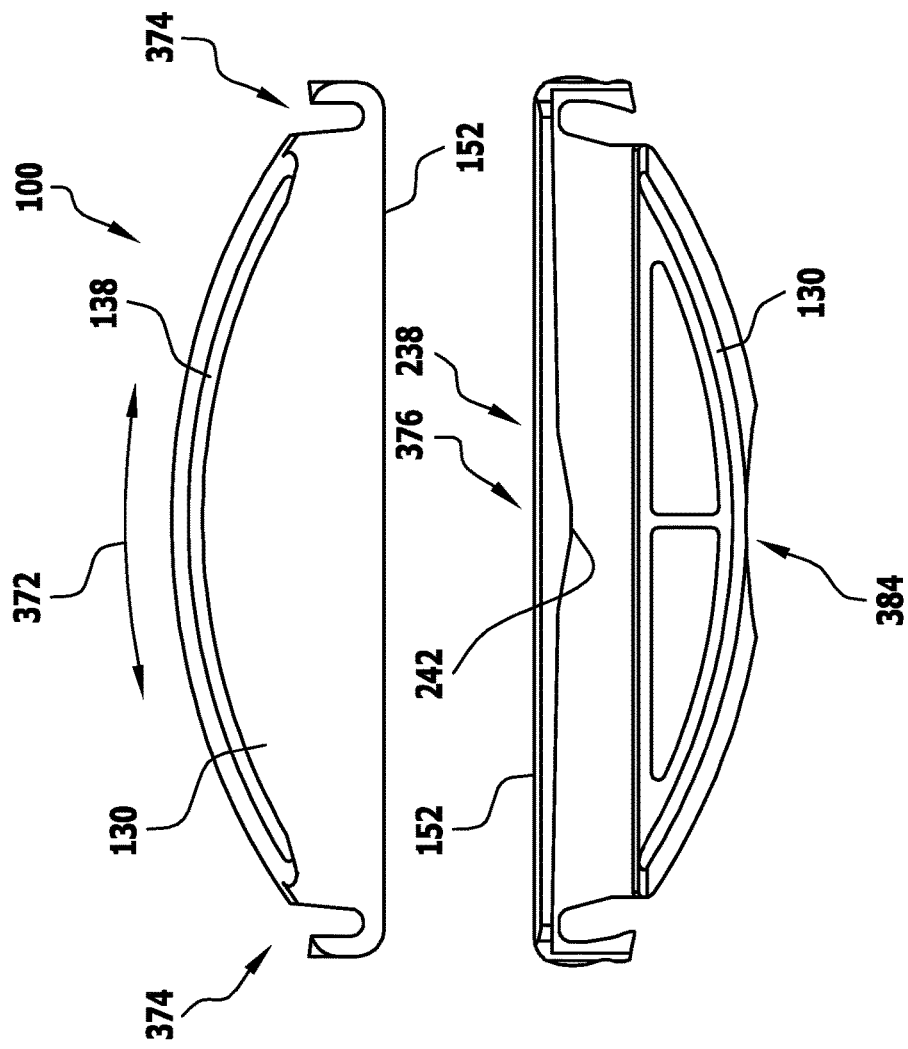

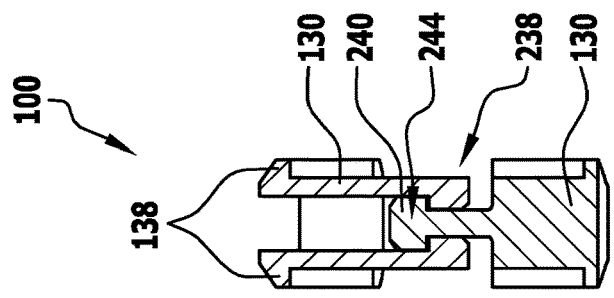
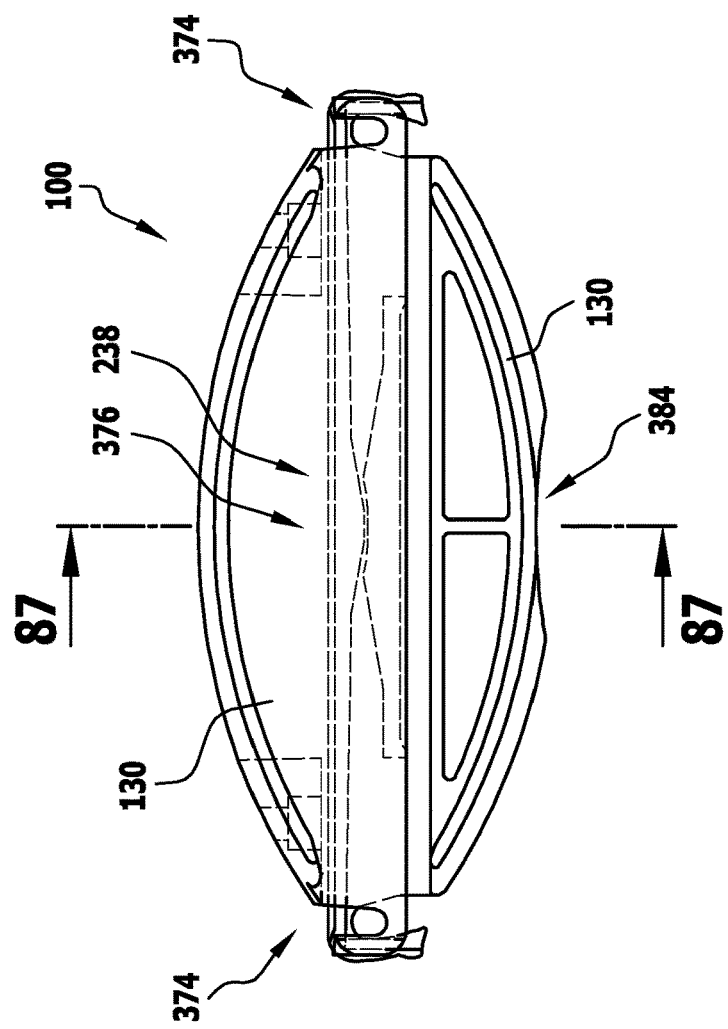

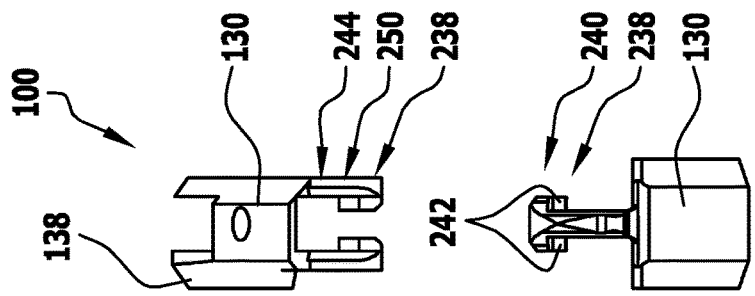
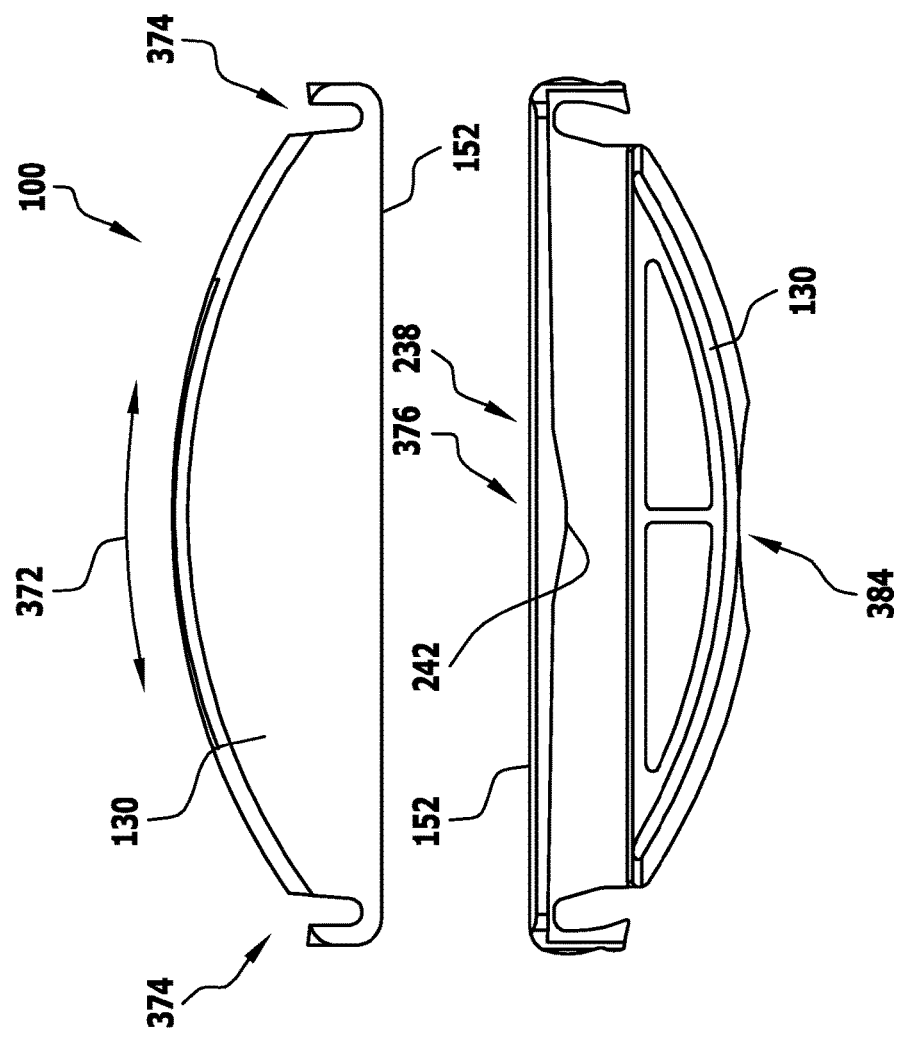

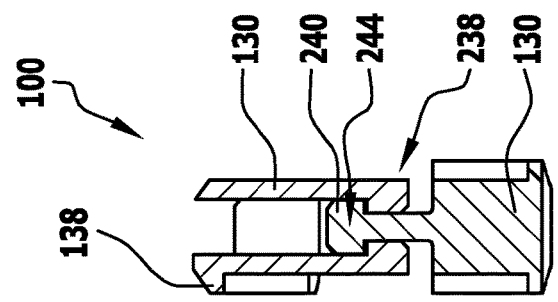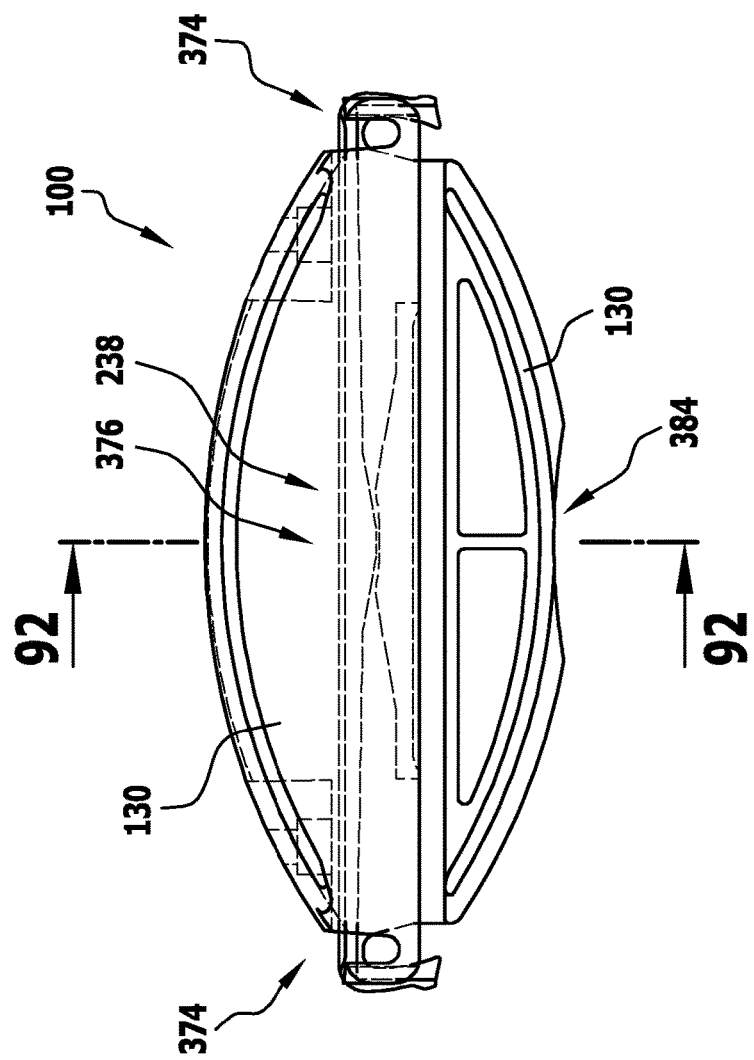

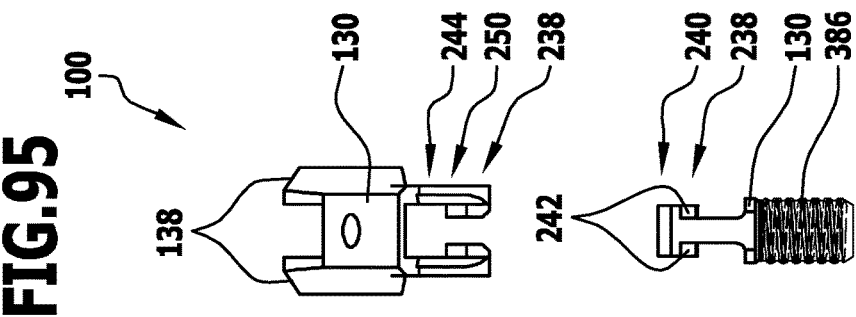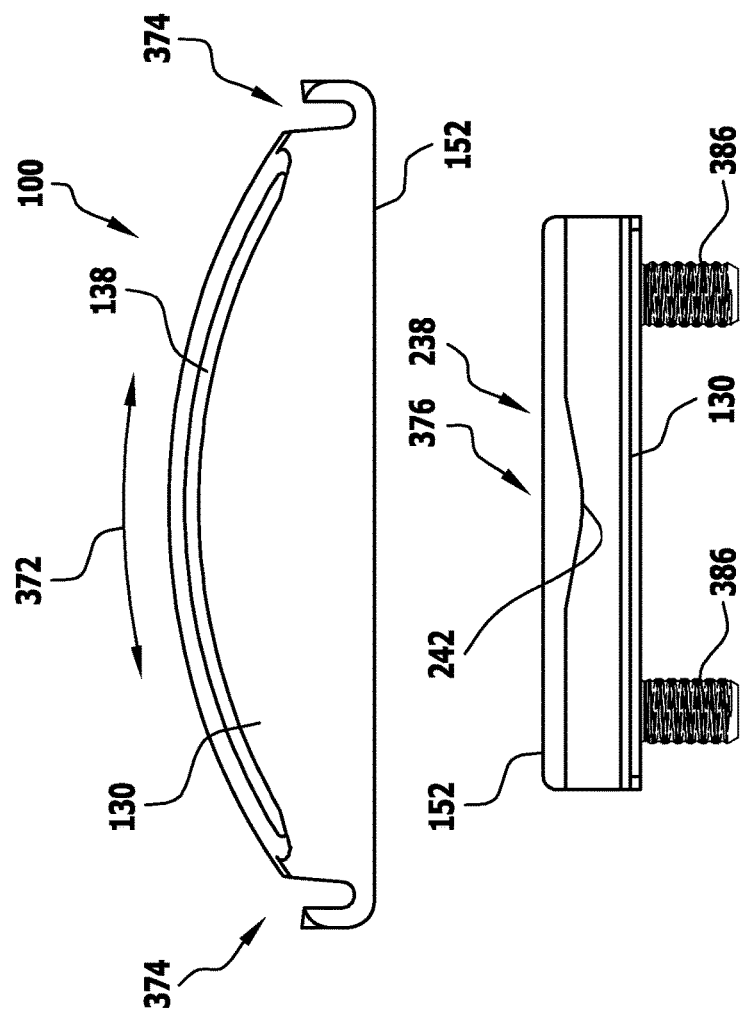

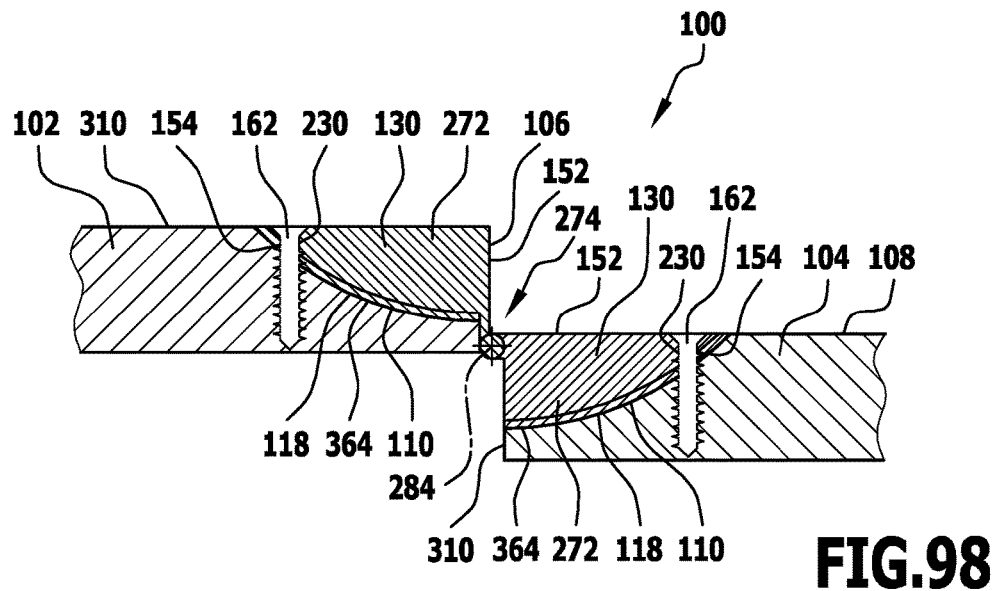
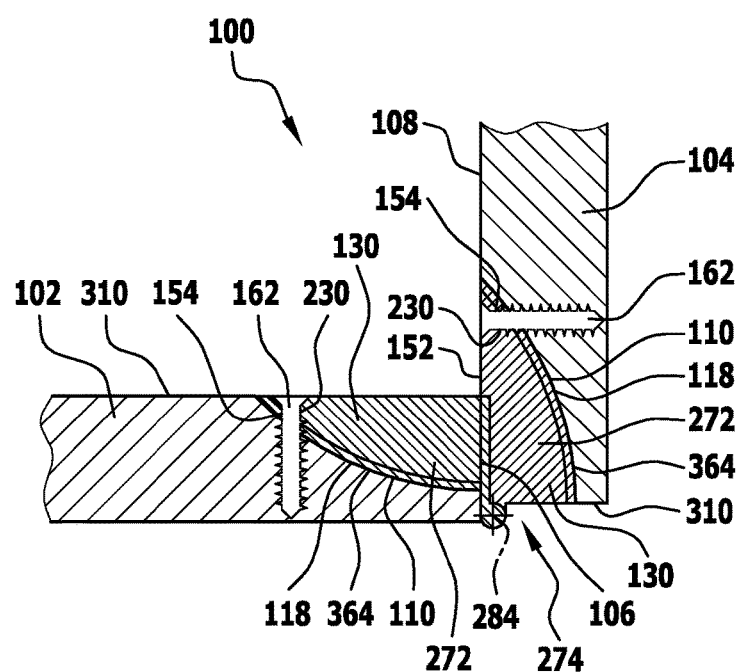

CONNECTING DEVICE AND METHOD FOR CONNECTING TWO PARTS

CROSS REFERENCE TO RELATED APPLICATIONS

This application is a continuation of international application No. PCT/EP2015/051521 filed on Jan. 26, 2015, and claims the benefit of German application No. 10 2014 101 158.9 filed on Jan. 30, 2014, which are incorporated herein by reference in their entirety and for all purposes.

FIELD OF DISCLOSURE

The present invention relates to a connecting device for connecting two parts, in particular for connecting furniture or machine parts.

BACKGROUND

Connecting devices of this type are known from EP 1 990 549 A1 for example.

SUMMARY OF THE INVENTION

The object of the present invention is to provide a connecting device by means of which two parts are connectable to one another in a simple and stable manner.

In accordance with the invention, this object is achieved by a connecting device for connecting two parts, in particular for connecting furniture or machine parts, and/or for anchoring an object to a part, wherein the connecting device comprises one or more connecting elements which are arranged on at least one of the parts in a connected state and/or anchored state, wherein at least one connecting element comprises one or more non-self-cutting retaining projections each of which has a curved supporting surface that is in the form of an arc of a circle in longitudinal section, wherein the one or the plurality of retaining projections are insertable into a groove having a curved undercut surface which is provided in one of the parts and is in the form of an arc of a circle in longitudinal section, wherein the groove comprises a base section and one or more undercut sections which extend away from the base section in a thickness direction and wherein the one or the plurality of retaining projections engage in the one or the plurality of undercut sections of the groove in the connected state and/or the anchored state.

In this description and the accompanying Claims, a connection of two parts is preferably to be understood as being any kind of fixed or moveable fixing of the parts relative to each other, including the stationary fixing of the parts relative to each other and including the connection of the parts to one another such as to enable a given relative movement of the parts relative to each other.

In this description and the accompanying Claims, an anchoring and/or an anchored state is preferably to be understood as the fixing of a connecting element to a part wherein the connecting element comprises an object and/or a seating for an object. The object is thus fixable and in particular anchorable to the part by means of the connecting element.

For the purposes of anchoring an object to a part, provision can thus be made for the connecting device to comprise just one single connecting element which, for example, is fixable to only one part in order to enable a separate object to be fixed and in particular anchored to the part.

The object can be an article of clothing for example. A seating for the object which is preferably arranged and/or formed on a connecting element is then in the form of a coat hook for example.

As an alternative or in addition thereto, provision may be made for an object to be a lighting fixture and in particular a lamp. In particular, such a lighting fixture can then be integrated into a connecting element or be arrangeable thereon.

Furthermore, provision may be made for an object to have additional functions, in particular, functions that are independent of a pure connecting function, and to be fixable to a part and in particular anchorable thereto by means of at least one connecting element.

In this description and the accompanying Claims, a connecting state or a connected state is preferably to be understood as a state of the connecting device in which one or more connecting elements are fixed to one or more parts and/or are connected to one another.

When using just one connecting element, a connected state is preferably the state in which the connecting element is fixed and in particular anchored to a part.

In the case of a connection of two parts to one another, a connected state is preferably the state in which the parts are firmly connected together by means of the connecting device or are arranged on one another in moveable manner such as to allow relative movement thereof.

In one embodiment of the invention, provision may be made for one or more connecting elements to comprise one or more screw elements or to be in the form of one or more screw elements.

For example, provision may be made for one or more screw elements to be screwable into one part or into both parts.

As an alternative or in addition thereto, provision may be made for one or more screw elements to be screwable into one or more connecting elements which are arranged in or on one or more of the parts.

Provision may be made for one or more screw elements and/or one or more connecting elements to comprise a stop such as a stop projection for example for the purposes of screwing-in the one or the plurality of screw elements to a given depth.

It may be expedient for one or more connecting elements to comprise one or more retaining elements which are arranged partially or entirely and/or temporarily or permanently within an outer contour of a main body or housing of the one or the plurality of connecting elements.

Furthermore, provision may be made for one or more connecting elements to comprise one or more retaining elements which are arranged partially or entirely and/or temporarily or permanently outside an outer contour of a main body or housing of the one or the plurality of connecting elements.

For example, provision may be made for one or more retaining elements to be arranged and/or mounted on a main body or a housing of one or more connecting elements.

It can be advantageous if the one or the plurality of retaining elements do not project beyond an outer contour of a main body or a housing of one or more connecting elements in any position, in particular, neither in a release position nor in a retaining position.

As an alternative or in addition thereto, provision may be made for one or more retaining elements to project beyond an outer contour of a main body or a housing of the one or the plurality of connecting elements in at least one position, in particular, in a release position and/or in a retaining position.

One or more connecting elements preferably comprise one or more moveable retaining elements, in particular, retaining elements that are moveable relative to a main body or a housing.

As an alternative or in addition thereto, provision may be made for one or more connecting elements to comprise one or more static retaining elements which are immovable in particular relative to a main body or a housing.

In one embodiment of the invention, provision may be made for one or more connecting elements to comprise one or more retaining elements which, in the connected state of the parts, project beyond a contact surface of a part that is arranged to face the further part and/or upon which the further part abuts.

It may be expedient for one or more connecting elements to comprise a securing device by means of which the connecting element or the connecting elements are securable from displacement and/or rotation thereof relative to a part.

For example, provision may be made for one or more connecting elements to comprise a securing device by means of which the connecting element or the connecting elements are securable from displacement thereof in and/or along a groove having a curved undercut surface which is in the form of an arc of a circle in longitudinal section.

It can be advantageous if the securing device comprises one or more securing elements that are placeable and/or are placed on a contact surface of a part which is arranged to face the further part and/or upon which the further part abuts for the purposes of securing one or more connecting elements from displacement and/or rotation thereof.

In particular provision may be made for the securing device to comprise one or more securing elements that are layable on a contact surface of a part which is arranged to face the further part and/or on which the further part abuts for the purposes of securing one or more connecting elements from displacement and/or rotation thereof.

Furthermore, provision may be made for the securing device to comprise one or more securing elements that are clampable between two contact surfaces of the parts which are respectively arranged to face the other part and/or on which the further part abuts for the purposes of securing one or more connecting elements from displacement and/or rotation thereof.

It can be advantageous if the securing device comprises one or more securing elements which are configured to be moveable, resilient, reversibly deformable and/or spring-like.

One or more connecting elements are fixable to at least one part by means of one or more securing elements in preferably releasable manner and in particular, such as to be releasable in tool-less manner.

One or more securing elements are in the form of one or more securing projections for example.

In one embodiment of the invention, provision may be made for the securing device to comprise at least two securing elements which are arranged at mutually opposite ends of a connecting element.

The securing elements are arranged, in particular, at mutually opposite end regions of the one or the plurality of retaining projections which each have a curved supporting surface that is in the form of an arc of a circle in longitudinal section.

It may be expedient for the securing elements to be arranged and/or formed at mutually opposite ends of a main body or housing of a connecting element.

It can be advantageous if the connecting element is insertable into a groove and if at least one securing element is arranged to be automatically actuated thereby and in particular is moveable thereby into a release position.

To this end, the at least one securing element is preferably arranged to be actuated in yielding and/or spring-like manner.

In one end position of the connecting element and in particular in a position in which it is pushed entirely into the groove, the connecting element is preferably latchable in the groove and/or to the part by means of the at least one securing element.

For example, provision may be made for at least one securing element to spring back in the end position of the connecting element so that it is thereby brought into a retaining position.

Preferably, the parts and in particular two or more connecting elements which are arranged on the parts are configured to be drawn towards one another and/or pressed against each other by means of one or more retaining elements.

The parts can preferably be drawn or pressed directly against each other by means of one or more connecting elements so that the parts directly adjoin one another and touch each other.

As an alternative thereto, provision may be made for the parts to be fixable relative to each other at a given spacing from one another by means of one or more connecting elements.

The one or the plurality of connecting elements then preferably serve as spacers.

In one embodiment of the invention, provision may be made for one or more connecting elements and in particular a main body or a housing of one or more connecting elements to comprise one or more through openings for accommodating fastening elements and/or securing elements such as screws for example.

A through opening can, for example, be a circular cylindrical cut-out.

For example, provision may be made for a through opening to be oriented substantially parallel or transversely and in particular substantially perpendicularly or inclined to a direction of connection along which the parts are connectable to one another by means of the connecting device.

In particular, a direction of connection is that direction along which the parts are arranged next to each other and/or adjoin one another.

In particular, provision may be made for the direction of connection to be oriented perpendicularly to contact surfaces of the parts and/or to a bearing surface of at least one connecting element of the connecting device.

It can be advantageous if one or more through openings comprise a recess for accommodating a screw head.

One or more retaining elements of one or more connecting elements are preferably accessible and/or operable through one or more openings (access openings) in one part or in both parts.

In particular, provision may be made for one or more retaining elements of one or more connecting elements to be actuatable, directly or indirectly, automatically, mechanically and/or manually.

Provision may be made for one or more openings to be one or more lateral openings in a wall which runs in particular perpendicularly to the bearing surface and/or the contact surface.

In this description and the accompanying Claims, actuation of a retaining element it is to be understood in particular as meaning that the retaining element is moved from a release position into a retaining position and/or from a retaining position into a release position.

In a further embodiment of the invention, provision may be made for one or more retaining elements of one or more connecting elements to be accessible and/or actuatable through one or more solid walls of one part or of both parts by means of a magnet device.

In a preferred embodiment of the invention, provision is made for a first connecting element and a second connecting element to be connected to one another in releasable manner in the connected state of the parts and for at least the first connecting element to comprise at least one retaining element which is moveable or fixed relative to a main body or a housing of the first connecting element and which, in a retaining position, cooperates with the second connecting element in such a way as to prevent a relative movement of the first connecting element and the second connecting element along a direction of connection, and which, in a release position, permits a relative movement of the first connecting element and the second connecting element along the direction of connection, wherein preferably at least one retaining element is movable from the retaining position into the release position and/or from the release position into the retaining position by means of an effect from outside the connecting device.

It can be advantageous if the connection of the two parts and in particular the connection of two or more connecting elements is established by a relative displacement of the two parts as a whole, in particular, of the two or more connecting elements as a whole.

For example, provision may be made for the parts and in particular the two or more connecting elements to be firstly moved towards one another in order, in particular, to introduce suspension elements of the connecting device into suspension element seatings of the connecting device. In particular, this movement is substantially parallel to the direction of connection.

Furthermore, provision may be made for the parts and in particular the connecting elements to be displaced substantially parallel to contact surfaces of the parts and/or bearing surfaces of the connecting elements and/or substantially perpendicularly to the direction of connection.

Preferably hereby, the connecting elements and/or the parts can be drawn towards one another and fixed to one another by suitable inclined surfaces on the suspension elements and/or the suspension element seatings.

For example, the suspension elements and the suspension element seatings can be connected to one another in a preferably positively-locking manner by means of a securing element and in particular a securing pin in order to prevent unwanted release of the connecting device.

Furthermore, provision may be made for the connection of the two connecting elements not to be established by a relative displacement of the two connecting elements as a whole, but instead, to be effected by means of a relative movement of the retaining element relative to a main body or a housing of one of the connecting elements from the release position into the retaining position.

It may be expedient for the connection between the connecting elements to be released by a movement of the retaining element relative to the main body or the housing of the connecting element from the retaining position into the release position.

It can be advantageous if at least one connecting element is positionable or positioned on a contact surface of one part and in particular for it to be screwed to a contact surface of one part for the purposes of connecting the parts to one another.

One or more connecting elements preferably comprise one or more plug-in projections and/or one or more seating pockets for one or more plug-in projections.

In particular, a connecting element which is positioned on or is positionable on a contact surface preferably comprises one or more plug-in projections and/or one or more seating pockets for plug-in projections.

For example, a plug-in projection is a substantially parallelepipedal dowel pin which extends from a bearing surface along the direction of connection and preferably tapers towards the end thereof remote from the bearing surface. The process of insertion into a respective seating pocket of the second connecting element and/or the further part can preferably be facilitated thereby.

The one or the plurality of seating pockets are preferably substantially complementary to the one or the plurality of plug-in projections.

In one embodiment of the invention, provision may be made for the connecting device to comprise two or more connecting elements for arrangement on and/or in a first part and/or two or more connecting elements for arrangement on and/or in a second part, wherein, for the purposes of connecting the parts to one another, at least one connecting element on and/or in the first part is moveable into engagement with the second part, in particular, with at least one connecting element on and/or in the second part. The connecting device preferably comprises two or more connecting elements which are arrangeable on or in one of the parts and are moveable into engagement with one another.

Movement of at least one of the connecting elements in or along a groove is preferably blockable by means of the connecting elements which are arrangeable on or in one of the parts.

The two or more connecting elements together preferably form a securing device for at least one connecting element.

It may be expedient for the two or more connecting elements which are arrangeable on or in one of the parts to be two mutually interacting connecting elements in one of the parts which are moveable into engagement with at least one further connecting element on or in the further part for the purposes of connecting the parts to one another.

The connecting elements which are arrangeable on or in one of the parts are preferably connecting elements which abut one another and/or block each other.

For example, provision may be made for each of the connecting elements to comprise one or more projections and/or one or more recesses. At least one projection and at least one recess are preferably moveable into engagement with one another, in particular in order to bring the connecting elements which are arrangeable in or on one of the parts into engagement with one another particularly in order to block a movement along a groove.

Provision may be made for the connecting device to comprise two or more connecting elements which are arrangeable in mutually overlapping grooves in one of the parts.

In particular, provision may be made for the connecting device to comprise two or more connecting elements which are arrangeable in two or more mutually overlapping grooves having a curved undercut surface which is in the form of an arc of a circle in longitudinal section.

The two grooves preferably form a substantially W-shaped undercut surface.

The at least two grooves are preferably substantially identically shaped grooves which overlap one another and/or adjoin each other.

In particular, provision may be made for the circular arcs of the two grooves to intersect within the part.

Provision may be made for a double groove to be formed in a part by means of two grooves.

In particular, two connecting elements can preferably be inserted as double connection elements into this double groove.

In one embodiment of the invention, provision may be made for the connecting device to comprise two or more substantially identically shaped connecting elements for arrangement in one of the parts or for arrangement in both parts and for the connection of the parts to one another.

For example, provision may be made for the connecting device to comprise two or more connecting elements each of which incorporates at least one suspension element.

As an alternative or in addition thereto, provision may be made for the connecting device to comprise two or more connecting elements each of which incorporates at least one suspension element seating.

In addition, provision may be made for the connecting device to comprise two or more substantially identically shaped connecting elements each of which comprises one or more suspension elements and/or one or more suspension element seatings.

A connecting element for arrangement on or in a first part and a connecting element for arrangement on or in a second part are preferably provided with through openings in such a manner that they overlap in a connected state of the parts, particularly in a retaining position of the connecting elements, and in particular such that they are in alignment with one another.

It may be expedient for the through openings to be accessible in the connected state of the parts.

Preferably, a securing element and in particular a securing pin, can be inserted into the through openings in order to fix the connecting elements in the retaining position and thus fix the parts in the connected state.

In the connected state of the parts, the through openings are preferably accessible through a side wall which extends transversely, and in particular at least approximately perpendicularly, to a contact surface of the parts.

To this end in particular, provision may be made for at least one part to comprise a lateral through opening (access opening) through which the through openings of the connecting elements are accessible.

The first connecting element and the second connecting element are preferably connected to one another in the connected state of the parts.

The first connecting element preferably comprises a retaining element.

The second connecting element and/or the second part preferably comprises a seating for the retaining element.

It may be expedient for the retaining element to have a first retaining contour which, in a retaining position, engages behind a second retaining contour that is provided on the second connecting element and/or on the second part.

The first connecting element preferably comprises a substantially flat bearing surface which is placeable on the second connecting element and/or which is arranged to face the second connecting element.

The second connecting element preferably comprises a substantially flat bearing surface which is placeable on the first connecting element and/or which is arranged to face the first connecting element.

In the connected state of the parts, the substantially flat bearing surface of the first connecting element is preferably substantially parallel to contact surfaces of the parts at which the parts abut each other or which are arranged to face the respective other part.

In the connected state of the parts, the substantially flat bearing surface of the second connecting element is preferably substantially parallel to contact surfaces of the parts at which the parts abut each other or which are arranged to face the respective other part.

At least one retaining projection preferably has a substantially rectangular or a substantially trapezoidal cross section.

It may be expedient for at least one retaining projection to taper with increasing distance from a main body of the respective connecting element.

It may be expedient for at least one retaining projection to adjoin a curved bearing surface of a main body of the respective connecting element in a substantially flush manner.

In one embodiment of the invention, provision may be made for the connecting device to comprise a magnet element which is drivable by means of a time varying magnetic drive field that is effective on the magnet element from outside the connecting device into a rotary movement and/or a linear movement within the connecting device.

At least one retaining element is preferably drivable by means of the magnet element into a rotary movement and/or a linear movement relative to a housing or a main body of a connecting element.

The magnet element is preferably arranged within the housing or the main body of the connecting element.

Provision may be made for the connecting device to comprise a plurality of magnet elements which are arranged, in particular, in a connecting element or in a plurality of connecting elements.

It may be expedient for the magnet element to be drivable periodically so that at least one retaining element of the connecting device is actuatable repeatedly by means of the magnet element, in particular, for movement in step-by-step manner into a release position and/or into a retaining position.

For example provision may be made for a retaining element in the form of a screw element to be drivable by means of the magnet element, in particular, for the actions of screwing-in and/or unscrewing.

In one embodiment of the invention, provision is made for the connecting device to comprise two connecting elements. A first connecting element preferably comprises a magnet element and a retaining element, in particular, a screw.

A second connecting element preferably comprises a seating for the retaining element, in particular a threaded element.

It may be expedient for a connecting element to comprise a seating for a retaining element of the connecting device, wherein the seating is preferably movable relative to a housing or a main body of the connecting element, in particular it is mounted in displaceable manner.

The seating is preferably arranged and/or mounted such as to be displaceable substantially parallel to the contact surfaces of the parts.

For example, provision may be made for a seating for a retaining element to be in the form of a nut insert or to comprise a nut insert.

One or more connecting elements are preferably arrangeable substantially entirely in a groove of a part so that the connecting element or the connecting elements does not or do not project beyond a contact surface of the part.

In the connected state of the parts, the first connecting element and the second connecting element are preferably connected to one another in force-locking manner, positively-locking manner and/or by a substance-to-substance bond, for example, they are glued together.

As an alternative or in addition to the features mentioned hereinabove, a connecting device for connecting two parts, in particular for connecting furniture or machine parts, can, for example, comprise at least one connecting element which comprises a retaining element for establishing a connection between the two parts and a storage device for storing a retaining energy of the retaining element.

Retaining energy is preferably suppliable to the storage device before establishing a connection between the two parts.

The supplied retaining energy is preferably storable by means of the storage device until the establishment of the connection.

It may be expedient for the storage device to be actuatable when establishing the connection between the two parts and/or for establishing the connection between the two parts so that the retaining element is moveable into a retaining position by utilizing the retaining energy.

In particular, provision may be made for the storage device to be operable by means of a further connecting element and/or the further part.

It can be advantageous if the storage device comprises an arresting device for holding a spring device in a biased position.

In this way in particular, a spring action of a retaining element in the form of a spring element is storable.

Furthermore, it can be advantageous if at least one spring element is configured to be preloaded by means of an arresting element, wherein the arresting element is preferably actuatable and in particular is movable away from and/or into a release position for the purposes of connecting the connecting elements.

It may be expedient for the storage device to comprise two counter-tensioned spring elements.

In a preferred embodiment of the invention, provision is made for retaining energy to be suppliable to the storage device before, whilst and/or after installing the connecting element into the part.

For example provision may be made for a spring device to be brought into a preloaded disposition and to be holdable in the preloaded disposition before installing the connecting element into the part, during the process of installing the connecting element into the part and/or after installing the connecting element into the part.

Provision may be made for the connecting device to comprise two or more connecting elements which form a tongue-and-groove device, in particular, a self-latching tongue-and-groove device which is actuatable by a pivotal movement.

It may be expedient for the connecting device to comprise two or more connecting elements which form a tongue-and-groove connection, wherein the connecting elements are moveable into engagement with one another by a rotary movement and/or a pushing movement, for example along the direction of connection.

The connecting device preferably comprises one or more connecting elements which are insertable through openings in one part from a side remote from the further part onto a further connecting element and which are connectable and in particular screwable thereto.

It can be advantageous if the connecting device forms a guidance device for guiding the parts relative to one another, wherein a connecting element comprises a guidance groove and/or wherein a connecting element comprises a guidance element.

Preferably the guidance element together with the appertaining part is movable and in particular linearly displaceable along the guidance groove relative to the further part.

The guidance groove is preferably substantially linear.

Provision may be made for the guidance groove to comprise a guidance section in which the guidance element inter-engages with the guidance groove.

In particular, provision may be made for the guidance groove to comprise an inter-engaging section with which the guidance element can engage.

In one embodiment of the invention, provision is made for the guidance groove to be substantially T-shaped.

For example, the guidance groove comprises a camming guide for the guidance of the guidance element along a predetermined guide path.

The guide path preferably exhibits varying spacings from a contact surface of the part and/or from a bearing surface of the connecting element along the guidance groove.

Provision may be made for the guide path to comprise two maximum regions having an at least local, and in particular a global, maximum spacing from a contact surface of the part and/or from a bearing surface of the connecting element.

Furthermore, provision may be made for the guide path to comprise a minimum region having a local or a global minimum spacing from a contact surface of the part and/or from a bearing surface of the connecting element.

It can be advantageous if the guide path comprises a minimum region which is arranged between the maximum regions and is at a locally minimum spacing from a contact surface of the part and/or from a bearing surface of the connecting element and which also has run-out regions that are arranged such as to adjoin the maximum region and to be remote from the minimum region with reducing spacing from a contact surface of the part and/or from a bearing surface of the connecting element.

The guidance element and/or the guidance groove preferably comprise one or more bearing elements, in particular, sliding elements and/or roller elements for the displaceable mounting of the parts upon one another.

For example, provision may be made for the guidance element to comprise two pairs of rollers which are displaceable and in particular are adapted to roll in the substantially T-shaped guidance groove.

In particular, a sliding door fitting is providable by means of such a connecting device.

It may be expedient for the connecting device to comprise at least one sliding element and/or at least one roller element which slides along one part and/or rolls on one part in the event of a movement of the parts relative to each other.

One connecting element is preferably in the form of a running surface of a part along which a movement element of a connecting element of the further part is movable.

In particular, provision may be made for at least one movement element of a connecting element of the further part to be rollable and/or displaceable and in particular displaceable in sliding manner on the running surface.

The running surface is preferably a contact surface of a part and/or a bearing surface of a connecting element.

It can be advantageous if the connecting device comprises a positioning device for positioning two parts and in particular two connecting elements relative to each other.

The positioning device preferably comprises at least one positioning element which is mounted in moveable, yielding, resilient, and/or spring-mounted manner.

At least one part and/or at least one connecting element preferably comprise at least one positioning element seating for accommodating the at least one positioning element.

It can be expedient if at least one positioning element extends into the at least one positioning element seating in a retaining position in which the parts are positioned relative to each other by means of the positioning device.

The at least one positioning element preferably projects beyond a bearing surface and/or a contact surface in the connected state, particularly in the retaining position.

It can be expedient for the at least one positioning element to taper with increasing spacing from the bearing surface and/or the contact surface.

For example provision may be made for the positioning element to be in the form of a sphere, a section of a sphere, a segment of a sphere and/or conical.

At least one positioning element seating is preferably substantially complementary to at least one positioning element to at least a partial extent.

For example, provision may be made for at least one positioning element seating to be spherical, in the form of a section of a sphere or a segment of a sphere and/or conical.

The parts are preferably displaceable relative to each other by means of and/or by the actuation of at least one positioning element of the positioning device.

In particular, provision may be made for the positioning elements to be mounted in spring-like manner and to be configured such as to be brought from a retaining position in which the positioning elements project beyond a bearing surface and/or a contact surface into a release position in which the positioning elements do not project beyond the bearing surface and/or contact surface. In particular, two directly adjacent parts can then be displaced substantially freely relative to each other.

As soon as the positioning elements and the positioning element seatings are arranged to be mutually opposite one another with respect to the contact surfaces and/or bearing surfaces, the positioning elements can preferably spring back and be brought into engagement with the positioning element seatings for the purposes of positioning the parts relative to each other.

In one embodiment of the invention, provision is made for the connecting device to comprise a hinge element which is fixed or fixable at one side to a first part and in particular to a connecting element which is fixed or fixable to the first part, and which is fixed or fixable at the other side to a second part and in particular to a connecting element which is fixed or fixable to the second part.

At least one connecting element preferably comprises a displaceable locking bar element which is displaceable in particular relative to a main body of the connecting element.

The locking bar element is preferably displaceable magnetically, in particular, by magnetic propulsion of a drive shaft that is coupled to the locking bar element.

The drive shaft is preferably coupled to the locking bar element by means of a rack-and-pinion device.

It can be expedient for the locking bar element to be insertable into an at least partly complementary shaped locking bar seating in the further part and/or the further connecting element, in particular, by magnetic displacement of the locking bar element.

The drive shaft preferably comprises or forms at least one magnet element and in particular is actuatable from outside the connecting device by means of a magnetic drive field.

The part, in which the connecting element having the displaceable locking bar element arranged thereon is arranged, preferably comprises a locking bar seating. The locking bar element is preferably arrangeable in this locking bar seating in a release position.

Preferably, the locking bar element is arrangeable in the locking bar seating of the one part in a release position on the one hand and in the locking bar seating of the further part in a retaining position (locking position) on the other hand.

The connecting device preferably comprises at least two connecting elements which are arranged or are arrangeable on mutually different parts and which each comprise at least one magnet element and/or at least one magnetizable element.

The parts are preferably connectable to one another by magnetic attraction between the at least two magnet elements or between the at least one magnet element and the at least one magnetizable element.

It can be advantageous if one connecting element or a plurality of connecting elements comprise one or more angle-driven screw devices.

Preferably, one movable or moving retaining element is in the form of a screw element which is actuatable by means of a drive screw that is actuatable through a lateral access point.

The angle-driven screw device preferably comprises a drive screw and a connecting screw. The connecting screw preferably serves for the direct connection between a connecting element and a further connecting element or a further part. The drive screw serves, in particular, for actuating the connecting screw.

It can be advantageous if the connecting device and in particular at least one connecting element of the connecting device, comprises a moveable retaining element which is movable into a release position by the application of force in a transverse direction running transversely and in particular perpendicularly to a direction of connection.

In particular, provision may be made for the moveable retaining element to be movable into a release position by displacement of the parts relative to each other in a predetermined direction.

The connecting device and in particular the retaining element and/or at least one connecting element preferably comprises at least one inclined surface by means of which the moveable retaining element is movable along the direction of connection by the application of force in a transverse direction running transversely and in particular perpendicularly to a direction of connection.

The retaining element is in the form of a latch hook for example.

It may be expedient for the retaining element to interengage with a latch recess in the further part and/or in a further connecting element.

In particular, in the connected state of the parts, provision may be made for the retaining element to be supported with respect to the direction of the force of gravity on the further part and/or on the connecting element arranged in the further part.

The connecting device preferably comprises a moveable retaining element which is supported on the further part and/or on the connecting element in the further part upon an application of force in a first transverse direction and which is movable into the release position by the application of force in a second transverse direction that is opposed to the first transverse direction.

The retaining element is preferably spring-loaded.

In particular, provision may be made for the retaining element to be moveable into a retaining position and in particular to be latched therein (latched position) automatically and/or by self-actuation.

At least one connecting element is preferably introducible into a groove having a curved undercut surface which is in the form of an arc of a circle in longitudinal section and which is provided in one of the parts. Hereby, the at least one connecting element preferably comprises an embracing section which embraces the part at a side face of the part that runs transversely and in particular substantially perpendicularly to a contact surface.

Furthermore, the at least one connecting element preferably comprises at least one projection which is moveable into engagement with a recess in a further part in order to fix this further part to the first part and/or to a base construction.

The at least one connecting element and at least one part, preferably both parts, are preferably fixable together to a base construction, in particular, screwable to the base construction.

The base construction is a sub-structure of a floor covering or a wall panel for example.

The connecting element preferably serves as a spacer between two parts and/or at least between one part and the base construction.

It can be advantageous if one or more connecting elements each comprise a plurality of spring elements and/or a plurality of latching elements of different lengths.

The spring elements and/or latching elements are preferably moveable into engagement with spring seatings and/or latch seatings of the further part and/or of a connecting element in the further part.

It can be expedient for a plurality of spring elements and/or latching elements to be moveable into engagement with the spring seatings and/or latch seatings by successively moving the parts relative to each other along the direction of connection. Firmer latching of the parts to one another is then preferably obtained as the displacement path increases (along the direction of connection).

It can be advantageous if the connecting device comprises two connecting elements each of which comprises one or more spring elements and/or latching elements and/or respectively one or more spring element seatings and/or latching element seatings.

In one embodiment of the invention, provision may be made for mutually adjacent spring elements and/or latching elements to comprise spring noses and/or latch noses which project away from the spring elements and/or latching elements in mutually different directions and in particular mutually opposite directions.

The connecting device preferably comprises at least one connecting element which comprises one or more rows of spring elements and/or latching elements.

For example, provision may be made for the spring elements and/or latching elements of the at least one row of spring elements and/or latching elements to comprise spring noses and/or latch noses which are arranged along a path in the form of an arc of a circle.

In particular, provision may be made for at least one connecting element to comprise two rows of spring elements and/or latching elements which are arranged next to each other and/or are spaced from each other with reference to a thickness direction of the connecting element. The spring noses and/or latch noses of the two rows of spring elements and/or latching elements are thereby preferably movable towards one another, in particular, in order to bring the connecting device into a retaining position.

Preferably, the spring elements and/or latching elements are formed and/or arranged in such a way that the spring noses and/or latch noses are introducible into one or more undercut sections of a groove in the form of an arc of a circle which comprises a base section and one or more undercut sections that extend away from the base section in a thickness direction, wherein the groove preferably has a curved undercut surface which is in the form of an arc of a circle in longitudinal section.

Preferably the grooves in the two parts for accommodating a connecting element on the one hand and for latching the spring elements and/or latching elements on the other are substantially identical.

It can be advantageous if the connecting device and in particular one or more connecting elements comprises a self-locking spring device and/or clamping device.

The self-locking spring device and/or clamping device preferably comprises one or more clamping elements which are oriented at an inclination to the direction of connection and/or which, commencing from a main body of the connecting element, are oriented away from a bearing surface of the connecting element.

The one clamping element or the plurality of clamping elements are preferably yielding, resilient and/or formed in spring-like manner and/or are arranged in yielding, resilient and/or spring-like manner on a main body and/or a housing of a connecting element.

Preferably, a plurality of clamping elements are arranged on both sides of a seating for a clamping projection of a further part or a connecting element.

When inserting a clamping projection of the further part or the connecting element, the one or the plurality of clamping elements are preferably forced away laterally and/or in the direction of insertion.

When withdrawing the clamping projection, the one or the plurality of clamping elements are preferably pressed laterally onto the clamping projection.

The one or the plurality of clamping elements preferably comprise at least one clamping section consisting of a material having a high coefficient of friction and in particular a high static friction.

Furthermore, provision may be made for the one or the plurality of clamping elements to be formed from a material having a high coefficient of friction and in particular a high static friction.

In a further embodiment of the invention, provision may be made for the connecting device to comprise a self-locking spring device and/or clamping device for fixing one or more connecting elements to and/or in one or more parts.

To this end, one or more clamping elements are preferably arranged and/or formed within and/or on an outer face of a main body or a housing of a connecting element.

Provision may be made for the connecting device to comprise at least one locking element and at least one actuating element for actuating the at least one locking element, wherein the at least one locking element and the at least one actuating element are preferably arranged on mutually differing parts and/or connecting elements.

Hereby, actuation is to be understood in particular as meaning the movement of the at least one locking element into a retaining position for the connection of the two parts and/or into a release position for the release and removal of the parts from each other.

The locking element can, for example, be a retaining element.

However, as an alternative or in addition thereto, provision could also be made for at least one locking element to be an element differing from a retaining element.

Preferably, at least one locking element is operable by rotation of the at least one actuating element.

It may be expedient for the at least one actuating element to be or to comprise an eccentric cam element.

Preferably, two or more locking elements are movable away from each other by means of an eccentric cam element, in particular, in order to bring them into engagement with a locking device seating.

It can be advantageous if the at least one actuating element is accessible from a side of the connecting element and in particular through a through opening (access opening) in a side wall of a main body or a housing of the connecting element. An outer surface of the side wall is preferably oriented transversely and in particular substantially perpendicularly to the contact surface and/or bearing surface.

Inter-engaging sections of the locking elements in a connecting element are preferably movable by means of the at least one actuating element, in particular in order to bring these inter-engaging sections into engagement with inter-engaging seatings corresponding thereto.

At least one connecting element preferably comprises one or more latching elements and/or clamping elements having a cross section that is substantially circular or in the form of a section of a circle taken parallel to the direction of connection.

The latching elements and/or clamping elements are preferably spherical or plate-like having a cross section which is circular or in the form of a section of a circle.

Provision may be made for the latching elements and/or clamping elements to be at mutually differing spacings from a bearing surface of the connecting element and/or from a contact surface of a part.

The latching elements and/or clamping elements are preferably receivable in at least partially complementary shaped seatings in the further part and/or in a further connecting element.

Preferably, the latching elements and/or clamping elements and/or the seatings are formed and/or arranged to be yielding, resilient, reversibly deformable and/or spring-like.

Provision may be made for the connecting device to comprise at least one connecting element which is introducible into a groove in a part having a curved supporting surface that is in the form of an arc of a circle in longitudinal section.

Provision may be made for the supporting surface to border at both sides on a contact surface of the part. The contact surface then preferably bounds the longitudinal section in the form of an arc of a circle at both sides.

The groove is preferably in the form of a segment of a circle, wherein one boundary of the segment of a circle is a bottom surface of the groove in the form of an arc of a circle and a further boundary of the segment of a circle is the contact surface.

Provision may also be made however for the groove to be in the form of a partial groove.

For example, the supporting surface borders on a contact surface of the part only on one side. A side of the supporting surface remote from the contact surface then preferably ends at a surface of the part that differs from the contact surface or it ends within the part.

In this description and the accompanying Claims, a side of a supporting surface is to be understood in particular as an end bounding the supporting surface along the longitudinal section in the form of an arc of a circle.

It may be expedient for a connecting device to comprise two connecting elements which are in the form of hinge elements and/or are provided with hinge elements. The connecting elements are arrangeable in partial grooves for example.

Preferably, two partial grooves are producible in two parts and in particular one partial groove in each part by placing the parts upon one another and then providing them with just one continuous groove which extends, in particular halfway, into both parts.

Furthermore, the present invention relates to a method for connecting two parts.

In this connection, the object of the invention is to provide a method by means of which two parts are connectable to one another in a simple and stable manner.

In accordance with the invention, this object is achieved by a method for connecting two parts, in particular furniture or machine parts, wherein the method comprises the following:

providing a connecting device and in particular a connecting device according to the invention;

introducing a connecting element into one of the parts;

connecting the connecting element to the further part and in particular to a further connecting element that is arranged on or in the further part.

The method in accordance with the invention preferably comprises particular ones or several of the features and/or advantages that have been described in connection with the connecting device in accordance with the invention.

For the purposes of producing advantageous embodiments of the invention, particular ones or several of the features described in this description and the accompanying Claims can be utilized or omitted at will in combination with further features or independently of further features.

Further preferred features and/or advantages of the present invention form the subject matter of the following description and the graphical illustration of exemplary embodiments.

BRIEF DESCRIPTION OF THE DRAWINGS

FIG. 12 a schematic perspective illustration of the connecting element of the connecting device depicted in FIG. 10 which is insertable into a groove;

FIG. 13 a schematic perspective illustration of the connecting element of the connecting device depicted in FIG. 10 which is positionable on a part;

FIG. 14 a schematic partially-transparent side view of the part depicted in FIG. 11 which is provided with a groove and with a connecting element that is arranged therein;

FIG. 15 a schematic partially-transparent illustration of the further part and of the further connecting element depicted in FIG. 11 which is positioned thereon;

FIG. 19 a schematic partially transparent side view of the connecting device depicted in FIG. 18;

FIG. 20 a schematic cross section through the connecting device depicted in FIG. 18 along the line 20-20 in FIG. 19;

FIG. 23 a schematic perspective exploded illustration of a fifth embodiment of a connecting device in which a retaining element that is drivable linearly by means of a magnet element is provided;

FIG. 24 a schematic vertical longitudinal section through the connecting device depicted in FIG. 23, in the separated state of thereof;

FIG. 64 a schematic cross section through the connecting device depicted in FIG. 63 and the two parts that are to be connected to one another when connecting the parts;

FIG. 65 a schematic cross section through the parts and the connecting device depicted in FIG. 64 along the line 65-65 in FIG. 64;

FIG. 66 an illustration of the connecting device and the parts corresponding to FIG. 64, wherein the parts are connected to one another by means of the connecting device;

FIG. 67 a schematic illustration of the parts and the connecting device corresponding to FIG. 65 in the connected state thereof;

FIG. 71 a schematic vertical longitudinal section through a twenty-fourth embodiment of a connecting device in which resilient clamping elements are provided for fixing a clamping projection;

FIG. 72 a schematic cross section through the connecting device depicted in FIG. 71;

FIG. 83 a schematic side view of the connecting device depicted in FIG. 82;

FIG. 84 a further schematic side view of the connecting device depicted in FIG. 82;

FIG. 86 a schematic partially transparent side view of the connecting device depicted in FIG. 82 in the connected state of the connecting elements;

FIG. 87 a schematic section through the connecting device depicted in FIG. 82 along the line 87-87 in FIG. 86;

FIG. 89 an illustration corresponding to FIG. 83 of the connecting device depicted in FIG. 88;

FIG. 90 an illustration corresponding to FIG. 84 of the connecting device depicted in FIG. 88;

FIG. 91 an illustration corresponding to FIG. 86 of the connecting device depicted in FIG. 88;

FIG. 92 a schematic cross section through the connecting device depicted in FIG. 88 along the line 92-92 in FIG. 91;

FIG. 94 an illustration corresponding to FIG. 83 of the connecting device depicted in FIG. 93;

FIG. 95 an illustration corresponding to FIG. 84 of the connecting device depicted in FIG. 93;

FIG. 98 a schematic vertical longitudinal section through a thirty-first embodiment of a connecting device which comprises a hinge device incorporating two connecting elements that are arrangeable in partial grooves, wherein the hinge device is arranged in an open position; and FIG. 99 a longitudinal section corresponding to FIG. 98 through the connecting device depicted in FIG. 98, wherein the hinge device is arranged in a closed position Similar or functionally equivalent elements are provided with the same reference symbols in all the Figures.

DETAILED DESCRIPTION OF THE DRAWINGS

Figure 1:
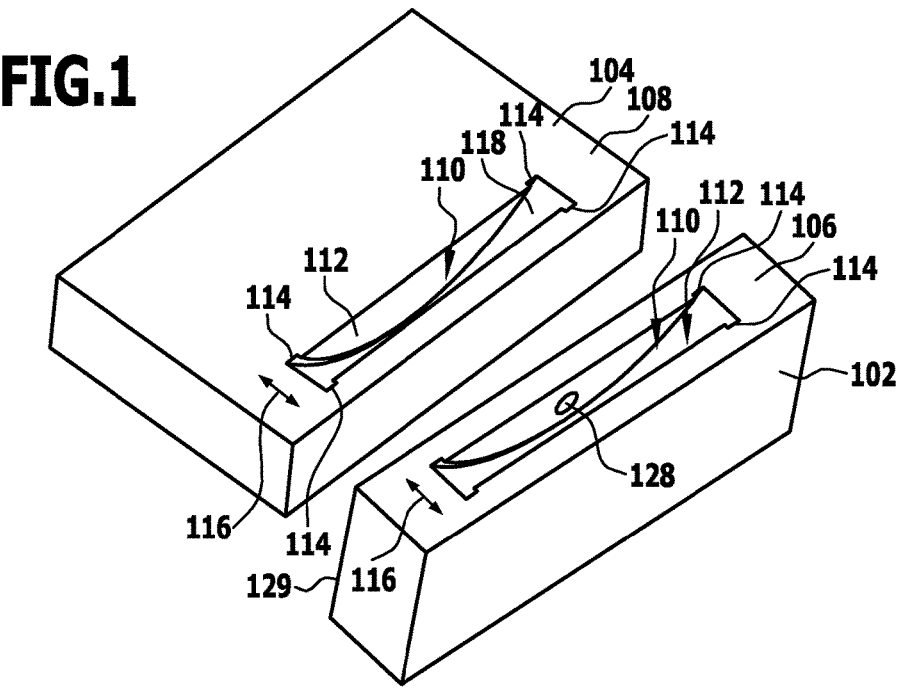
FIG. 1 shows a schematic perspective illustration of two parts which are connectable to one another by means of a connecting device and which, for this purpose, comprise two grooves having undercut sections.
Figure 2:
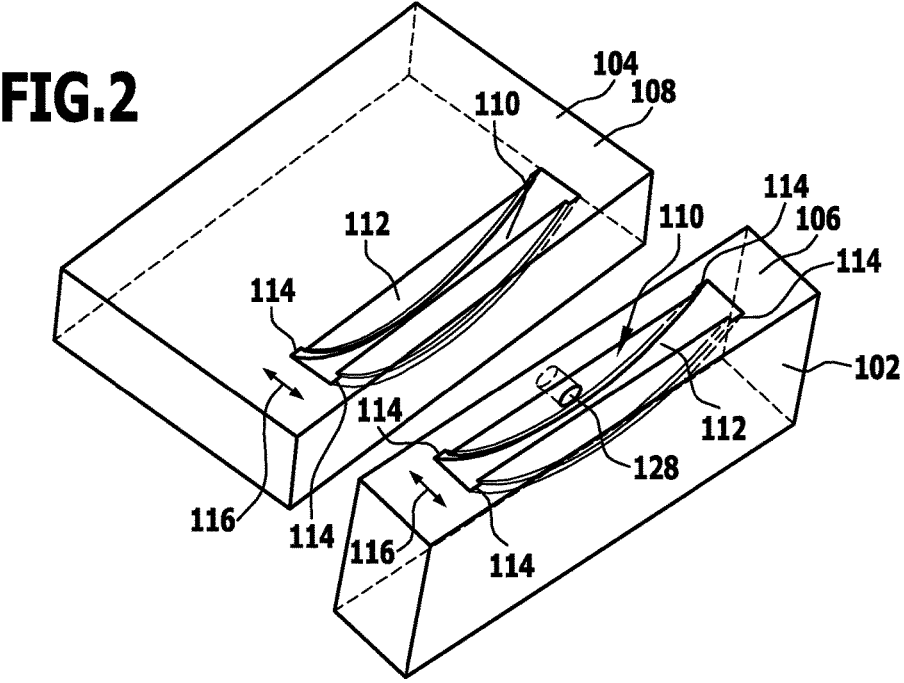
FIG. 2 a partially-transparent illustration of the parts depicted in FIG. 1.

A connecting device designated as a whole by 100 serves, for example, for connecting a first substantially plate-like part 102 to a second likewise substantially plate-like part 104 (see FIGS. 1 to 4).

The two parts 102 and 104 consist of wood or plywood for example, but could consist of any other materials such as a metallic material or a plastic material (e.g. Plexiglas) for example. Furthermore, provision may be made for the first part 102 and the second part 104 to consist of mutually different materials.

In the connected state of the two parts 102 and 104, a contact surface 106 of the first part 102 which forms a narrow side of the first part 102 abuts on a contact surface 108 of the second part 104 which forms a major face of the second part 104.

A respective groove 110, which is formed in the related part 102 or 104, opens out into each of the contact surfaces 106, 108 and comprises a base section 112 in the form of a segment of a circular cylinder or a section of a circular cylinder and two undercut sections 114 which extend away from the base section 112 in a thickness direction 116.

The radius of curvature of the base section 112 is larger than the groove depth T (see FIG. 4) so that the arched bottom surface of the groove 118 intersects the respective contact surface 106, 108 at an acute angle.

The base section 112 of the groove 110 has a width B of approximately 8 mm for example in the thickness direction 116.

Each of the undercut sections 114 of the groove 110 is bounded on the side thereof remote from the respective contact surface 106 and 108 by a bottom surface 120 which is flush with the bottom surface of the groove 118 and is in the form of a section of the surface of a circular cylinder and has the same radius of curvature as the bottom surface of the groove 118 of the base section 112.

In the direction toward the contact surface 106 or 108, each undercut section 114 is bounded by an undercut surface 122 which is likewise in the form of a section of the surface of a circular cylinder and is concentric with the bottom surface 120 and has a smaller radius of curvature.

Each of the undercut sections 114 is bounded laterally by a lateral boundary surface 124 which runs perpendicularly to the respective contact surface 106 and 108.

The width b, i.e. the extent thereof in the thickness direction 116, amounts to approximately 1 mm for example for each of the undercut sections 114.

The height h, i.e. the distance between the bottom surface 120 and the undercut surface 122, amounts to approximately 2 mm for example for each of the undercut sections 114.

The base section 112 of each groove 110 is bounded by lateral boundary walls 126 which run substantially perpendicularly to the respective contact surface 106 and 108 and they are spaced from each other by the groove width B.

Figure 3:
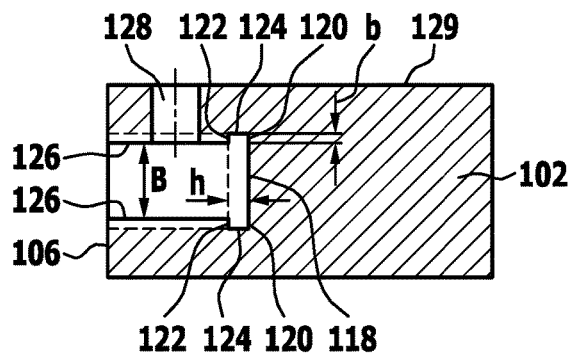
FIG. 3 a schematic cross section through one of the parts depicted in FIG. 1.
Figure 4:
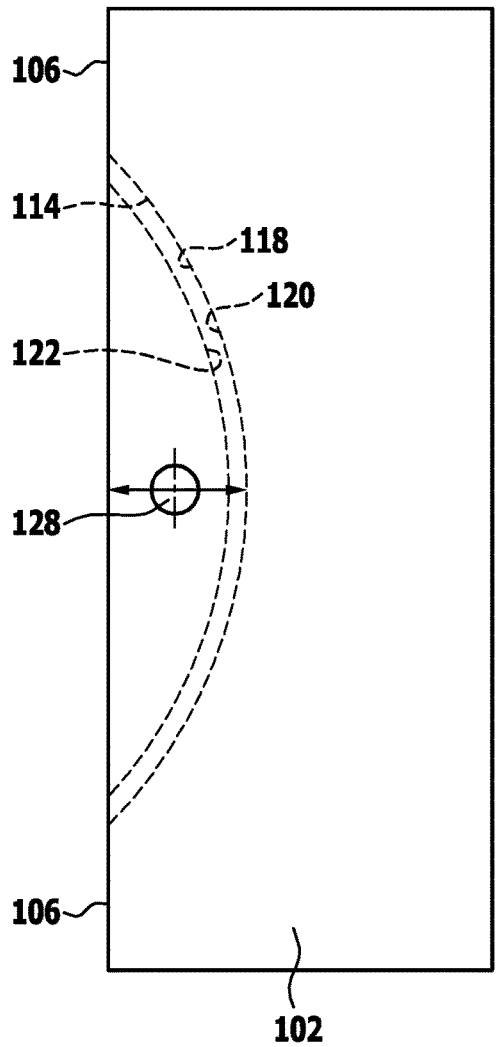
FIG. 4 a schematic partially-transparent side view of the part depicted in FIG. 3.
Figure 5:
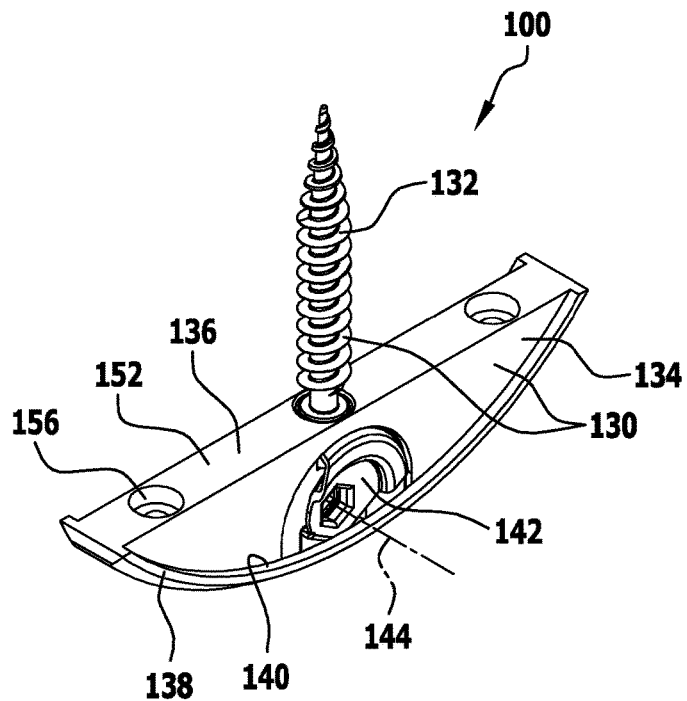
FIG. 5 a schematic perspective illustration of a first embodiment of a connecting device in which a connecting element that is insertable into a groove and a connecting element in the form of a screw element are provided.
Figure 6:
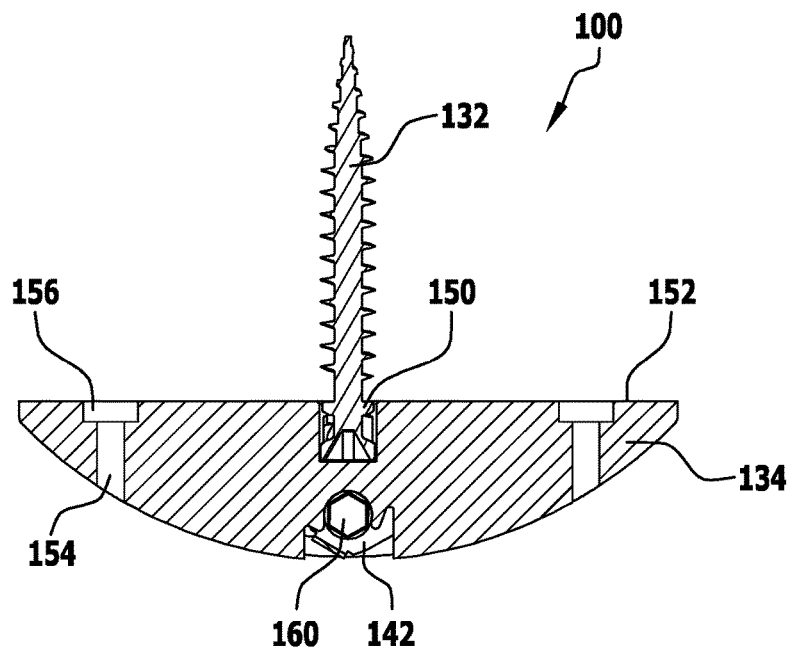
FIG. 6 a schematic longitudinal section through the connecting device depicted in FIG. 5.
Figure 7:
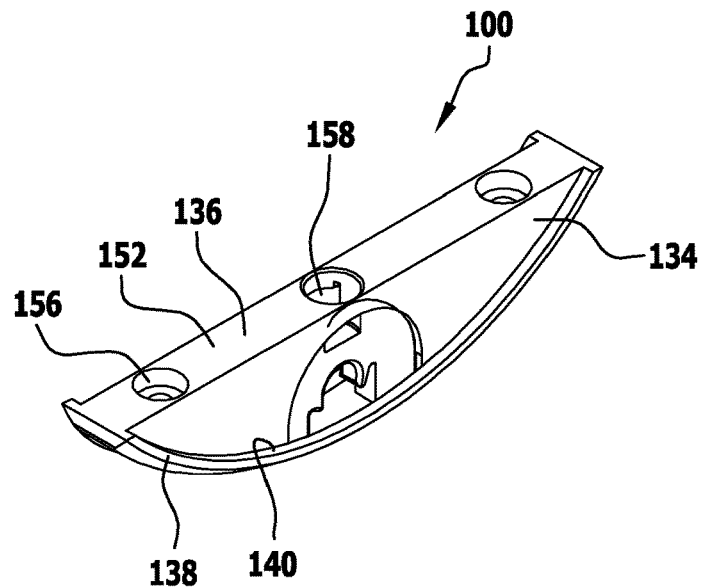
FIG. 7 a schematic perspective illustration of a main body of the connecting element depicted in FIG. 5 which is insertable into a groove.

As can be seen from FIG. 3 for example, a substantially cylindrical access opening 128 and in particular an access boring running perpendicularly to one of the lateral boundary walls 126 opens out into the groove 110 of the first part 102 and the other end thereof opens out into a major face 129 of the first part 102 and thereby enables access to be made to the base section 112 of the groove 110 from an area outside the first part 102.

In order to produce the previously described grooves 110 in the parts 102 and 104, the groove milling device described in EP 1 990 549 A1 for example can be used.

For the purposes of connecting the parts 102, 104 to one another, one or more grooves 110 and in particular grooves 110 of the type described hereinabove can be provided in each of the parts 102, 104.

However, provision could also be made for just one of the parts 102, 104 to be provided with one or more grooves 110 and in particular grooves 110 of the previously mentioned type, whereas the further part 104, 102 has no groove 110 of the previously described type, or has a differently formed groove 110, one or more borings, one or more recesses, one or more projections and/or one or more cut-outs, or is in its original state.

Various embodiments of connecting devices 100 for connecting different parts 102, 104 and in particular differently prepared parts 102, 104, are described in the following.

A first embodiment of a connecting device 100 that is illustrated in FIGS. 5 to 9 comprises a connecting element 130 which is insertable into a groove 110 and a connecting element 130 which is in the form of a screw element 132.

A connecting element 130 which is insertable into a groove 110 is preferably to be understood as being a connecting element 130 that is insertable into a groove 110 which comprises a base section 112 and one or more undercut sections 114 that extend away from the base section 112 in a thickness direction 116. The one undercut section 114 or the plurality of undercut sections 114 preferably comprise one or more undercut surfaces 122 which are formed and arranged concentrically to the base section 112. In particular hereby, the undercut surface 122 or the undercut surfaces 122 is or are in the form of a section of the surface of a circular cylinder.

A connecting element 130 that is insertable into a groove 110 preferably comprises a main body 134 which comprises a main body part 136 corresponding to the base section 112 of the groove 110 and one or more retaining projections 138 corresponding to the undercut sections 114.

The retaining projections 138 each have a curved supporting surface 140 which is in the form of an arc of a circle in longitudinal section.

In particular, the retaining projections 138 are formed such as to be non-self-cutting.

In this description and the accompanying Claims, a longitudinal section, a longitudinal direction, etc. is to be understood as a section or a movement of the connecting element 130 in a plane in which a path of movement of the connecting element 130 lies when it is being pushed into a groove 110.

In particular, a longitudinal section is a section taken perpendicularly with respect to an axis of symmetry of the supporting surfaces 140 of the connecting element 130.

A cross section is to be understood in particular, as a section taken perpendicularly with respect to a longitudinal section, for example, a section taken perpendicularly with respect to a contact surface 106, 108 and parallel to the axis of symmetry of the supporting surfaces 140 of the connecting element 130.

Preferably, a cross section is a section along a plane in which the axis of symmetry of the supporting surfaces 140 of the connecting element 130 extends.

In the first embodiment of the connecting device 100 that is illustrated in FIGS. 5 to 9, the connecting element 130 which is insertable into a groove 110 comprises a retaining element 142 that is arranged on the main body 134 and in particular a retaining element that is mounted thereon in rotatable manner.

In particular, the retaining element 142 is arranged on the main body 134 such as to be rotatable about a rotational axis 144 running parallel to the thickness direction 116.

Figure 8:
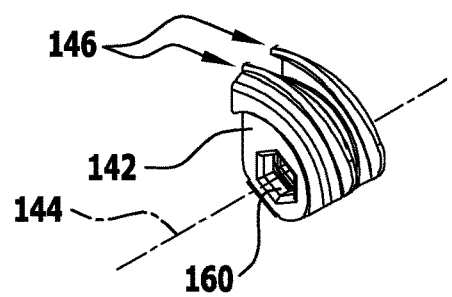
FIG. 8 a schematic perspective illustration of a movable retaining element of the connecting element depicted in FIG. 5 which is insertable into a groove.
Figure 9:
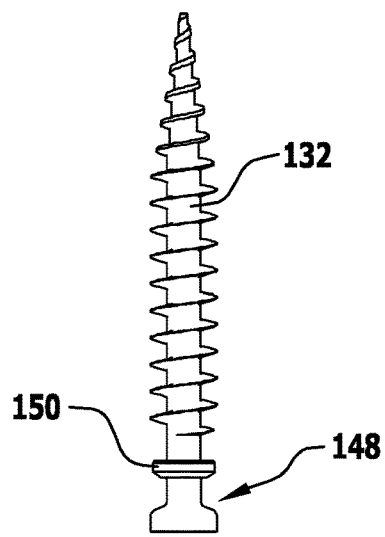
FIG. 9 a schematic side view of the connecting element depicted in FIG. 5 which is in the form of a screw element.
Figure 10:
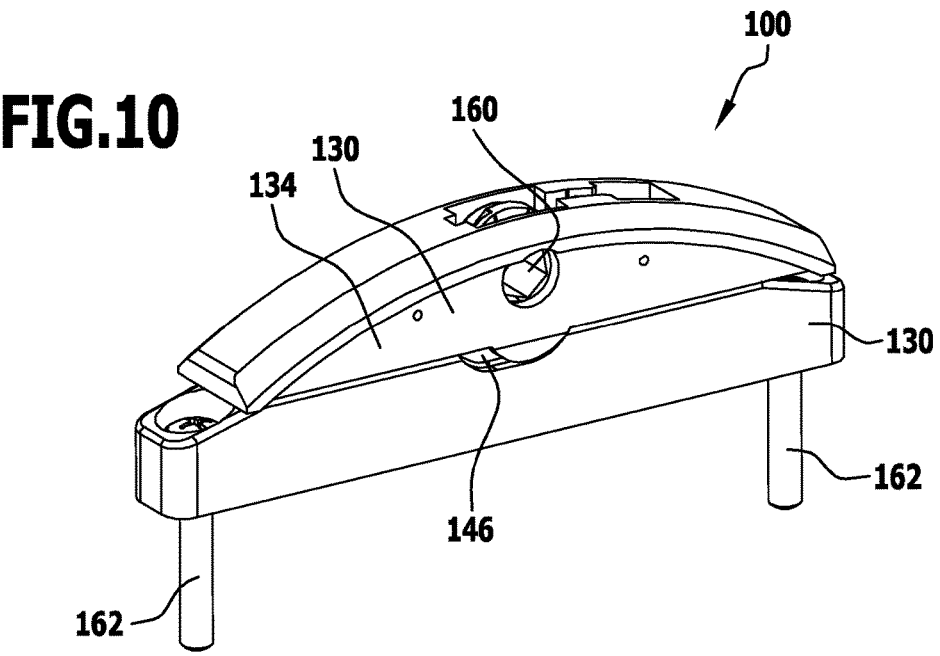
FIG. 10 a schematic perspective illustration of a second embodiment of a connecting device in which a connecting element that is insertable into a groove of a part and a connecting element that is positionable on a further part are provided.

As can be perceived from FIG. 8 in particular, the retaining element 142 comprises two engagement projections 146 which are arc-shaped and arranged eccentrically of the rotational axis 144.

In particular, an engagement section 148 of the connecting element 130 in the form of a screw element 132 is engageable by means of the engagement projections 146 and is able to be drawn thereby towards the rotational axis 144.

The connecting element 130 in the form of a screw element 132 also comprises a stop 150 beside the engagement section 148.

The screw element 132 is fixable to one of the parts 102, 104 in a correct position in a reliable manner by means of the stop 150.

In particular, it can be ensured by means of the stop 150 that, in the installed state of the screw element 132 on one of the parts 102, 104, the engagement section 148 protrudes sufficiently far above a contact surface 106, 108 of the part 102, 104 as to be brought into engagement with the retaining element 142.

In the installed state of the connecting element 130 that is insertable into the groove 110, the contact surfaces 106, 108 of the part 102, 104 and a bearing surface 152 of the connecting element 130 are preferably substantially flush.

The connecting element 130 is preferably screwable to the part 102, 104 in which the groove 110 is arranged. To this end, the main body 134 of the connecting element 130 comprises two through openings 154 that serve for the purposes of feeding (not illustrated) screws therethrough. In addition, the through openings 154 are provided with recesses 156 in order to enable (not illustrated) screw heads to be accommodated within an outer contour of the main body 134.

The connection between the parts 102, 104 by means of the connecting device 100 is established as follows:

Firstly, the connecting element 130 in the form of a screw element 132 is screwed into one of the parts 102, 104 until the stop 150 of the screw element 132 abuts on the contact surface 106, 108.

The further part 104, 102 is then provided with a groove 110 and in particular with one of the grooves 110 illustrated in FIGS. 1 to 4.

Thereupon, the connecting element 130 that is insertable into the groove 110 is inserted into the groove 110 and fixed to the part 102, 104 by means of the (not illustrated) screws.

In the installed state of the connecting element 130 that is insertable into the groove 110, the retaining element 142 is accessible through a cylindrical access boring 128 which was previously produced in the part 102, 104.

In a next step, the parts 102, 104 are laid on one another in such a way that the engagement section 148 of the screw element 132 enters a seating opening 158 corresponding thereto in the main body 134 of the connecting element 130.

The parts 102, 104 then abut one another at their contact surfaces 106, 108.

For the purposes of fixing the parts 102, 104 relative to each other, the retaining element 142 then only has to be moved from the initially set release position into a retaining position.

To this end, a (not illustrated) wrench is brought into engagement with a wrench seating 160 of the retaining element 142 through the access boring 128. The retaining element 142 is then moved from the release position into the retaining position by rotating the wrench and thus too the retaining element 142 about the rotational axis 144.

The engagement projections 146 thereby engage behind the engagement section 148 of the screw element 132 and draw it towards the rotational axis 144.

A pulling effect is thereby exerted on the parts 102, 104 so that they are firmly connected to one another.

The connecting element 130 in the form of a screw element 132 preferably has a substantially rotationally symmetrical engagement section 148. In this way, the screw element 132 can always be gripped reliably by means of the retaining element 142 independently of the rotational orientation.

The anchoring of the connecting element 130 which comprises the engagement section 148 can be effected on the one hand by means of the illustrated screw. However, as an alternative thereto, bolt-like pressure, an adhesive, screwing-in by means of a Spax thread or a metric thread, fixing by means of a dowel pin, riveting and/or welding an element which comprises the engagement section 148 could also be envisaged for the process of fixing to the one part 102, 104.

A second embodiment of a connecting device 100 that is illustrated in FIGS. 10 to 15 differs from the first embodiment illustrated in FIGS. 5 to 9 substantially in that a substantially parallelepipedal connecting element 130 is provided in addition to a connecting element 130 that is insertable into a groove 110.

In particular, this parallelepipedal connecting element 130 is screwable onto a contact surface 108 of a part 104 by means of two screws 162.

The parallelepipedal connecting element 130 comprises two engagement projections 146 and a substantially semi-circular engagement channel 164.

The connecting element 130 that is introducible into the groove 110 comprises a retaining element 142 which has an at least partly substantially T-shaped cross section and thus comprises an engagement section 148.

In particular, the retaining element 142 is introducible into the engagement channel 164 of the parallelepipedal connecting element 130 and is adapted to be brought into engagement therewith by means of the engagement projections 146 by a rotary movement.

Furthermore, the connecting element 130 that is introducible into the groove 110 comprises two plug-in projections 166 which are insertable into seating pockets 168 corresponding thereto in the parallelepipedal connecting element 130.

The plug-in projections 166 and the seating pockets 168 preferably have a ribbed or undulating surface in order to prevent a displacement of the plug-in projections 166 within the seating pockets 168.

Figure 11:
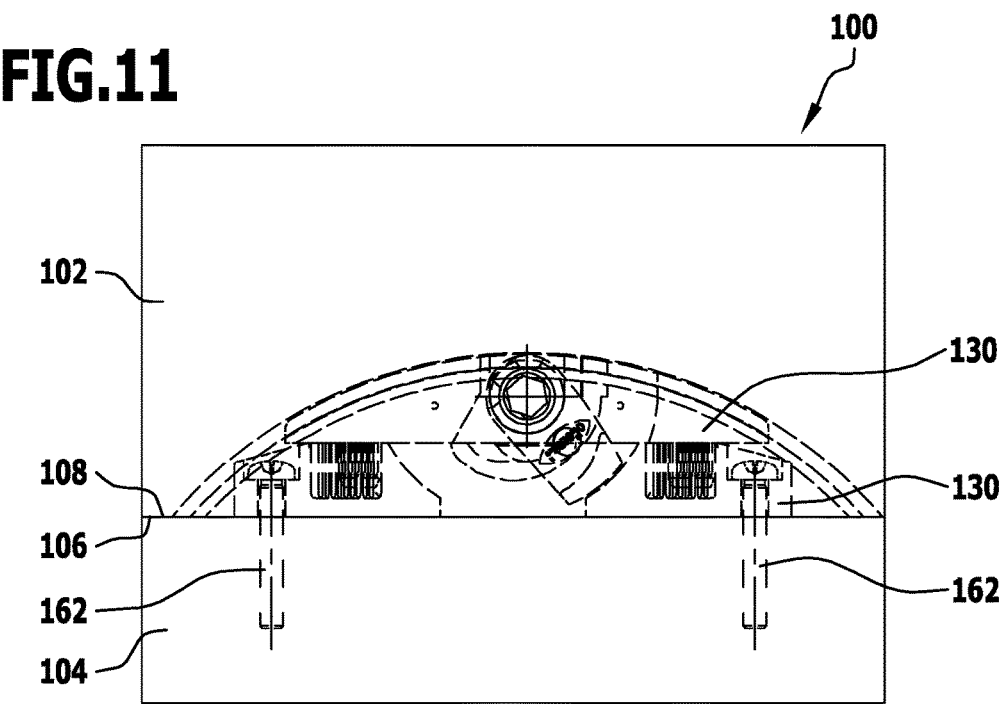
FIG. 11 a schematic partially-transparent side view of the connecting device depicted in FIG. 10 including the parts connected by means of the connecting device.

As can be perceived from FIGS. 11 and 14 in particular, the connecting element 130 that is arrangeable in the groove 110 is preferably arrangeable entirely in the groove 110.

The bearing surface 152 of the main body 134 of the connecting element 130 is set back relative to the contact surface 106 of the part 102 in the installed state of the connecting element 130 in the groove 110.

The contact surfaces 106, 108 thereof abut each other in the connected state of the parts 102, 104

The parallelepipedal connecting element 130 that is screwed tightly to the contact surface 108 of the second part 104 then extends into the groove 110 in the first part 102.

Reliable fixing of the parts 102, 104 relative to each other with reference to the thickness direction 116 can thus be obtained merely by pushing the parallelepipedal connecting element 130 into the groove 110 in the first part 102.

By rotating the retaining element 142 by means of the (not illustrated) wrench, the retaining element 142 can be brought into the retaining position in which the engagement section 148 engages behind the engagement projections 146 and the connecting elements 130 as well as the parts 102, 104 define a direction of connection 170 that is oriented perpendicularly to the contact surfaces 106, 108.

In all other respects, the second embodiment of the connecting device 100 that is illustrated in FIGS. 10 to 15 coincides in regard to the construction and functioning thereof with the first embodiment illustrated in FIGS. 5 to 9 so that, to that extent, reference is made to the preceding description thereof.

Figure 16:
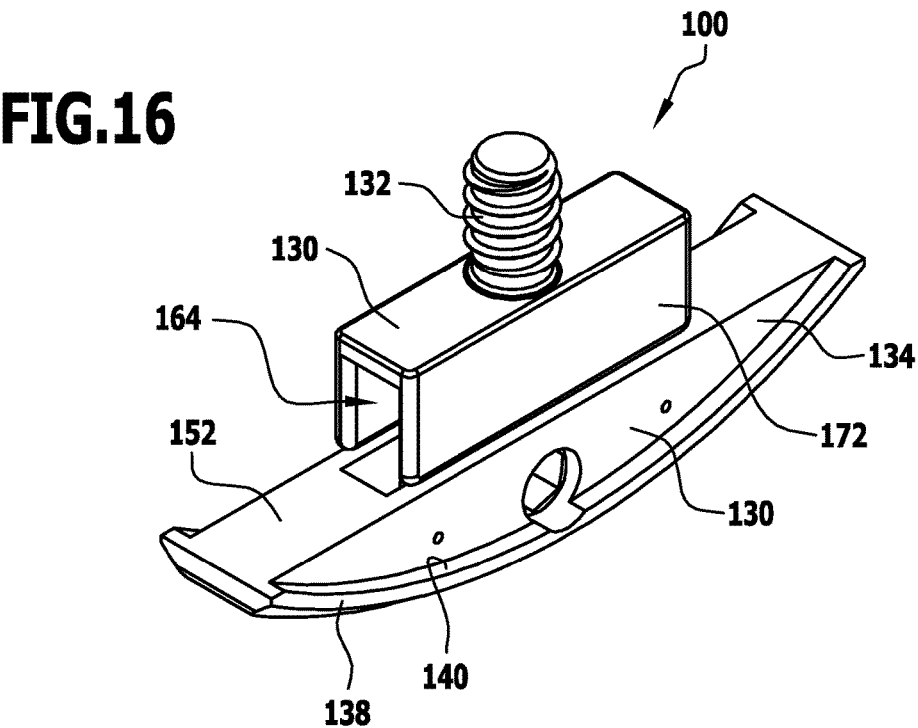
FIG. 16 a schematic perspective illustration of a third embodiment of a connecting device in which there is provided a connecting element that is screwable into a part and is used for accommodating a T-shaped retaining element.
Figure 17:
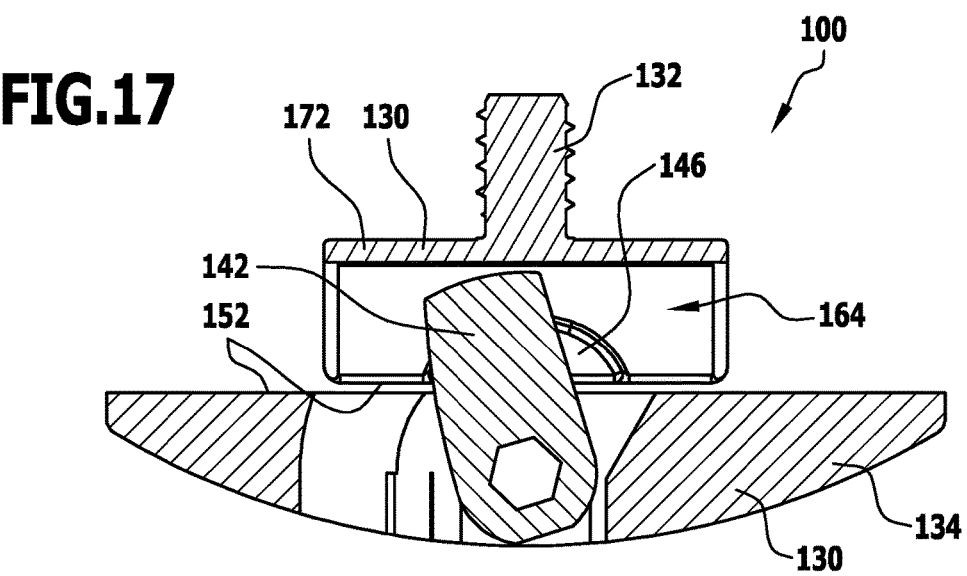
FIG. 17 a schematic longitudinal section through the connecting device depicted in FIG. 16.
Figure 18:
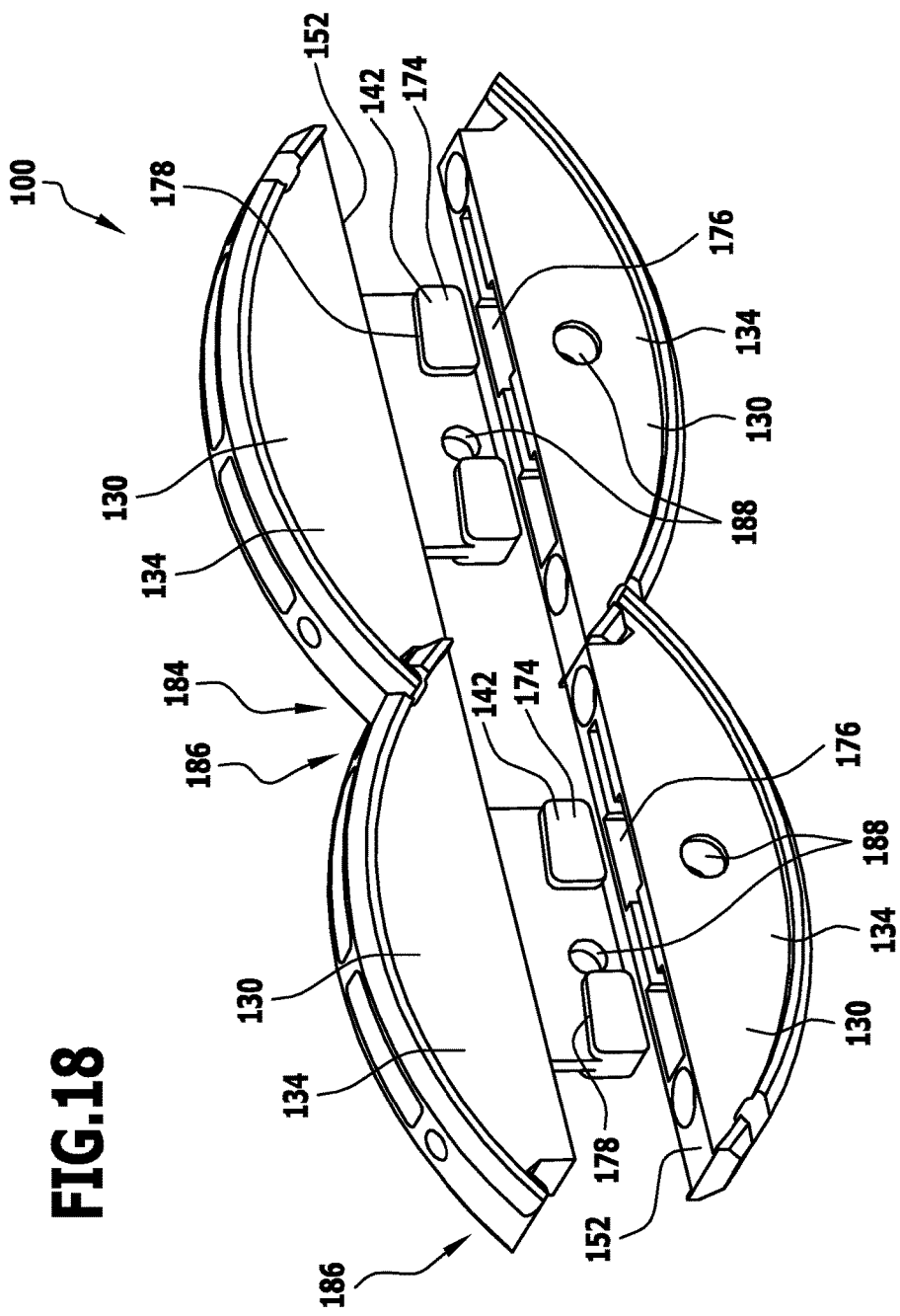
FIG. 18 a schematic perspective illustration of a fourth embodiment of a connecting device in which, for each part, there are provided two connecting elements which are fixable relative to each other by means of a securing device.

A third embodiment of a connecting device 100 that is illustrated in FIGS. 16 and 17 differs from the second embodiment illustrated in FIGS. 10 to 15 substantially in that a connecting element 130 in the form of a screw element 132 is provided in addition to a connecting element 130 that is insertable into the groove 110

This screw element 132 is screwable into one of the parts 102, 104.

A parallelepipedal section 172 of the screw element 132 comprises an engagement channel 164 and two engagement projections 146.

Thus, in a similar way to the second embodiment illustrated in FIGS. 10 to 15, the third embodiment that is illustrated in FIGS. 16 and 17 is also provided with a connecting element 130 which is positionable on and in particular screwable to a contact surface 106, 108 of a part 102, 104 into which there is introducible a retaining element 142, which has a substantially T-shaped cross section and thus comprises an engagement section 148.

In all other respects, the third embodiment of the connecting device 100 that is illustrated in FIGS. 16 and 17 coincides in regard to the construction and functioning thereof with the second embodiment illustrated in FIGS. 10 to 15 so that, to that extent, reference is made to the preceding description thereof.

A fourth embodiment of a connecting device 100 that is illustrated in FIGS. 18 to 22 differs from the first embodiment illustrated in FIGS. 5 to 9 substantially in that two connecting elements 130 that are insertable into a groove 110 are associated with each of the parts 102, 104.

Hereby, the grooves 110 in each part 102, 104 are arranged to overlap so that the bottom surfaces 118 of the grooves 110 intersect or border one another within the respective part 102, 104 underneath the contact surface 106, 108.

In the fourth embodiment of the connecting device 100 that is illustrated in FIGS. 18 to 22, two types of connecting elements 130 are provided.

On the one hand, there are provided connecting elements 130 each of which comprises two suspension elements 174.

Furthermore, there are provided connecting elements 130 which each comprise two suspension element seatings 176.

Both the suspension elements 174 and the suspension element seatings 176 each comprise at least one inclined surface 178 which is inclined to the bearing surface 152 and/or inclined to the contact surface 106, 108.

Furthermore, all of the connecting elements 130 comprise a respective securing projection 180 and a securing seating 182.

A securing device 184 is formed by means of the securing projection 180 and the securing seating 182. The securing device 184 serves, in particular, for fixing at least one of the connecting elements 130 in the groove 110 and in particular for preventing unwanted displacement of the connecting element 130 within the groove 110.

Figure 21:
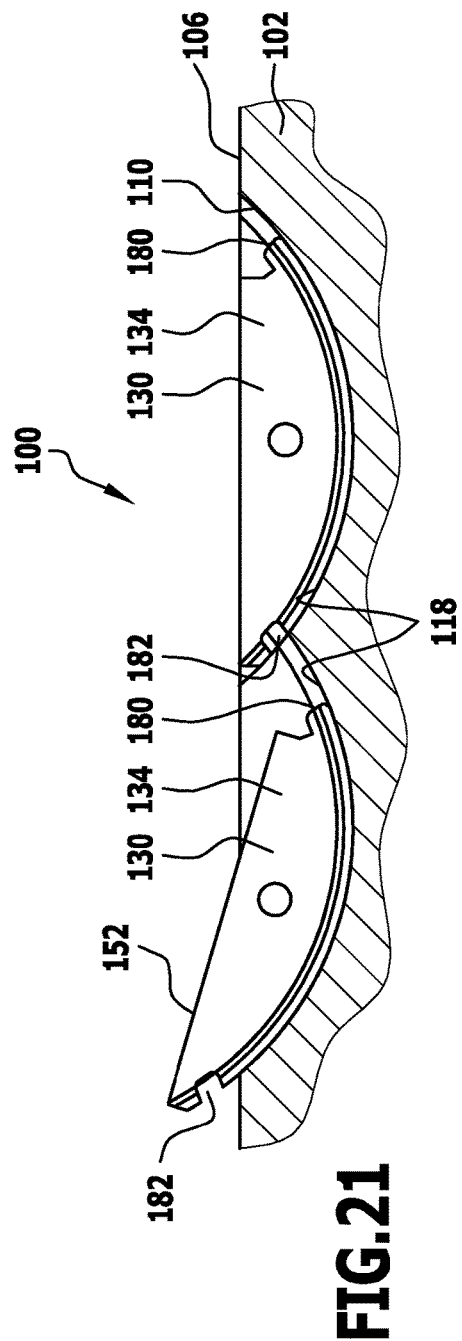
FIG. 21 a schematic side view for illustrating the mounting of the connecting elements of the connecting device depicted in FIG. 18 in a part.
Figure 22:
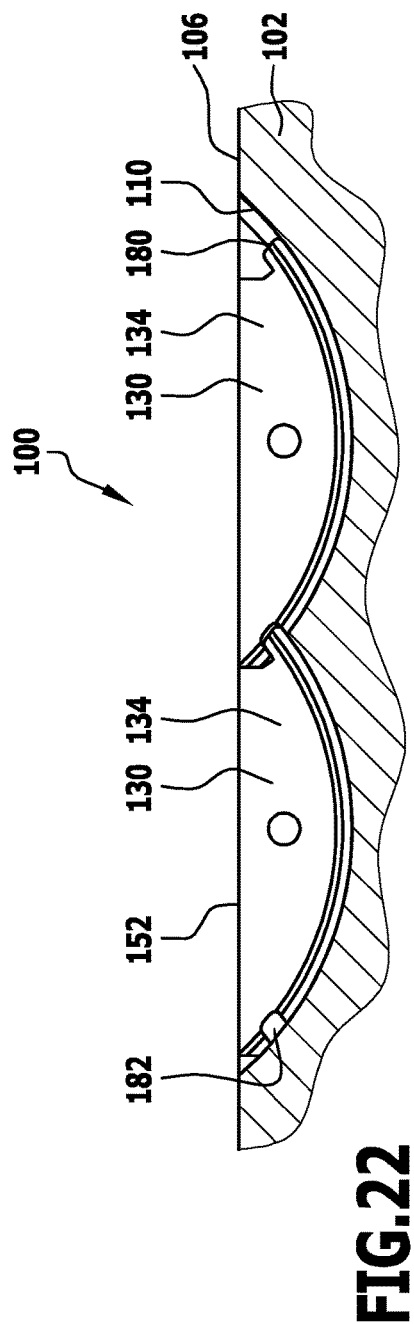
FIG. 22 a schematic illustration corresponding to FIG. 21 of two connecting elements in the installed state thereof on a part.
Figure 26:
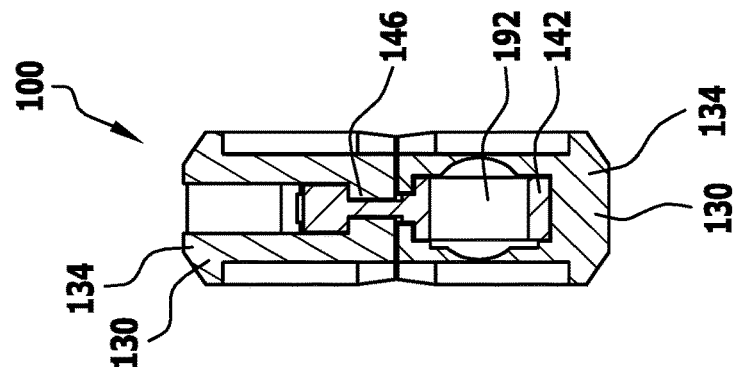
FIG. 26 a schematic vertical cross section through the connecting device depicted in FIG. 23, in the connected state thereof.

To this end, a securing projection 180 of a connecting element 130 is moveable into engagement with a securing seating 182 of a further connecting element 130 (see in particular, FIGS. 21 and 22).

A securing projection 180 and a securing seating 182 of a connecting element 130 are preferably arranged at mutually opposite end regions 186 of the main body 134 and in particular, the supporting surfaces 140.

As can be perceived from FIG. 19 in particular, the connecting elements 130 further comprise a respective through opening 188 which is arranged in the respective connecting element 130 in such a manner that the through openings 188 of two interconnected connecting elements 130 are aligned with one another in the connected state of the parts 102, 104.

By introducing a securing element and in particular a securing pin into the through openings 188, the connecting elements 130 and thus too the parts 102, 104 can be secured from unwanted displacement thereof relative to each other.

As can be perceived from FIG. 19 in particular, the connection of the parts 102, 104 by means of the connecting elements 130 is not effected in the fourth embodiment of the connecting device 100 that is illustrated in FIGS. 18 to 22 by rotation of a retaining element 142. Rathermore, the parts 102, 104 together with the connecting elements 130 arranged thereon are initially moved towards one another in order to insert the suspension elements 174 into the suspension element seatings 176 (see FIG. 18).

Thereafter, the parts 102, 104 and the connecting elements 130 arranged therein are displaced in parallel with the contact surfaces 106, 108. The inclined surfaces 178 of the suspension elements 174 and the suspension element seatings 176 thereby come into engagement with one another so that the connecting elements 130 and thus too the parts 102, 104 are pulled towards one another.

The fourth embodiment of the connecting device 100 that is illustrated in FIGS. 18 to 22 is suitable, in particular, for connecting the framework parts of a bedstead.

In all other respects, the embodiment of a connecting device 100 that is illustrated in FIGS. 18 to 22 coincides in regard to the construction and functioning thereof with the first embodiment illustrated in FIGS. 5 to 9 so that, to that extent, reference is made to the preceding description thereof.

A fifth embodiment of a connecting device 100 that is illustrated in FIGS. 23 to 26 differs from the first embodiment illustrated in FIGS. 5 to 9 substantially in that two connecting elements 130 that are insertable into a respective groove 110 are provided.

In addition in the case of the embodiment of the connecting device 100 that is illustrated in FIGS. 23 to 26, provision is made for a retaining element 142 to be operable by means of a magnet element 190 in order to move the retaining element 142 from a release position into a retaining position and/or from the retaining position into the release position.

In particular, the magnet element 190 is an element that is operable magnetically by means of a (not illustrated) magnet device.

The magnet element 190 is movable linearly to and fro by means of the magnet device for example.

The retaining element 142 preferably comprises a seating 192 for the magnet element 190.

One of the connecting elements 130 preferably serves for accommodating the retaining element 142 together with the magnet element 190 that is accommodated therein.

To this end in particular, this connecting element 130 comprises a substantially slot-like guide 194 in the main body 134.

The retaining element 142 is movable along the slot-like guide 194 relative to the main body 134.

Furthermore, the retaining element 142 has two inclined surfaces 178 which are moveable into engagement with engagement projections 146 in the further connecting element 130.

The inclined surfaces 178 of the retaining element 142 thus form an engagement section 148 of the retaining element 142.

Figure 25:
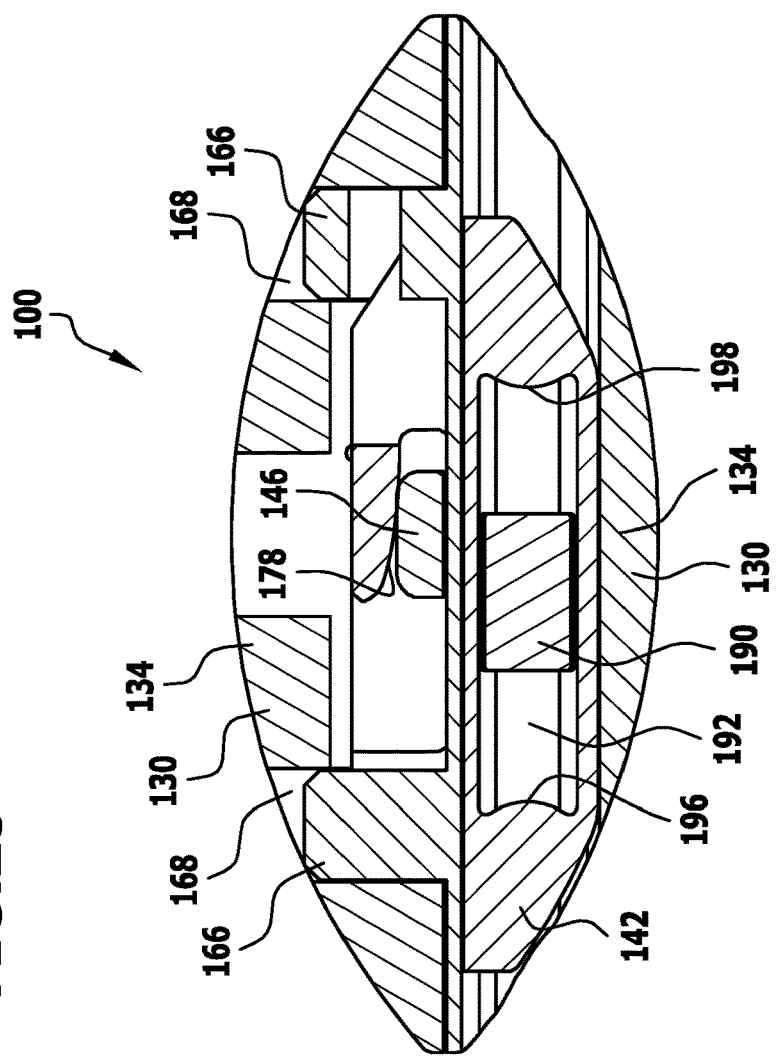
FIG. 25 a further schematic vertical longitudinal section through the connecting device depicted in FIG. 23, in the connected state thereof.

As can be perceived from FIGS. 24 and 25 in particular, the connecting elements 130 in accordance with the fifth embodiment of the connecting device 100 that is illustrated in FIGS. 23 to 26 comprise plug-in projections 166 and seating pockets 168.

When connecting the connecting elements 130 to one another, the plug-in projections 166 are firstly inserted into the seating pockets 168.

The engagement section 148, in particular the inclined surfaces 178, is moved simultaneously behind the engagement projections 146 with reference to the direction of connection 170.

Finally, the bearing surfaces 152 of the connecting elements 130 as well as the contact surfaces 106, 108 of the parts 102, 104 come to abut on one another.

In a next step, the magnet element 190 is then actuated for fixing the connecting elements 130 and hence the parts 102, 104 relative to each other along the direction of connection 170.

To this end, the magnet device is brought into the proximity of the connecting device 100 and the magnet element 190 is accelerated within the seating 192.

The magnet element 190 is thereby accelerated, in particular, repeatedly, within the seating 192 and is braked by striking an end region of the seating 192.

Hereby, the seating 192 is bounded at one end by a locking surface 196 and at the other end by an unlocking surface 198.

The retaining element 142 is brought into the retaining position in which the engagement section 148 of the retaining element 142 engages behind the engagement projections 146 due to an impact of the magnet element 190 on the locking surface 196.

The retaining element 142 is moved in the opposite direction and hence the engagement section 148 is disengaged from the engagement projections 146 due to the magnet element 190 striking the unlocking surface 198.

The retaining element 142 can thus be moved selectively into the retaining position or into the release position.

A displacement of the main bodies 134 of the connecting elements 130 relative to each other due to the magnet element 190 striking the locking surface 196 or the unlocking surface 198 is preferably prevented by means of the plug-in projections 166 and the seating pockets 168.

The fifth embodiment of the connecting device 100 that is illustrated in FIGS. 23 to 26 can, in particular, offer the advantage that the parts 102, 104 can be connected to one another without any form of visual impairment. In particular, one can dispense with an access boring 128.

In all other respects, the fifth embodiment of the connecting device 100 that is illustrated in FIGS. 23 to 26 coincides in regard to the construction and functioning thereof with the first embodiment illustrated in FIGS. 5 to 9 so that, to that extent, reference is made to the preceding description thereof.

Figure 27:
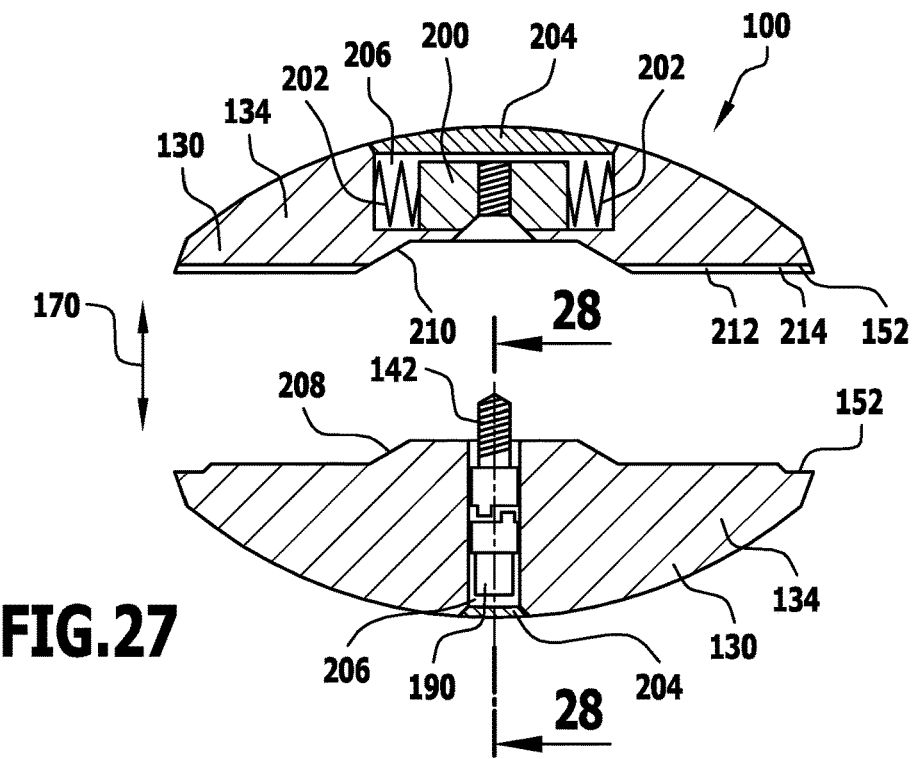
FIG. 27 a schematic vertical longitudinal section through a sixth embodiment of a connecting device in which a retaining element that is driven in rotary manner by means of a magnet element and a seating for the retaining element that is mounted in displaceable manner are provided.
Figure 28:
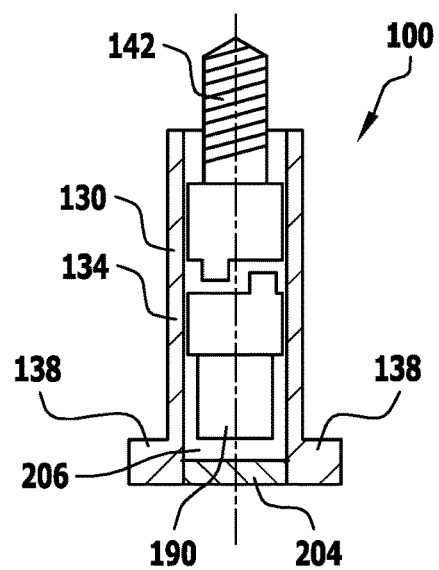
FIG. 28 a schematic cross section through a connecting element which comprises the magnet element and the retaining element, along the line 28-28 in FIG. 27.

A sixth embodiment of a connecting device 100 that is illustrated in FIGS. 27 and 28 differs from the fifth embodiment illustrated in FIGS. 23 to 26 substantially in that the retaining element 142 is a retaining element 142 in the form of a screw.

The magnet element 190 is drivable in rotary manner by means of the magnet device in order to specifically actuate the retaining element 142.

The retaining element 142 and the magnet element 190 are arranged on a main body 134 of a connecting element 130 that is introducible into a groove 110.

A further connecting element 130 which is likewise preferably introducible into a groove 110 preferably comprises a seating 200 for the retaining element 142 in the form of a screw. In particular, the seating 200 is a threaded nut.

The seating 200 is preferably arranged such as to be moveable, particularly in spring-like manner, on a main body 134 of the further connecting element 130. To this end in particular, two spring elements 202 are provided on the main body 134.

The main bodies 134 of the connecting elements 130 preferably comprise a respective cover element 204 by means of which an interior space 206 of the respective main body 134 is closable.

In particular, the seating 200, the magnet element 190 and/or the retaining element 142 in the form of a screw are accessible and/or removable from the respective main body 134 by removing the respective cover element 204.

As can be perceived from FIG. 27 in particular, the connecting elements 130 preferably further comprise at least one projection 208, a recess 210 corresponding thereto and/or at least one ridge 212 and/or a groove 214 corresponding thereto for aligning the connecting elements 130 relative to each other in all of the directions running perpendicularly to the direction of connection 170.

In regard to the type of actuation of the retaining element 142 by means of the magnet element 190 as well as in regard to the actuation of the magnet element 190 by means of the magnet device, reference is made to WO 99/43961 A1 the contents of which are hereby incorporated by reference in this description.

In all other respects, the sixth embodiment of the connecting device 100 that is illustrated in FIGS. 27 and 28 coincides in regard to the construction and functioning thereof with the fifth embodiment illustrated in FIGS. 23 to 26 so that, to that extent, reference is made to the preceding description thereof.

Figure 29:
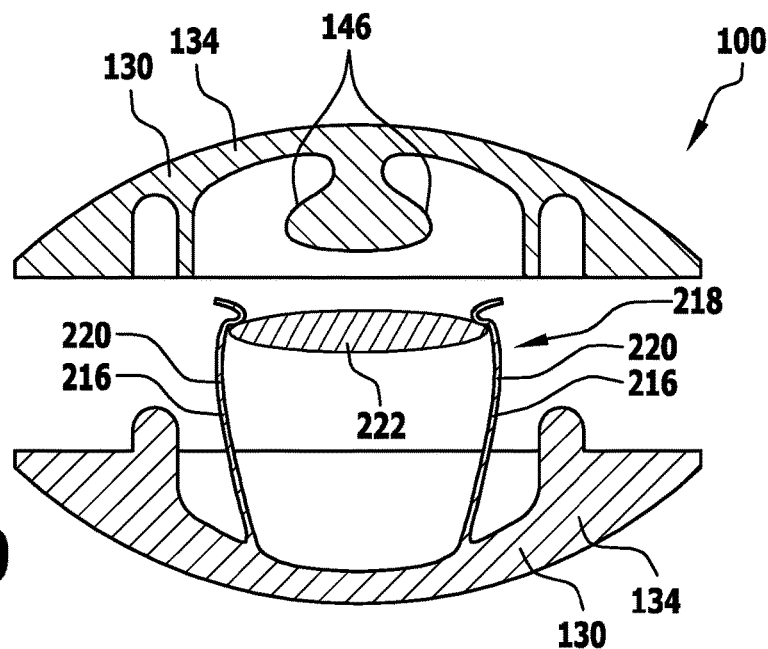
FIG. 29 a schematic vertical longitudinal section through a seventh embodiment of a connecting device in which a storage device for storing retaining energy of a retaining element is provided, wherein the storage device is in a storage state.
Figure 30:
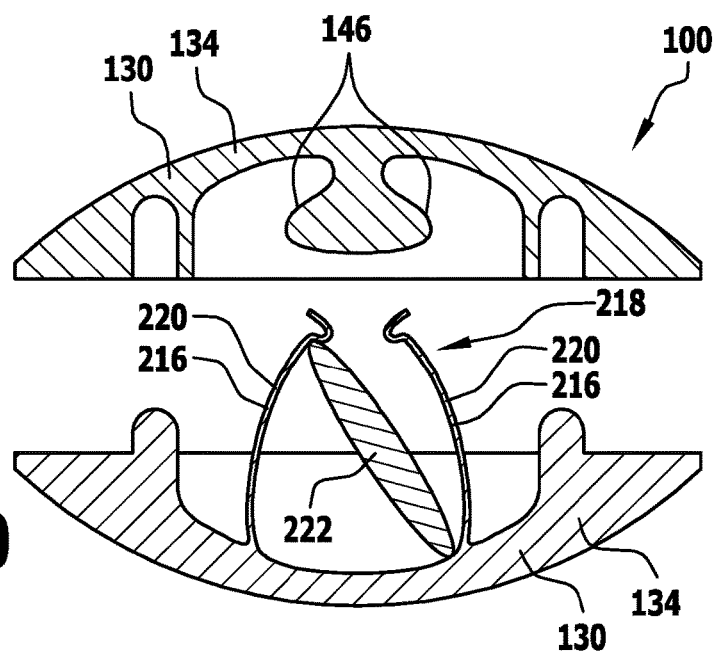
FIG. 30 a schematic illustration corresponding to FIG. 29 of the connecting device depicted in FIG. 29 wherein the storage device is in a discharged and/or relaxed state.

A seventh embodiment of a connecting device 100 that is illustrated in FIGS. 29 and 30 differs from the fifth embodiment illustrated in FIGS. 23 to 26 substantially in that the connecting elements are connectable to one another 130 by means of spring elements 216.

To this end in particular, the spring elements 216 can engage behind engagement projections 146.

The spring elements 216 and the engagement projections 146 are arranged on mutually differing connecting elements 130.

In the seventh embodiment of the connecting device 100 that is illustrated in FIGS. 29 and 30, there is provided a storage device 218 by means of which the retaining energy or retaining force necessary for the retention of the connecting elements 130 is storable.

The storage device 218 comprises two storage elements 220 which are formed, in particular, by the spring elements 216 and a blocking element 222.

The spring elements 216 can be held in a biased position by means of the blocking element 222 (see FIG. 29).

In the embodiment of the connecting device 100 that is illustrated in FIGS. 29 and 30, the retaining energy and/or retaining force that is necessary for holding the connecting elements 130 and thus the parts 102, 104 together can be applied before actually connecting the parts 102, 104 to one another.

When connecting the connecting elements 130 arranged on the parts 102, 104 together, the blocking element 222 is preferably moved by means of at least one engagement projection 146 from the blocking position illustrated in FIG. 29 into the release position illustrated in FIG. 30.

In consequence, the spring elements 216 can move towards one another and engage behind the engagement projections 146.

In particular, the connecting device 100 that is illustrated in FIGS. 29 and 30 is a concealed, self-tensioning connecting device 100.

The storage device 218 can preferably be loaded before installing, during the installation process or after installing the connecting elements 130 in the parts 102, 104. In particular, the blocking element 222 can be moved into the blocking position illustrated in FIG. 29 at any point in time before the connection of the parts 102, 104 to one another.

In all other respects, the seventh embodiment of the connecting device 100 that is illustrated in FIGS. 29 and 30 coincides in regard to the construction and functioning thereof with the fifth embodiment illustrated in FIGS. 23 to 26 so that, to that extent, reference is made to the preceding description thereof.

Figure 31:
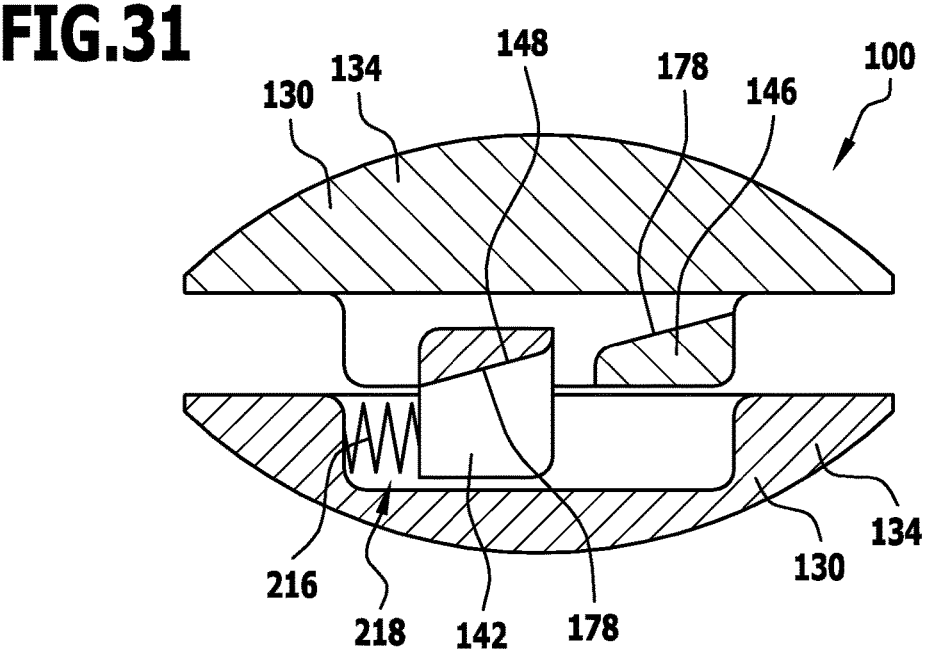
FIG. 31 a schematic vertical longitudinal section through an eighth embodiment of a connecting device in which a retaining element that is movable linearly by means of a spring device is provided.

An eighth embodiment of a connecting device 100 that is illustrated in FIG. 31 differs from the seventh embodiment illustrated in FIGS. 29 and 30 substantially in that the spring element 216 does not directly engage with an engagement projection 146, but rather, it actuates an engagement section 148 of a substantially linearly movable retaining element 142.

In the eighth embodiment of the connecting device 100 that is illustrated in FIG. 31, the storage device 218 can preferably also be loaded by tensioning the spring element 216, for example, by holding the retaining element 142 and/or the spring element 216 in a biased position.

When connecting and/or due to the connection of the parts 102, 104 to one another, the stored force and/or energy are preferably released in order to fix the connecting elements 130 relative to each other, in particular, by the inter-engagement of the engagement section 148 of the retaining element 142 and the engagement projections 146.

In all other respects, the eighth embodiment of the connecting device 100 that is illustrated in FIG. 31 coincides in regard to the construction and functioning thereof with the seventh embodiment illustrated in FIGS. 29 and 30 so that, to that extent, reference is made to the preceding description thereof.

Figure 32:
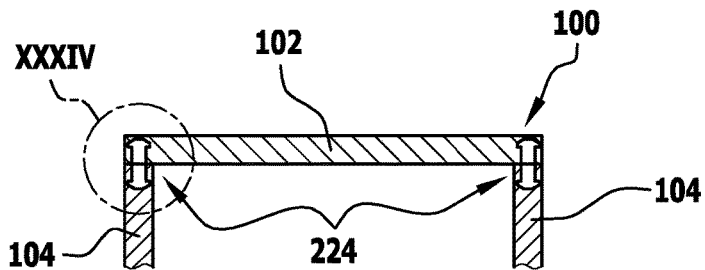
FIG. 32 a schematic sectional view through three parts which are connected together by means of connecting elements of a ninth embodiment of a connecting device, wherein the connecting elements are connected to one another by means of a tongue-and-groove device.
Figure 33:
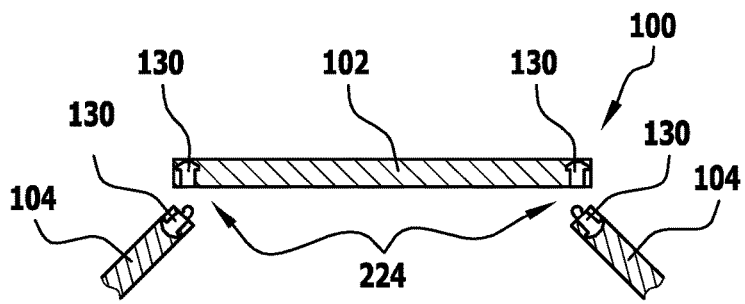
FIG. 33 a schematic illustration corresponding to FIG. 32 of the parts and the connecting devices in the separated state of the connecting elements of the connecting device.
Figure 34:
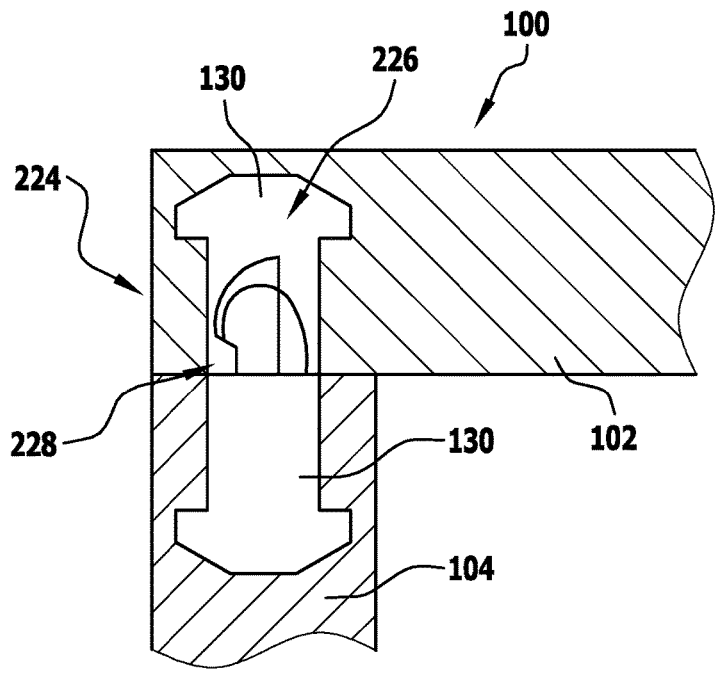
FIG. 34 an enlarged illustration of the region XXXIV in FIG. 32.

A ninth embodiment of a connecting device 100 that is illustrated in FIGS. 32 to 34 differs from the fifth embodiment of a connecting device 100 illustrated in FIGS. 23 to 26 substantially in that the connecting elements 130 which are connecting elements 130 that are insertible into a groove 110 comprise a tongue-and-groove device 224.

In particular, the tongue-and-groove device 224 is formed by a groove part 226 and a tongue part 228.

Here, the groove part 226 and the tongue part 228 are arranged and/or formed on mutually differing connecting elements 130.

As can be perceived from FIGS. 32 and 33 in particular, the connecting elements 130, in particular, the groove part 226 and the tongue part 228, are moveable into engagement with one another by inserting and pivoting the connecting elements 130 and/or the parts 102, 104 relative to each other.

The tongue-and-groove device 224 thereby serves, in particular, for adhesive-free anchoring of the one part 102 on the other part 104.

Hereby, the tongue-and-groove device 224 preferably functions in a similar manner to the interlocking process for the flooring elements of a click-together parquet flooring or a click-together laminate flooring.

The ninth embodiment of a connecting device 100 that is illustrated in FIGS. 32 to 34 is suitable, in particular, for the connection of drawer fronts to drawers.

In all other respects, the ninth embodiment of the connecting device 100 that is illustrated in FIGS. 32 to 34 coincides in regard to the construction and functioning thereof with the fifth embodiment illustrated in FIGS. 23 to 26 so that, to that extent, reference is made to the preceding description thereof.

Figure 35:
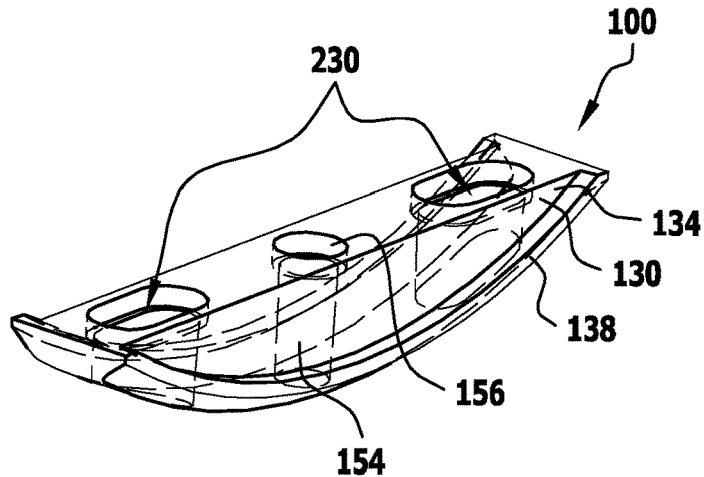
FIG. 35 a schematic perspective transparent illustration of a connecting element of a tenth embodiment of a connecting device, wherein the connecting element is introducible into a groove in a part and is accessible through openings in a further part.
Figure 36:
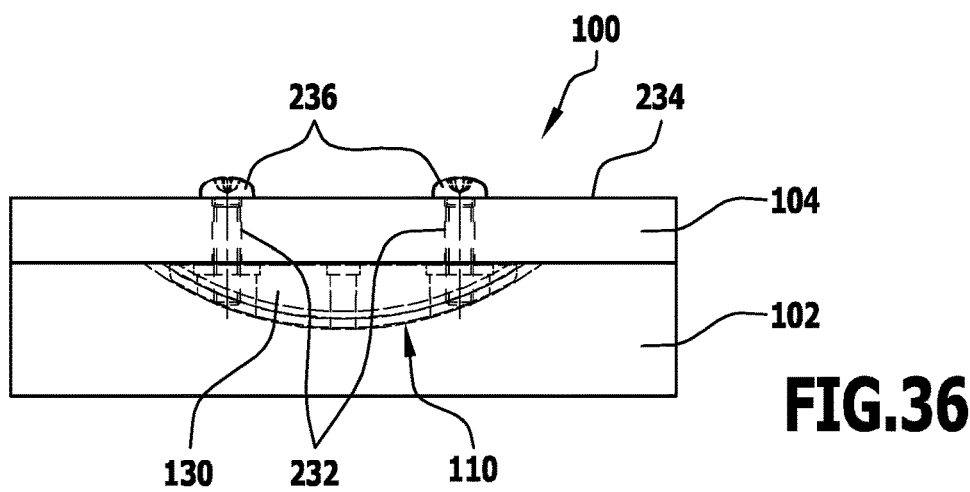
FIG. 36 a schematic partially transparent side view of two parts and of the connecting device depicted in FIG. 35 for connecting the parts.
Figure 37:
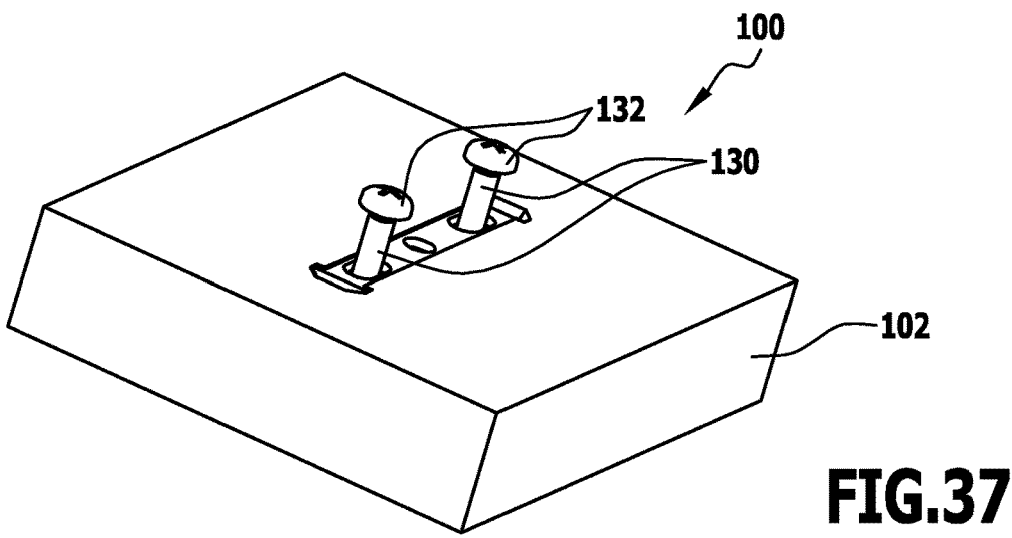
FIG. 37 a schematic perspective illustration of a part which comprises a groove in which the connecting element depicted in FIG. 35 is arranged and which is provided with screw elements.

A tenth embodiment of a connecting device 100 that is illustrated in FIGS. 35 to 37 differs from the first embodiment illustrated in FIGS. 5 to 9 substantially in that there is provided a connecting element 130 that is insertable into a groove 110 which comprises one or more screw seatings 230.

Connecting elements 130 in the form of screw elements 132 are fixable in positive-locking and/or force-locking manner in the screw seatings 230 in releasable manner.

For the purposes of anchoring the connecting element 130 in the part 102 in which the groove 110 is arranged, the connecting element 130 comprises a through opening 154 corresponding to that in the first embodiment of the connecting device 100 that is illustrated in FIGS. 5 to 9. The connecting element 130 is thus fixable to the first part 102, in particular, by means of a (not illustrated) screw 162 (see FIG. 13 for example).

In the tenth embodiment of the connecting device 100 that is illustrated in FIGS. 35 to 37, the connecting elements 130 in the form of screw elements 132 are passable through openings 232 in the second part 104.

The connecting element 130 that is insertable into the groove 110 and in particular the screw seatings 230 are thus accessible from a side 234 of the second part 104 that is remote from the first part 102.

The second part 104 can thus be clamped and/or mounted firmly between the screw heads 236 of the screw elements 132 and the connecting element 130 that is insertable into the groove by screwing the screw elements 132 to the connecting element 130 that is insertable into the groove 110.

The screw seatings 230 are threaded borings or elongate holes with an internal thread for example. As an alternative thereto, provision may be made for the screw seatings 230 to be yielding seatings for self-tapping screws.

The screw seatings 230 for the self-tapping screws are preferably seatings in the form of elongate holes.

The tenth embodiment of the connecting device 100 that is illustrated in FIGS. 35 to 37 is suitable, in particular, for use as an attachment anchor in thin-walled, easily-torn materials, for example, in a similar manner to a dowel plug for fixing screws.

In all other respects, the tenth embodiment of a connecting device 100 that is illustrated in FIGS. 35 to 37 coincides in regard to the construction and functioning thereof with the first embodiment illustrated in FIGS. 5 to 9 so that, to that extent, reference is made to the preceding description thereof.

Figure 38:
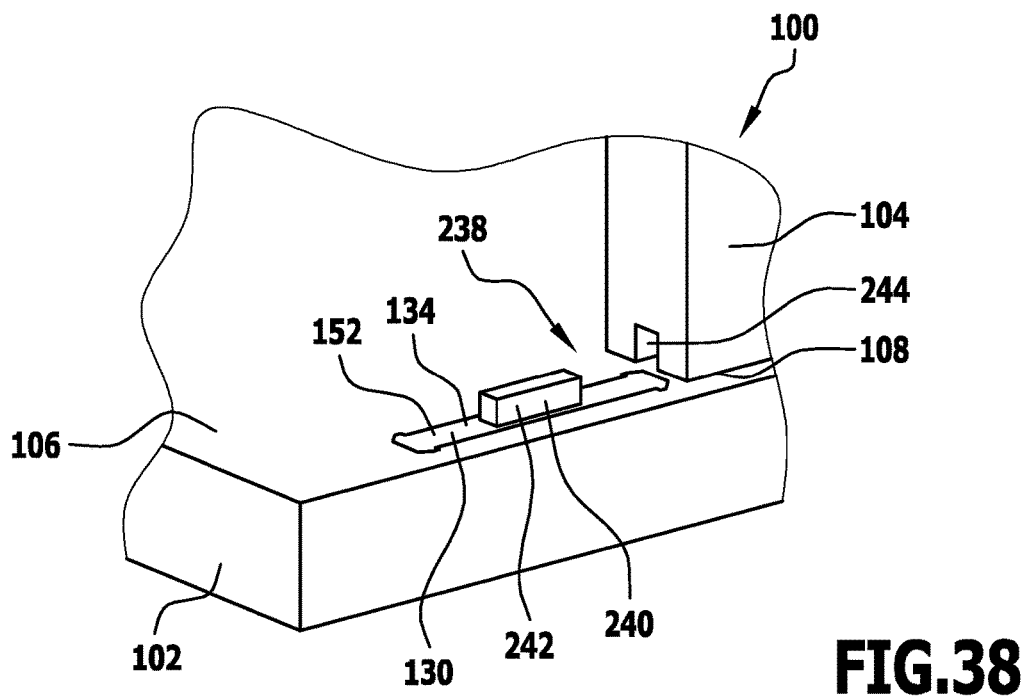
FIG. 38 a schematic perspective illustration of an eleventh embodiment of a connecting device in which the connecting device forms a guidance element for guiding the parts relative to each other.
Figure 39:
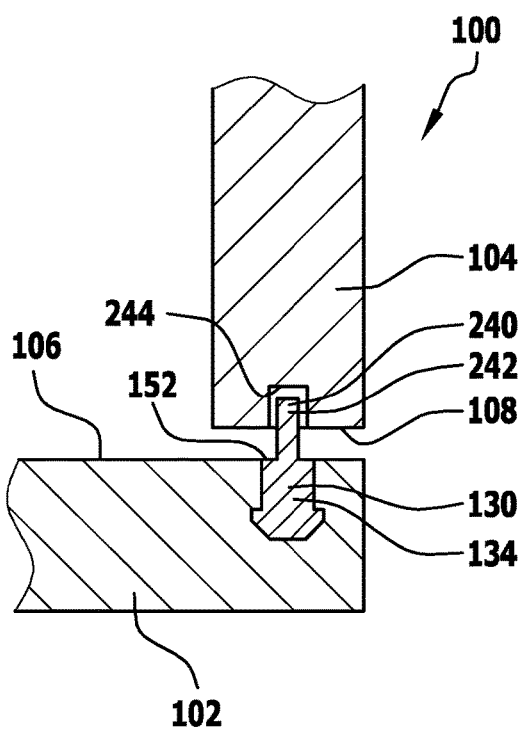
FIG. 39 a schematic vertical cross section through the connecting device depicted in FIG. 38.

An eleventh embodiment of a connecting device 100 that is illustrated in FIGS. 38 and 39 differs from the previously described embodiments substantially in that the connecting device 100 also permits a relative movement of the parts 102, 104 relative to each other in the installed and connected state of the parts 102, 104 and the connecting device 100.

Hereby, a guidance device 238 is formed by means of the connecting device 100 and the parts 102, 104 are guided in movable manner relative to each other by means of said guidance device.

Hereby, the connecting device 100 comprises at least one connecting element 130 which is a connecting element 130 that is insertable into a groove 110

This connecting element 130 preferably comprises a guidance element 240, a guidance projection 242 for example which, in the installed state of the connecting element 130, projects above the bearing surface 152 of the main body 134 of the connecting element 130 and above the contact surface 106 of the part 102 in which the connecting element 130 is arranged.

Here for example, the guidance element 240 is substantially in the form of a parallelepiped.

The further part 104 preferably comprises a guidance groove 244 for accommodating the guidance element 240.

Hereby for example, the guidance groove 244 is integrated into a connecting element 130 or into the part 104 itself.

In the eleventh embodiment of the connecting device 100 that is illustrated in FIGS. 38 and 39, the guidance groove 244 is formed in the part 104, in particular, in the form of a substantially parallelepipedal recess in the side of the part 104 whereat the contact surface 108 is arranged.

As can be perceived from FIG. 39 in particular, unwanted lateral displacement of the parts 102, 104 in a direction running transverse to the direction of longitudinal extent of the guidance groove 244 can be prevented in the installed state of the connecting device 100 and the parts 102, 104.

A displacement of the parts 102, 104 relative to each other along the direction of longitudinal extent of the guidance groove 244 is however still possible thereby.

The eleventh embodiment of the connecting device 100 that is illustrated in FIGS. 38 and 39 is suitable, in particular, for use as a sliding door fitting, for example, on the lower end of a sliding door.

In all other respects, the eleventh embodiment of a connecting device 100 that is illustrated in FIGS. 38 and 39 coincides in regard to the construction and functioning thereof with the fourth embodiment illustrated in FIGS. 18 to 22 so that, to that extent, reference is made to the preceding description thereof.

Figure 40:
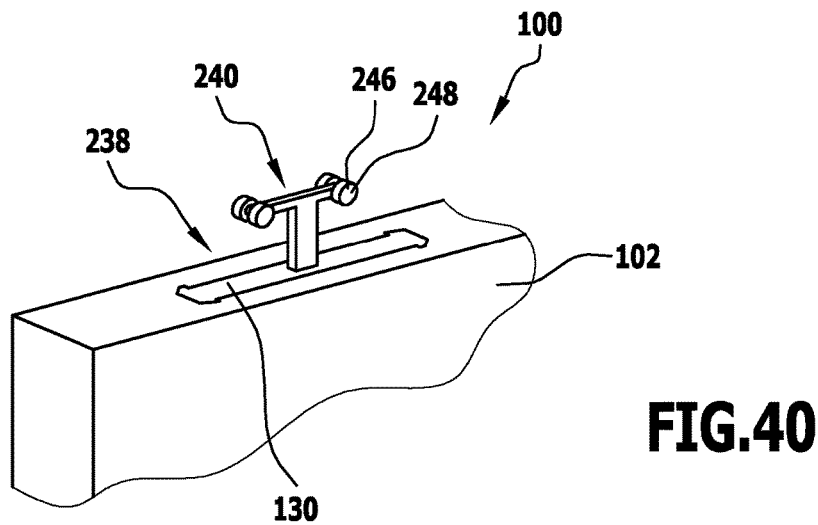
FIG. 40 a schematic perspective illustration of a twelfth embodiment of a connecting device in which there is provided a connecting element which is provided with roller elements and is movable along a guidance groove of a further connecting element of the connecting device.
Figure 41:
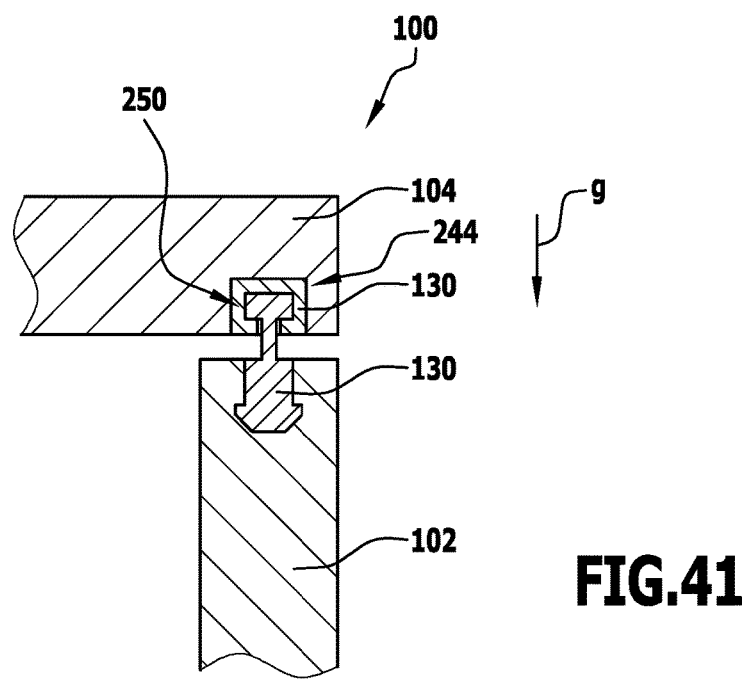
FIG. 41 a schematic vertical cross section through two parts which are connected to one another by means of the connecting device depicted in FIG. 40.

A twelfth embodiment of a connecting device 100 that is illustrated in FIGS. 40 and 41 differs from the eleventh embodiment illustrated in FIGS. 38 and 39 substantially in that the guidance element 240 comprises one or more bearing elements 246 for the purposes of displaceable mounting of the parts 102, 104 relative to each other.

In particular, the bearing elements 246 are in the form of roller elements 248.

For example, two pairs of roller elements 248 are provided.

In the twelfth embodiment of the connecting device 100 that is illustrated in FIGS. 40 and 41, the guidance groove 244 is formed by a connecting element 130 which is arranged in one of the parts 102, 104.

Hereby, the guidance groove 244 preferably comprises a guidance section 250 in which the guidance element 240 and in particular the bearing elements 246 of the guidance element 240 can engage behind the guidance groove 244.

With respect to the direction of the force of gravity g for example, the guidance groove 244 is open downwardly so that the connecting element 130 comprising the guidance element 240 together with the part 102 on which the connecting element 130 is arranged can be suspended in the guidance groove 244.

Such a connecting device 100 can then be used in particular, as a suspension for a sliding door.

In all other respects, the twelfth embodiment of a connecting device 100 that is illustrated in FIGS. 40 and 41 coincides in regard to the construction and functioning thereof with the eleventh embodiment illustrated in FIGS. 38 and 39 so that, to that extent, reference is made to the preceding description thereof.

Figure 42:
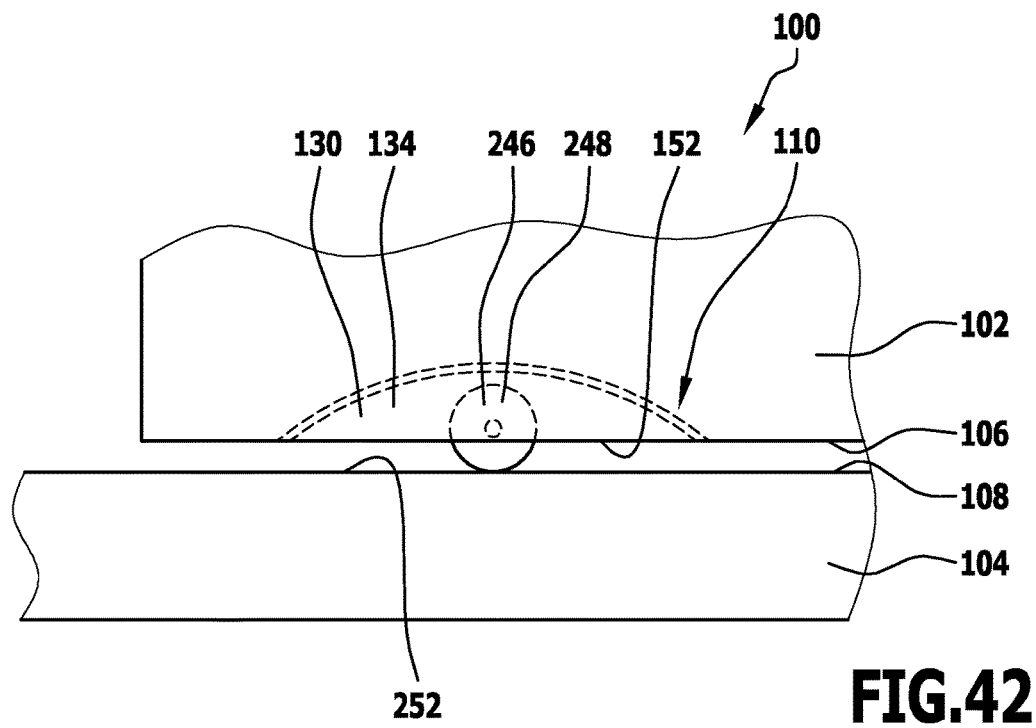
FIG. 42 a schematic partially transparent side view of a thirteenth embodiment of a connecting device in which there is provided a connecting element that is provided with a roller by means of which the part is displaceable relative to the further part.
Figure 43:
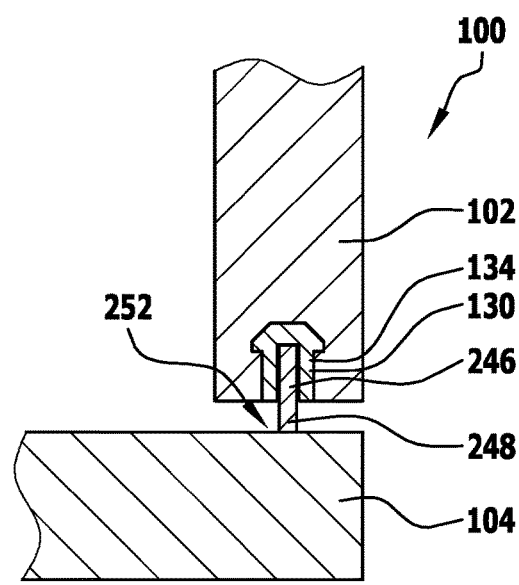
FIG. 43 a schematic vertical cross section through the two parts and the connecting device depicted in FIG. 42.

A thirteenth embodiment of a connecting device 100 that is illustrated in FIGS. 42 and 43 differs from the twelfth embodiment illustrated in FIGS. 40 and 41 substantially in that a bearing element 246 in the form of a roller element 248 is arranged on the main body 134 of the connecting element 130.

This connecting element 130 too is preferably insertable into a groove 110.

The bearing element 246 preferably projects above the bearing surface 152 of the main body 134 and above a contact surface 106 of the part 102 in which the connecting element 130 is arranged.

In particular, the bearing element 246 in the form of a roller element 248 is mounted on the main body 134 in rotary manner and can roll on a running surface 252 for example.

The running surface 252 is, for example, arranged on a further part 104 or is formed by the further part 104.

The running surface 252 can thus form a connecting element 130 of the connecting device 100 for example.

It can be advantageous for the running surface 252 to be formed by a contact surface 108 of the further part 104.

In the installed state of the connecting device 100 and the parts 102, 104, the bearing element 246 preferably abuts on the running surface 252 and is movable along the running surface 252. Consequently, the parts 102, 104 are also movable relative to each other.

In all other respects, the thirteenth embodiment of a connecting device 100 that is illustrated in FIGS. 42 and 43 coincides in regard to the construction and functioning thereof with the twelfth embodiment illustrated in FIGS. 40 and 41 so that, to that extent, reference is made to the preceding description thereof.

Figure 44:
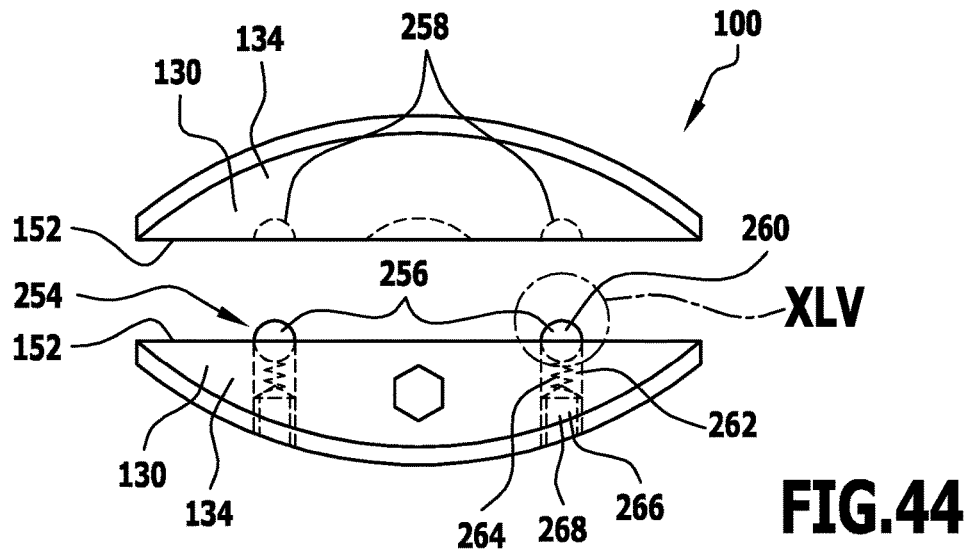
FIG. 44 a schematic partially transparent side view of a fourteenth embodiment of a connecting device in which a positioning device is provided for simplifying the positioning of the connecting elements.
Figure 45:
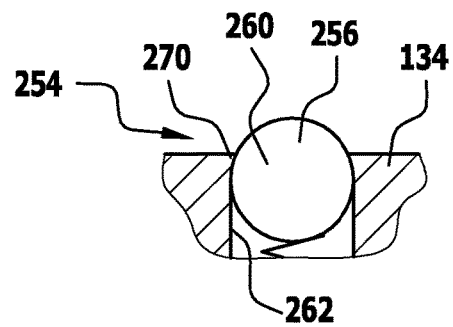
FIG. 45 an enlarged illustration of the region XLV in FIG. 44.
Figure 46:
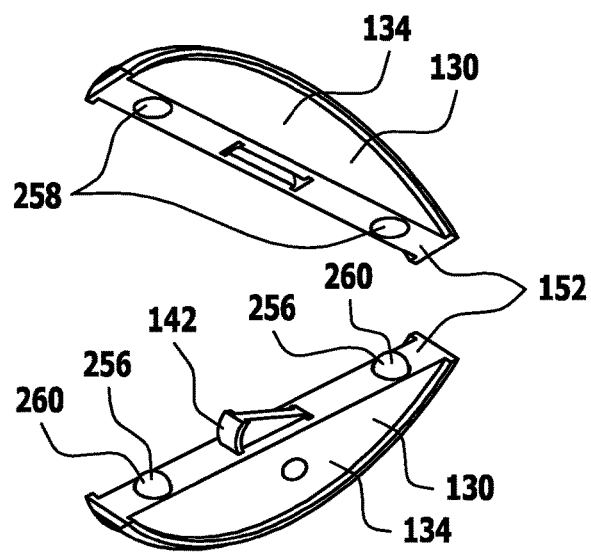
FIG. 46 a schematic perspective illustration of the connecting device depicted in FIG. 44.

A fourteenth embodiment of a connecting device 100 that is illustrated in FIGS. 44 to 46 differs from the fifth embodiment illustrated in FIGS. 23 to 26 substantially in that the connection of the connecting elements 130 to one another is producible by means of a rotatable retaining element 142 corresponding to the second embodiment that is illustrated in FIGS. 10 to 15.

In addition, no fixed plug-in projections 166 are provided in the embodiment of the connecting device 100 that is illustrated in FIGS. 44 to 46.

Rathermore, the connecting device 100 comprises a positioning device 254 for positioning the parts 102, 104 and in particular, the connecting elements 130 relative to each other.

The positioning device 254 comprises one or more positioning elements 256 and one or more positioning element seatings 258.

The positioning elements 256 are preferably mounted in moveable, yielding, resilient and/or spring-like manner.

In the embodiment of a connecting device 100 that is illustrated in FIGS. 44 to 46, there are provided two positioning elements 256 which are in the form of steel balls 260, each positioning element being displaceable within a respective through opening 262 and being arranged on one of the connecting elements 130.

In addition, a spring element 264 and a closure element 266 such as a set-screw 268 for example are arranged in each of the through openings 262.

The at least one through opening 262 is tapered towards the bearing surface 152 of the main body 134 so that one or more retaining projections 270 are formed.

Unwanted escape of a positioning element 256 and in particular a steel ball 260 from the through opening 262 can preferably be prevented by means of the retaining projections 270.

Escape of the positioning element 256 at an end of the through opening 262 opposite the bearing surface 152 is prevented by means of the closure element 266.

The spring element 264 is arranged between the closure element 266 and the positioning element 256. In this way, the positioning element 256 is preferably holdable in a positioning position in resilient yielding manner.

The positioning element 256 projects above the bearing surface 152 in this positioning position.

One or more positioning element seatings 258 are preferably formed such as to be at least partly complementary to the one or the plurality of positioning elements 256. In particular, the positioning element seatings 258 are formed such as to be complementary to the sections of the positioning elements that project above the bearing surface 152 256 in the positioning position thereof.

Due to the resilient yielding mounting of the positioning elements 256, they can be moved into the main body 134, in particular, in order to enable the connecting elements 130 and the parts 102, 104 to be displaced relative to each other whilst the bearing surfaces 152 and/or the contact surfaces 106, 108 abut one another.

As soon as the connecting elements 130 are arranged in a desired position in which the positioning elements 256 are arranged opposite the positioning element seatings 258, the positioning elements 256 are moved automatically into the positioning element seatings 258 by means of the spring elements 264.

Simple positioning of the parts 102, 104 relative to each other can be effected in this way. In addition for example, the parts 102, 104 can thereby be latched to one another in order to facilitate the actuation of the retaining element 142 for the purposes of stably connecting the parts 102, 104 to one another.

In particular, provision may also be made for the connecting device 100 to comprise exclusively a positioning device 254 but no retaining element 142 for the purposes of bonding the parts 102, 104 to one another.

The fourteenth embodiment of a connecting device 100 that is illustrated in FIGS. 44 to 46 is suitable, in particular, for the assembly of push-in shelves, partition walls, rear walls, cabinet elements, etc.

Furthermore, the connecting device 100 can be used as a bonding aid in places in which pressure cannot be applied and in which pushing together or other processes of bringing two connecting elements 130 into engagement with one another is impossible.

In all other respects, the fourteenth embodiment of the connecting device 100 that is illustrated in FIGS. 44 to 46 coincides in regard to the construction and functioning thereof with the fifth embodiment illustrated in FIGS. 23 to 26 so that, to that extent, reference is made to the preceding description thereof.

Figure 47:
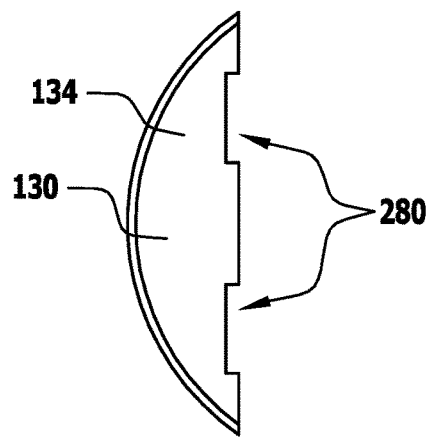
FIG. 47 a schematic side view of a fifteenth embodiment of a connecting device in which the connecting device forms a hinge and in particular a door hinge.
Figure 48:
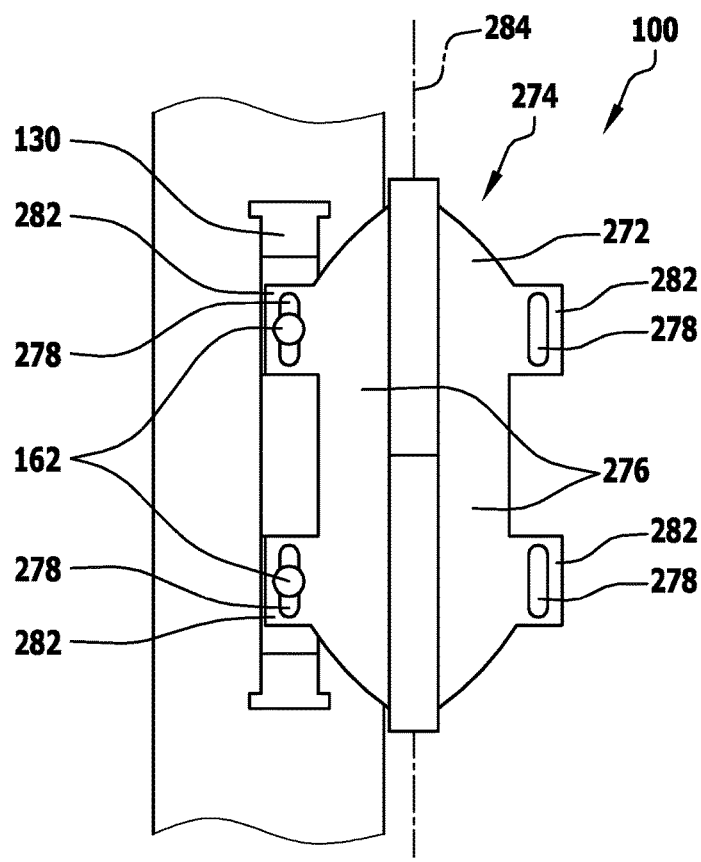
FIG. 48 a schematic plan view of a contact surface of a part, wherein a connecting element of the connecting device depicted in FIG. 47 is arranged in the part and wherein a hinge element is arranged on the connecting element.
Figure 49:
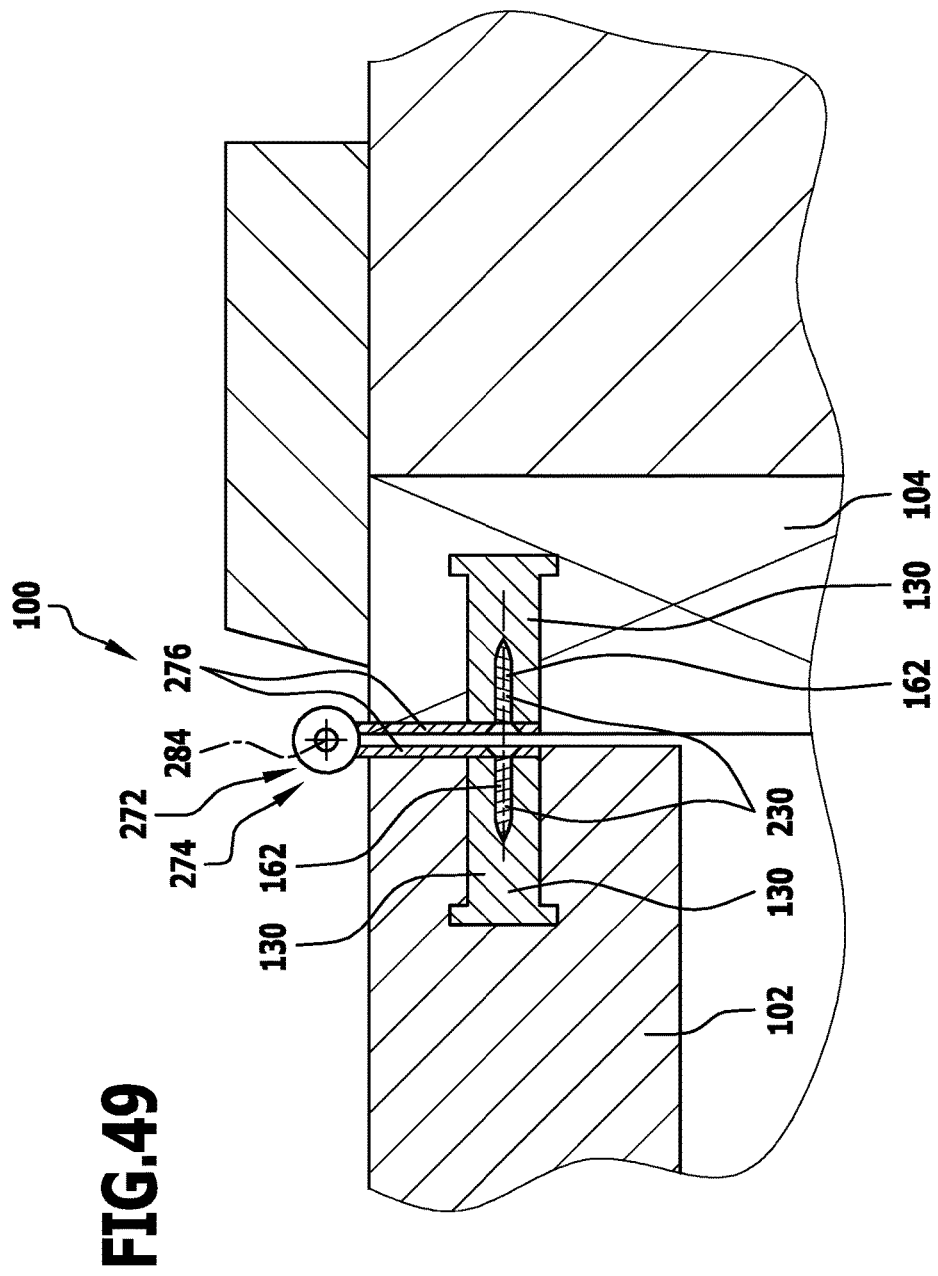
FIG. 49 a schematic vertical cross section through two parts which are connected to one another by means of the connecting device depicted in FIG. 47.

A fifteenth embodiment of a connecting device 100 that is illustrated in FIGS. 47 to 49 differs from the ninth embodiment illustrated in FIGS. 32 to 34 substantially in that the connecting elements 130 and thus too the parts 102, 104 are connectable or are connected to one another by means of a hinge element 272 of a hinge device 274.

Hereby, two connecting elements 130 that are insertable into a respective groove 110 in one of the parts of 102, 104 are provided.

Each of the connecting elements 130 comprises two screw seatings 230 for accommodating screws 162.

The hinge element 272 comprises two sections 276 that are pivotal relative to each other.

Each of the sections 276 comprises two elongate holes 278 through which the screws 162 are passed and which are provided for the purposes of fixing the respective section 276 to one of the connecting elements 130.

Recesses 280 can be provided in the connecting elements 130 for simple and/or aesthetically appropriate mounting of the hinge element 272 on the connecting elements 130.

In particular, protruding latches 282 of the sections 276 of the hinge element 272 are receivable in these recesses 280.

The elongate holes 278 are preferably arranged and/or formed in these latches 282.

The hinge element 272 can, for example, be a metallic part or be formed from metallic parts.

As can be perceived from FIG. 49 in particular, the connecting elements 130 and the parts 102, 104 are pivotal about a pivotal axis 284 by means of the hinge element 272.

The fifteenth embodiment of a connecting device 100 that is illustrated in FIGS. 47 to 49 is suitable, in particular, for use as a door hinge.

In all other respects, the fifteenth embodiment of a connecting device 100 that is illustrated in FIGS. 47 to 49 coincides in regard to the construction and functioning thereof with the ninth embodiment illustrated in FIGS. 32 to 34 so that, to that extent, reference is made to the preceding description thereof.

A sixteenth embodiment of a connecting device 100 that is illustrated in FIGS. 50 to 53 differs from the sixth embodiment illustrated in FIGS. 27 and 28 substantially in that a locking device is provided for connecting the two connecting elements 130 to one another in place of a screw connection.

To this end, the connecting device 100 comprises a movable and in particular linearly displaceable locking bar element 286.

The locking bar element 286 is a component of a connecting element 130 which is insertable into a groove 110 and which, in addition to the main body 134 and the locking bar element 286, comprises a drive shaft 288 and one or more magnet elements 190 for driving the drive shaft 288.

Figure 52:
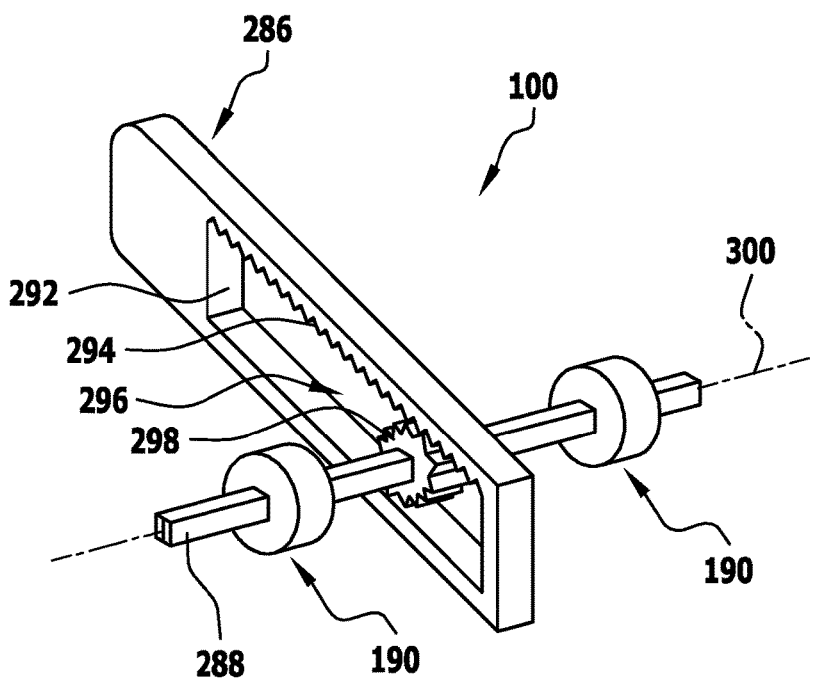
FIG. 52 a schematic perspective illustration of the locking bar element and of a drive shaft for propelling the locking bar element.
Figure 53:
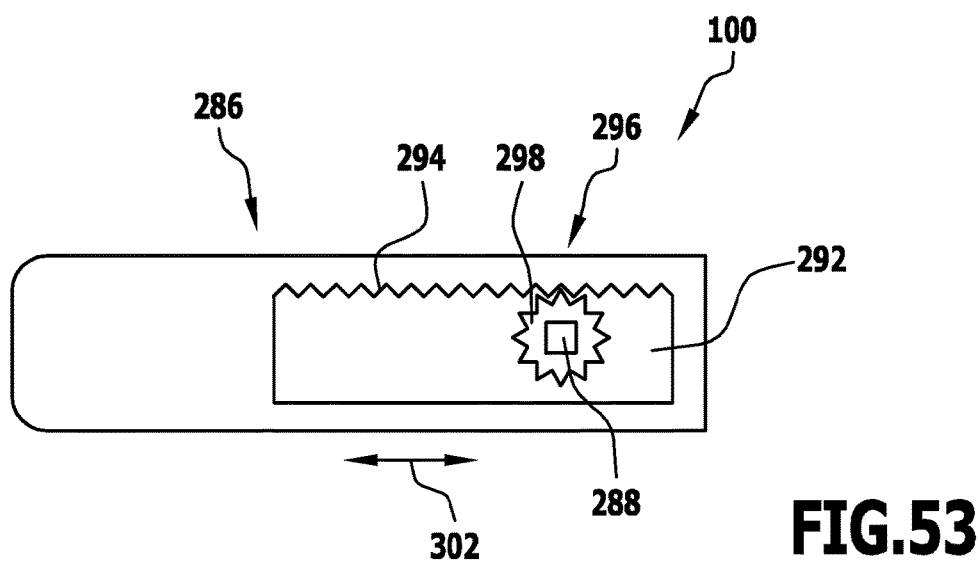
FIG. 53 a schematic section through the locking bar element and the drive shaft depicted in FIG. 52.

As can be perceived from FIGS. 52 and 53 in particular, the locking bar element 286 has an opening 292 which is substantially parallelepipedal and comprises a toothed rack section 294 of a rack-and-pinion device 296 on one side thereof.

In particular, the toothed rack section 294 is in engagement with a pinion 298 of the rack-and-pinion device 296 which is arranged on the drive shaft 288.

The magnet elements 190 are also arranged on the drive shaft 288 so that the drive shaft 288 is rotatable together with the pinion 298 about a rotational axis 300 by means of the magnet elements 190, in particular, by external contactless actuation by means of a magnet device.

Due to the coupling of the pinion 298 to the toothed rack section 294 of the locking bar element 286, the locking bar element 286 is linearly displaceable, in particular, along a locking direction 302 by rotation of the drive shaft 288.

In particular, the locking direction 302 is substantially perpendicular to the bearing surface 152 and/or to the contact surface 106, 108 of at least one of the parts 102, 104.

The locking bar element 286 is accommodated or is accommodable in linearly displaceable manner in a locking bar element seating 304 of the main body 134 that is substantially complementary thereto.

The drive shaft 288 together with the magnet elements 190 and the pinion 298 is receivable or is accommodated in a shaft seating 306 of the main body 134 of the connecting element 130.

The locking bar element 286 is preferably movable along the locking direction 302 into the main body 134 to such an extent that the locking bar element 286 no longer projects above the bearing surface 152 and/or the contact surface 106, 108 of at least one part 102, 104.

In this position however, the locking bar element 286 may nevertheless project above the main body 134 at an end of the locking bar element seating 304 opposite the bearing surface 152 of the main body 134.

Figure 51:
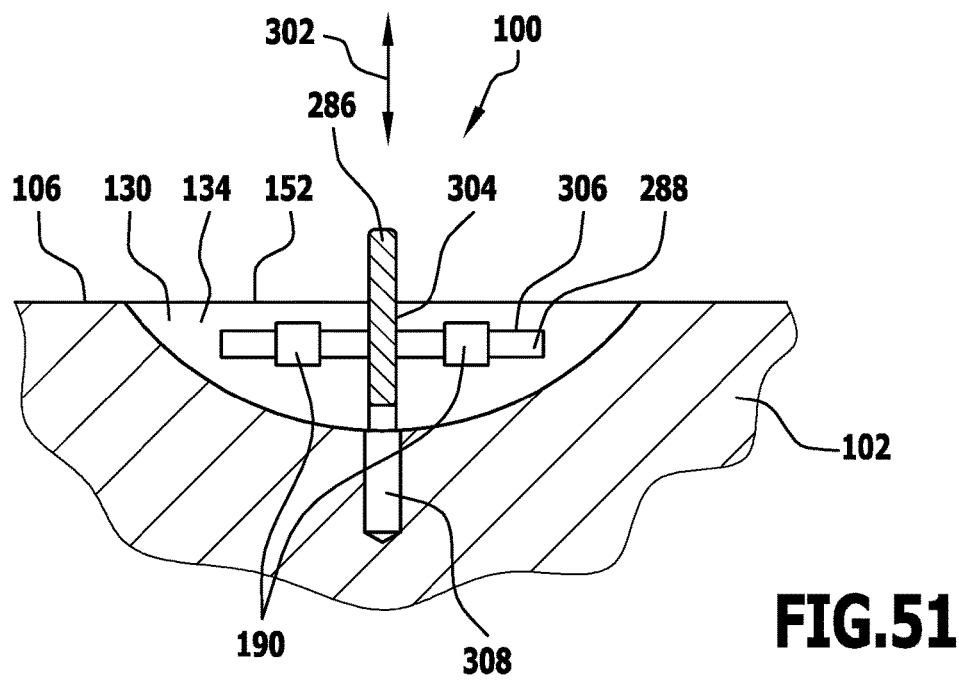
FIG. 51 a schematic vertical longitudinal section through a connecting element of the connecting device depicted in FIG. 50 which is provided with a locking bar element.

Consequently, this position of the locking bar element 286 can only be realized if the main body 134 is of sufficiently large dimensions as to accommodate the entire locking bar element 286 or if the part 102, in which the connecting element 130 comprising the locking bar element 286 is arranged, is provided with a recess 308 which adjoins the locking bar element seating 304 in the locking direction 302 (see FIG. 51).

Figure 50:
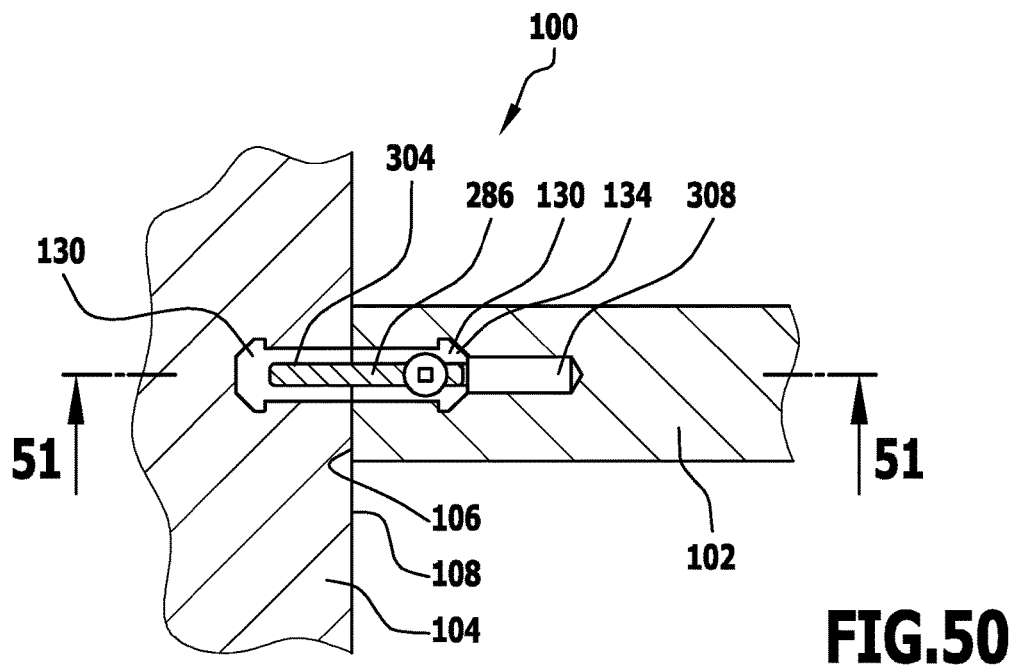
FIG. 50 a schematic vertical cross section through a sixteenth embodiment of a connecting device in which a magnetically displaceable locking bar element is provided.

For the purposes of locking two parts 102, 104 together by means of the connecting device 100, the locking bar element 286 is moveable into the locking device position illustrated in FIGS. 50 and 51 for example wherein the locking bar element 286 projects above the bearing surface 152 of the connecting element 130 and above the contact surface 106 of the part 102.

Then for example, the locking bar element 286 extends into a locking bar element seating 304 of a further connecting element 130 which is arranged in the further part 104. As an alternative or in addition thereto, provision may be made for the further part 104 to merely comprise a recess 308 for accommodating the locking bar element 286.

For the purposes of optimizing the transmission of torque from the magnet elements 190 to the drive shaft 288 and/or the pinion 298, there is provided, in particular, a drive shaft 288 having a non-rotationally symmetrical cross section such as a rectangular cross section for example. The magnet elements 190 and the pinion 298 then preferably comprise seatings corresponding thereto.

The drive shaft 288 can be a bar magnet for example.

Preferably, the magnet elements 190, the drive shaft 288, the pinion 298 and/or the toothed rack section 294 of the locking bar element 286 are dimensioned, formed and/or arranged in such a way that the locking bar element 286 is moveable from a retaining position into a release position, in particular, from a locking position into a release position by a rotation of the drive shaft 288 through 180°.

The locking bar element 286 can then be moved into the different desired positions in a particularly simple manner by placing a magnet on different side surfaces of the part 102.

The sixteenth embodiment of the connecting device 100 that is illustrated in FIGS. 50 to 53 is suitable, in particular, for use as a furniture lock, as a shelf connector and/or for the mounting of wall panels.

In all other respects, the sixteenth embodiment of the connecting device 100 that is illustrated in FIGS. 50 to 53 coincides in regard to the construction and functioning thereof with the sixth embodiment illustrated in FIGS. 27 and 28 so that, to that extent, reference is made to the preceding description thereof.

Figure 54:
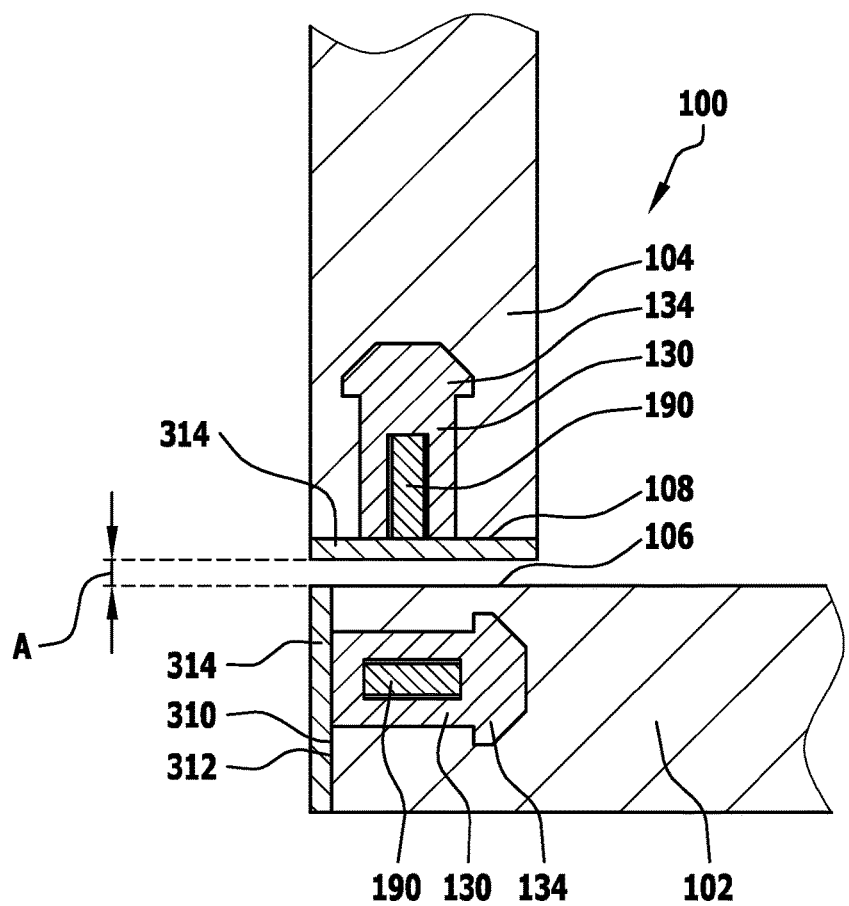
FIG. 54 a schematic cross section through a seventeenth embodiment of a connecting device and two parts that are connected to one another by means of the connecting device, wherein the connecting device comprises two magnetically interacting elements.

A seventeenth embodiment of a connecting device 100 that is illustrated in FIG. 54 differs from the sixteenth embodiment illustrated in FIGS. 50 to 53 substantially in that there are provided two connecting elements 130 which each comprise at least one magnet element 190.

Hereby for example, the magnet element 190 can be entirely integrated into the main body 134 of a connecting element 130, and in particular, be arranged within the main body 134 such as to be spaced from the bearing surface 152 of the main body 134.

Provision may also be made however for the magnet element 190 to extend within the main body 134 up to the bearing surface 152.

In the seventeenth embodiment of the connecting device 100 that is illustrated in FIG. 54, a connection of the connecting elements 130 and thus too of the parts 102, 104 to one another is effected in that the magnet elements 190 interact magnetically with one another, in particular, in that the magnet elements 190 attract one another.

The parts 102, 104 are thus brought by means of the connecting device 100 into a position in which the spacings of the magnet elements 190 from each other are minimal.

Thereby, the parts 102, 104 do not necessarily have to be in contact with one another and in particular do not have to abut against each other. Rathermore, provision may be made for the parts 102, 104 to be arranged at a desired spacing A from each other.

Likewise, the connecting elements 130 of the connecting device 100 do not have to be brought into engagement with one another mechanically.

Consequently, it is not crucial for the connecting elements 130 to be arranged in grooves 110 which border on the contact surfaces 106, 108 of the parts 102, 104.

Rathermore for example, provision may be made for at least one connecting element 130 to be arranged in a groove 110 which borders a side surface 310, an end face 312 of the part 102 for example, that is oriented perpendicularly to the contact surface 106.

In particular, for the purpose of obtaining an aesthetically appealing arrangement of the parts 102, 104, provision may be made for the surfaces 108, 310, in which the grooves 110 and thus too the connecting elements 130 are arranged, to be provided with a respective cover element 314 after mounting the connecting elements 130.

For example, the cover element 314 can form an edge of the part 102, 104.

In principle and as already indicated in the preceding exemplary embodiments, a magnet element 190 is to be understood as being a magnetically interacting element.

The two magnet elements 190 thus do not necessarily both have to be magnetized. Rathermore for example, a magnetized magnet element 190 and a magnetizable element and in particular a steel element could be provided.

The seventeenth embodiment of the connecting device 100 that is illustrated in FIG. 54 is suitable, in particular, for use in or on furniture doors and office furniture having invisible, rapidly mountable snap-action devices for fixing magnetically to a door.

In all other respects, the seventeenth embodiment of a connecting device 100 that is illustrated in FIG. 54 coincides in regard to the construction and functioning thereof with the sixteenth embodiment illustrated in FIGS. 50 to 53 so that, to that extent, reference is made to the preceding description thereof.

Figure 55:
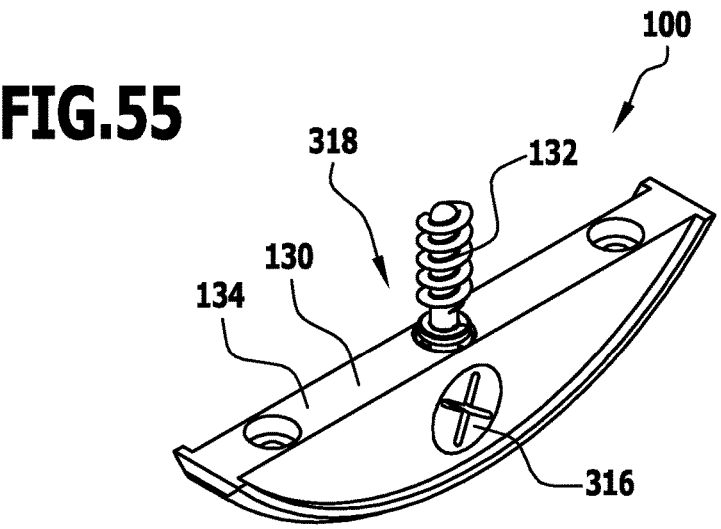
FIG. 55 a schematic perspective illustration of an eighteenth embodiment of a connecting device in which a retaining element in the form of angle-driven screws is provided.
Figure 56:
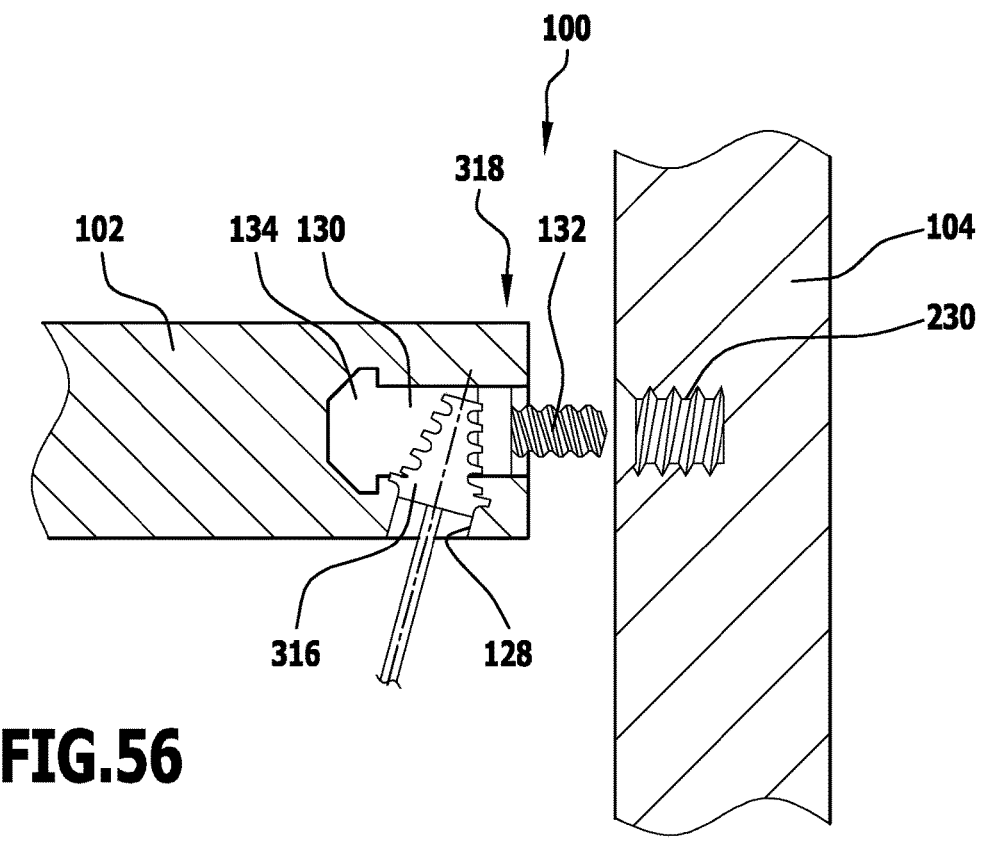
FIG. 56 a schematic cross section through the connecting device depicted in FIG. 55 and the parts that are to be interconnected by means of the connecting device.

An eighteenth embodiment of a connecting device 100 that is illustrated in FIGS. 55 and 56 differs from the first embodiment illustrated in FIGS. 5 to 9 substantially in that the screw element 132 is arranged on the connecting element 130 that is insertable into a groove 110 in rotatable manner.

In place of a rotatable retaining element 142 for engaging the screw element 132, an actuating element 316 for operating the screw element 132 is provided instead.

In particular thereby, the actuating element 316 and the screw element 132 form an angle-driven screw device 318.

As can be perceived from FIG. 56 in particular, the angle-driven screw device 318 and in particular the actuating element 316 is accessible laterally through an access boring 128 in a part 102. On the one hand, the screw element 132 can be screwed directly into the further part 104 without further elements.

However provision may also be made for the further part 104 to comprise a screw seating 230, to be provided with a screw seating 230 or to be provided with a connecting element 130 which is arrangeable in a groove 110 in the part 104 and which is itself provided with a screw seating 230.

As an alternative to operation of a screw element 132 by means of the actuating element 316, provision may also be made for a nut to be operable by means of the actuating element 316 in order to accommodate a screw arranged on the further part 104.

In particular, connections to non-wooden materials can be established by means of connecting devices 100 of this type. Furthermore, these connecting devices 100 are suitable for use in or as shelf supports.

In all other respects, the eighteenth embodiment of a connecting device 100 that is illustrated in FIGS. 55 and 56 coincides in regard to the construction and functioning thereof with the first embodiment illustrated in FIGS. 5 to 9 so that, to that extent, reference is made to the preceding description thereof.

Figure 57:
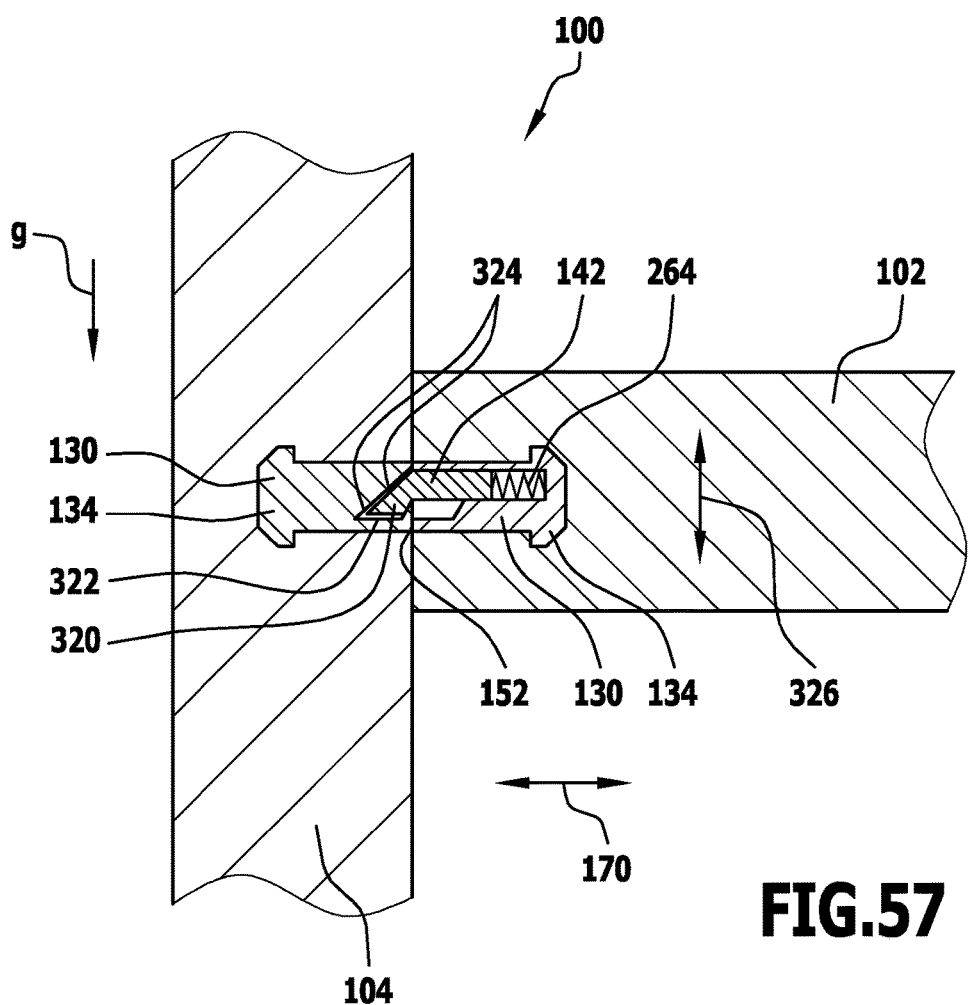
FIG. 57 a schematic cross section through a nineteenth embodiment of a connecting device in which a retaining element in the form of a spring-loaded latch hook is provided for the connection of two connecting elements.

A nineteenth embodiment of a connecting device 100 that is illustrated in FIG. 57 differs from the ninth embodiment illustrated in FIGS. 32 to 34 substantially in that one of the connecting elements 130 comprises a moveable retaining element 142 which is in the form of a latch hook 320.

In particular, the latch hook 320 is moveable into engagement with a latch seating 322 which is arranged on the further connecting element 130.

In particular, the latch hook 320 is arranged on the one connecting element 130 in spring-like manner by means of a spring element 264.

In particular, the latch hook 320 can be moved along the direction of connection 170 from a rest position (see FIG. 57) in which the latch hook 320 projects above the bearing surface 152 of the connecting element 130 into a release position in which the latch hook 320 is arranged substantially entirely within the main body 134 of the connecting element 130.

The latch hook 320 and/or the latch seating 322 is preferably provided with at least one inclined surface 324.

In particular, the inclined surface 324 is inclined to the bearing surface 152 and/or to the contact surfaces 106, 108 of the parts 102, 104.

The inclined surfaces 324 thereby enable the latch hook 320 to be pushed into the main body 134 when the parts 102, 104 and thus too the connecting elements 130 are displaced in a transverse direction 326 running parallel to the bearing surface 152 and/or to the contact surfaces 106, 108.

Preferably however, this is only possible in a single transverse direction 326.

Hereby, the parts 102, 104 and the connecting elements 130 are preferably formed and/or arranged in such a way that this transverse direction 326 is opposed to the direction of the force of gravity g for the purposes of disengaging the latch hook 320.

When the part 102 is subjected to a load in a transverse direction 326 running parallel to the direction of the force of gravity g, the latch hook 320 preferably remains in the latch seating 322 so as to ensure a reliable and stable connection between the parts 102, 104.

The nineteenth embodiment of a connecting device 100 that is illustrated in FIG. 57 is suitable, in particular, for use as shelf supports.

In all other respects, the nineteenth embodiment of a connecting device 100 that is illustrated in FIG. 57 coincides in regard to the construction and functioning thereof with the ninth embodiment illustrated in FIGS. 32 to 34 so that, to that extent, reference is made to the preceding description thereof.

Figure 58:
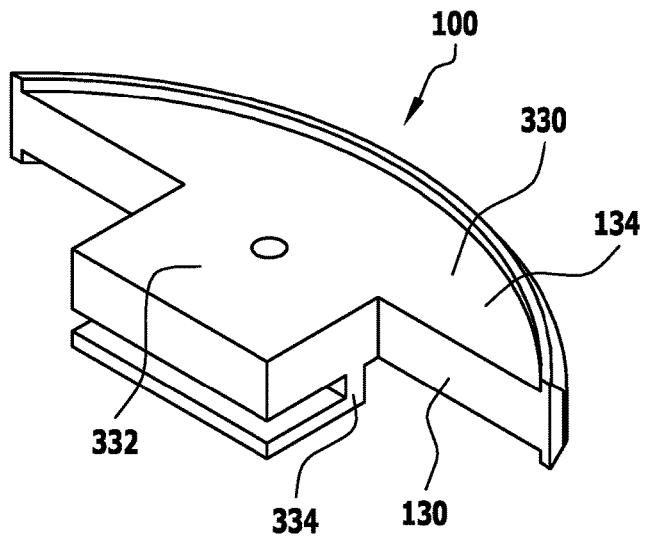
FIG. 58 a schematic perspective illustration of a twentieth embodiment of a connecting device in which a connecting element in the form of a decking connector is provided.
Figure 59:
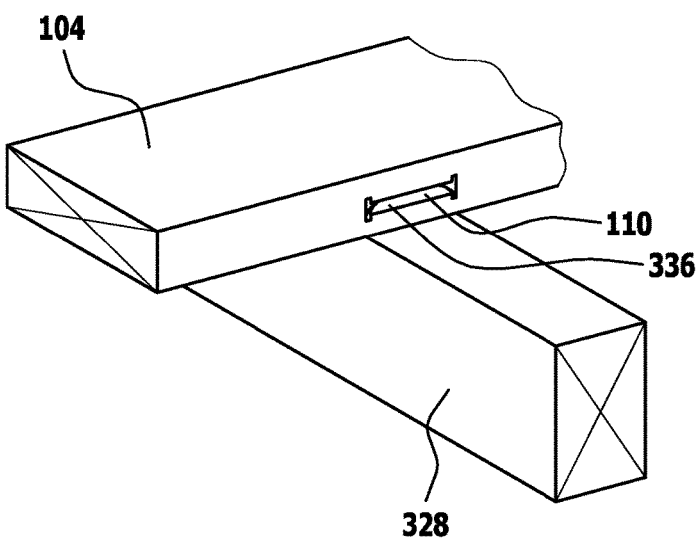
FIG. 59 a schematic perspective illustration of a part which is fixable to a base construction by means of the connecting device depicted in FIG. 58.
Figure 60:
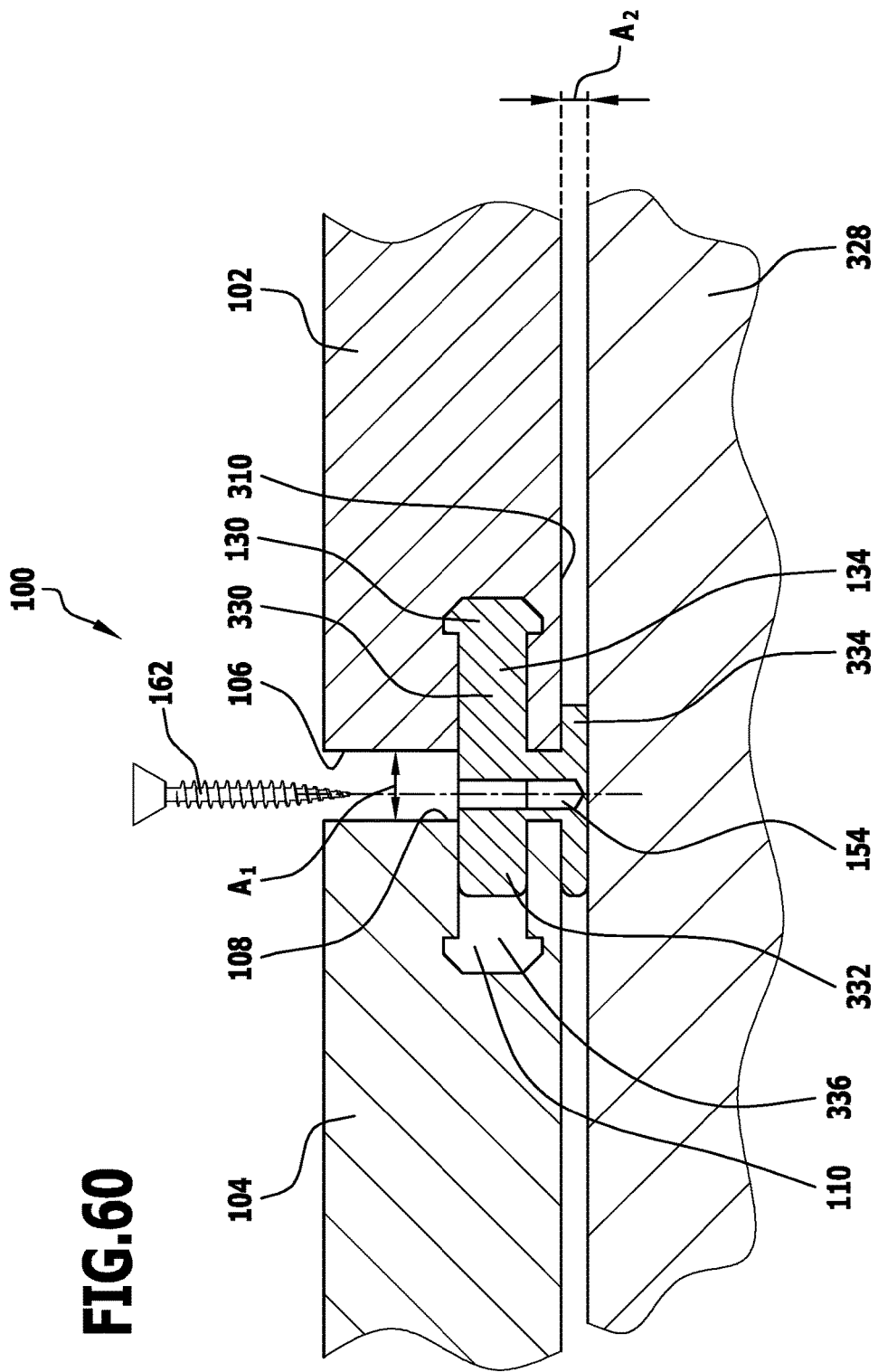
FIG. 60 a schematic vertical cross section through the connecting device depicted in FIG. 58 and the two parts which are fixed to a base construction thereby.

A twentieth embodiment of a connecting device 100 that is illustrated in FIGS. 58 to 60 differs from the ninth embodiment illustrated in FIGS. 32 to 34 substantially in that the connecting device 100 serves on the one hand for the connection of two parts 102, 104 and on the other hand, for the connection of the parts 102, 104 to one or more further parts and in particular to a base construction 328.

In particular, a base construction 328 is a sub-construction of a floor covering or a wall panel.

As can be perceived from FIGS. 58 and 60 in particular, the connecting device 100 comprises a connecting element 130 which is insertable into a groove 110 in one of the parts 102, 104.

For example, the connecting element 130 is formed in one-piece manner and comprises, in addition to a part 330 that is introducible into the groove 110, a projection 332 as well as an embracing section 334.

The projection 332 serves, in particular, for the arrangement and/or accommodation of the further part 104.

To this end in particular, the further part 104 is adapted to be pushed onto the projection 332 by means of a recess 336 such as a groove 110 for example.

The embracing section 334 of the connecting element 130 then embraces the part 102 on a side surface 310 thereof running transversely and in particular substantially perpendicularly to the contact surface 106.

The connecting element 130 thus surrounds a section of the part 102 in substantially a C-shape.

The embracing section 334 can, for example, extend parallel to the projection 332 so that the further part 104 is also enclosed in substantially a C-shape by the connecting element 130 in the installed state thereof.

As can be perceived from FIG. 60 in particular, a through opening 154 is provided between the projection 332 and the part 330 of the connecting element 130 forming the main body 134 of the connecting element 130.

A screw 162 is introducible into this through opening 154 particularly in order to fix the connecting element 130 including the part 102 or including both parts 102, 104 to the base construction 328 and in particular to screw it firmly thereto.

One or more parts 102, 104 preferably do not abut directly upon the base construction 328 due to the embracing section 334 of the connecting element 130.

Rather, a spacing $A_2$ between the one or the plurality of parts 102, 104 is preferably formed by means of the embracing section 334.

Furthermore, the parts 102, 104 are also preferably held away from each other by a given spacing $A_1$ by means of the connecting element 130.

The twentieth embodiment of the connecting device 100 that is illustrated in FIGS. 58 to 60 is suitable, in particular, as a decking connector for the connection of boards (parts 102, 104) to one another and to a decking-beam construction (base construction 328).

For the mounting process hereby, provision may be made for a part 102 to be provided with one or more grooves 110 for example.

At least one groove 110 is then provided with a connecting element 130 by pushing the part 330 of the connecting element 130 that forms the main body 134 into the groove 110.

The embracing section 334 of the connecting element 130 thereby encloses the part 102 at the side surface 310 thereof.

In a next step, the part 102 together with the connecting element 130 is laid on the base construction 328.

In particular, the embracing section 334 of the connecting element 130 and the base construction 328 are brought into mutual abutment and screwed together by means of one or more screws 162.

A further part 104 is then fixed to the base construction 328 by pushing a pre-prepared recess 336 or groove 110 onto the projection 332 of the connecting element 130.

A further groove 110 into which a further connecting element 130 is in turn inserted is located or is provided on a side of the part 104 that is located opposite that side of the part 104 which serves to accommodate the projection 332 in order to fix it, together with the further part 104, to the base construction 328.

The screws 162 merely have to be removed in order to release the connection.

Preferably, the parts 102, 104 can then be displaced relative to each other in order to remove individual parts 102, 104.

In all other respects, the twentieth embodiment of a connecting device 100 that is illustrated in FIGS. 58 to 60 coincides in regard to the construction and functioning thereof with the ninth embodiment illustrated in FIGS. 32 to 34 so that, to that extent, reference is made to the preceding description thereof.

Figure 61:
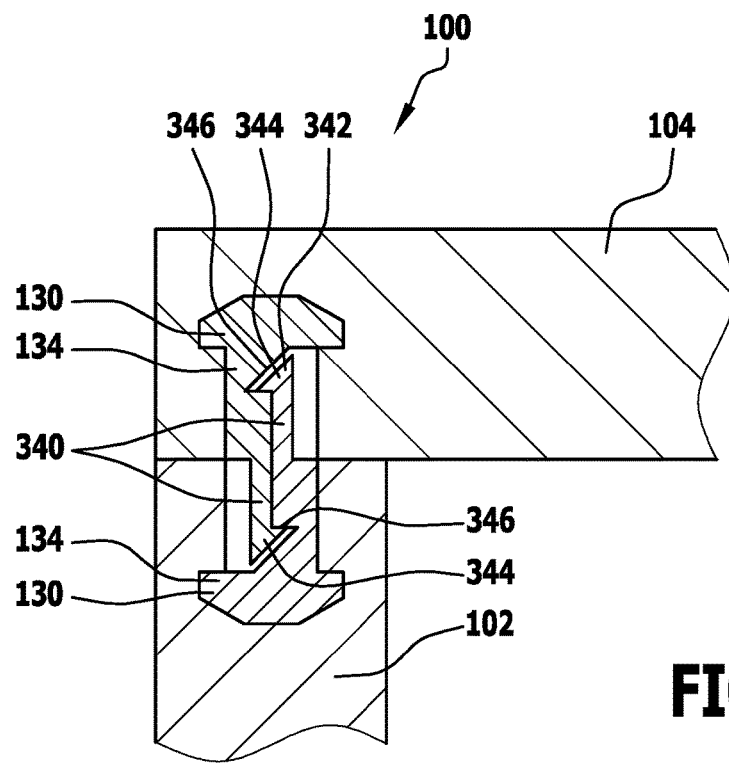
FIG. 61 a schematic cross section through a twenty-first embodiment of a connecting device in which connecting elements provided with latching elements are provided.
Figure 62:
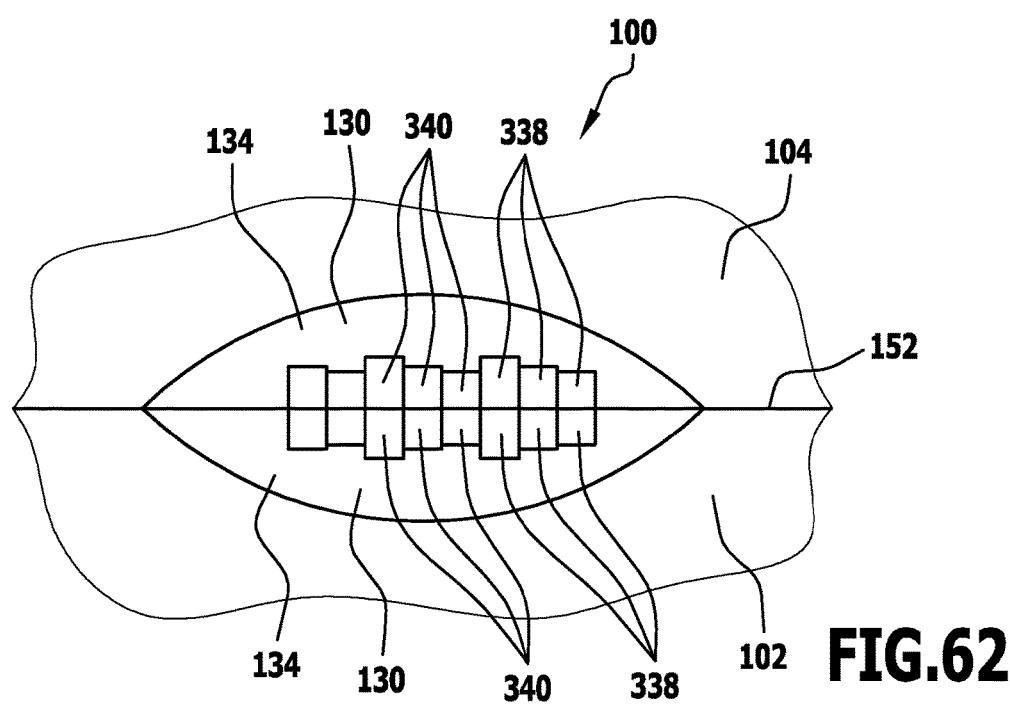
FIG. 62 a schematic longitudinal section through the connecting device depicted in FIG. 61.
Figure 63:
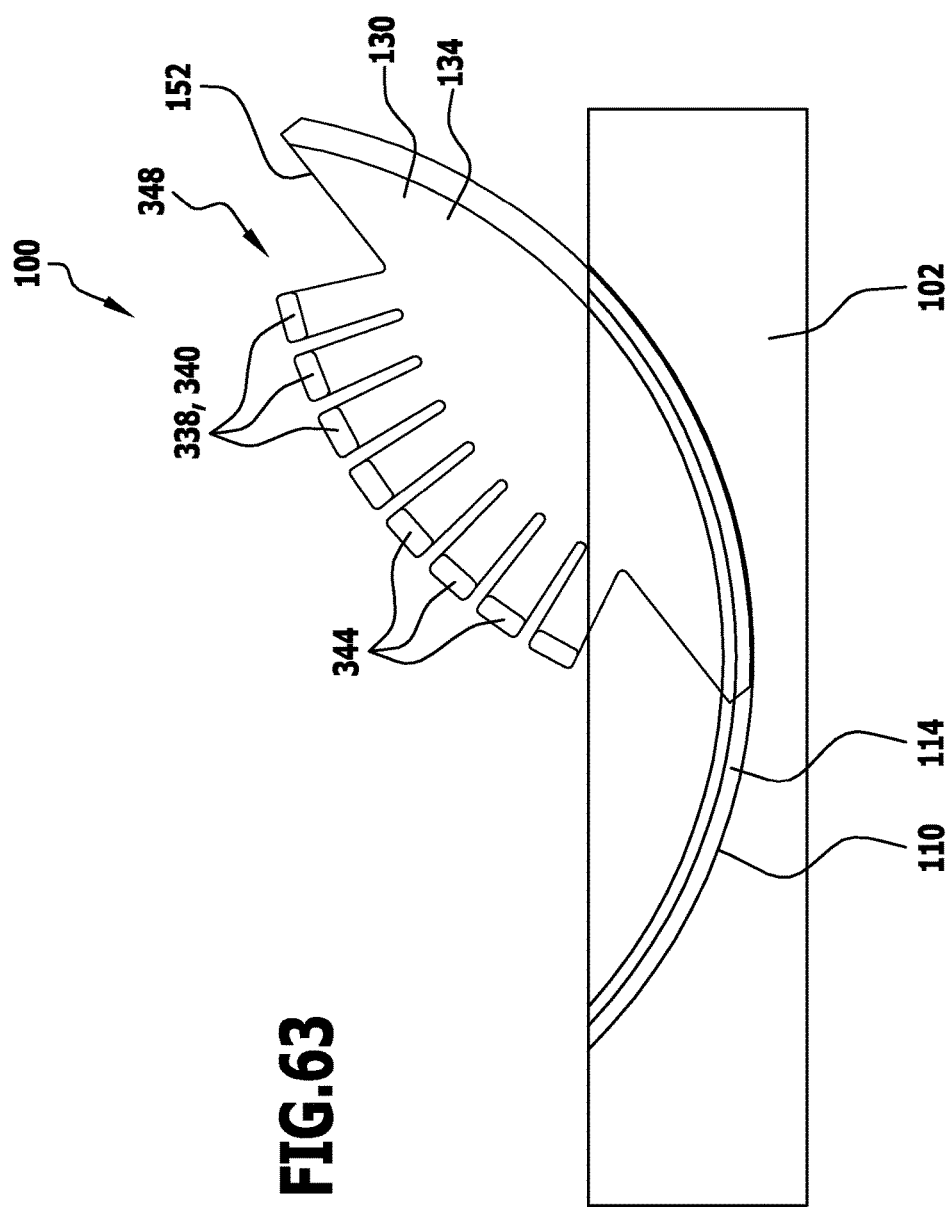
FIG. 63 a schematic partially transparent side view of a twenty-second embodiment of a connecting device in which spring elements having latch noses arranged in a row in the form of an arc of a circle are provided.

A twenty-first embodiment of a connecting device 100 that is illustrated in FIGS. 61 and 62 differs from the ninth embodiment illustrated in FIGS. 32 to 34 substantially in that the connecting device 100 comprises a plurality of spring elements 338 or latching elements 340 by means of which the connecting elements 130 and thus too the parts 102, 104 are connectable to one another, particularly in latchable manner.

Hereby, the spring elements 338 or latching elements 340 comprise spring noses 342 or latch noses 344 which are moveable into engagement with corresponding seatings 346.

For simplifying reference thereto hereinafter, the spring elements 338 and the latching elements 340 will be referred to as a whole as "latching elements 340".

In consequence, the spring noses 342 and the latch noses 344 will be referred to as a whole as "latch noses 344".

As can be perceived particularly from FIG. 61 in the case of the twenty-first embodiment of a connecting device 100 that is illustrated in FIGS. 61 and 62, both connecting elements 130 are provided with latching elements 340 and with seatings 346 for the latch noses 344 of the latching elements 340.

Hereby, the latching elements 340 and the seatings 346 are arranged relative to each other in such a way that two latching elements 340 of different connecting elements 130 can be guided past each other and brought into engagement with the respectively associated seating 346.

As can be perceived from FIG. 62 in particular, provision may be made for example for each connecting element 130 to comprise eight latching elements 340 and eight seatings 346.

Hereby, the latch noses 344 of the latching elements 340 are preferably arranged at different spacings from the bearing surface 152 of the respective connecting element 130. Improved latching of the connecting elements 130 and thus improved connection of the parts 102, 104 can thereby be achieved.

As can be perceived from FIG. 61 for example, adjacent latching elements 340 are preferably oriented in such a way that the latch noses 344 of the latching elements 340 project away from one another in different directions.

In addition, provision may be made for each connecting element 130 itself to comprise two or more latching elements 340 which are arranged next to each other, wherein directly bordering latching elements 340 are preferably formed and/or arranged in such a manner that their latch noses 344 project away from each other in different directions.

In all other respects, the twenty-first embodiment of a connecting device 100 that is illustrated in FIGS. 61 and 62 coincides in regard to the construction and functioning thereof with the ninth embodiment illustrated in FIGS. 32 to 34 so that, to that extent, reference is made to the preceding description thereof.

A twenty-second embodiment of a connecting device 100 that is illustrated in FIGS. 63 to 67 differs from the twenty-first embodiment illustrated in FIGS. 61 and 62 substantially in that there is provided only one connecting element 130 which comprises spring elements 338 and/or latching elements 340.

In regard to this embodiment too, standardized reference will be made exclusively to latching elements 340 in the following. However, these latching elements 340 could also be simple spring elements 338.

In the case of the twenty-second embodiment of a connecting device 100 that is illustrated in FIGS. 63 to 67, there is provided one connecting element 130 which is introducible into a groove 110 and which has two rows 348 of latching elements 340.

The rows 348 are arranged in parallel with each other.

Latch noses 344 of the latching elements 340 of a row 348 project away in the same direction.

Hereby, the latch noses 344 of each one of the rows 348 are arranged along a path in the form of an arc of a circle.

As can be perceived from FIGS. 65 and 67 in particular, the latching elements 340 are arranged in such a way that the latch noses 344 of the latching elements 340 project away in a direction turned away from the respective other row 348.

Hereby, the length of the latching elements 340, i.e. the spacing of the latch noses 344 of the latching elements 340 from the bearing surface 152 of the connecting element 130 is preferably selected in such a way that the latch noses 344 are insertable into a groove 110 of the type illustrated in FIGS. 1 to 4 and are latchable on the undercut surfaces 122 of the groove 110.

A simple latching connection between two parts 102, 104 can thus be established using just one connecting element 130 and two grooves 110.

Preferably the latch noses 344 are provided with (not illustrated) inclined surfaces so that the parts 102, 104 can be drawn together by the process of latching the latch noses 344.

In all other respects, the twenty-second embodiment of a connecting device 100 that is illustrated in FIGS. 63 to 67 coincides in regard to the construction and functioning thereof with the twenty-first embodiment illustrated in FIGS. 61 and 62 so that, to that extent, reference is made to the preceding description thereof.

Figure 68:
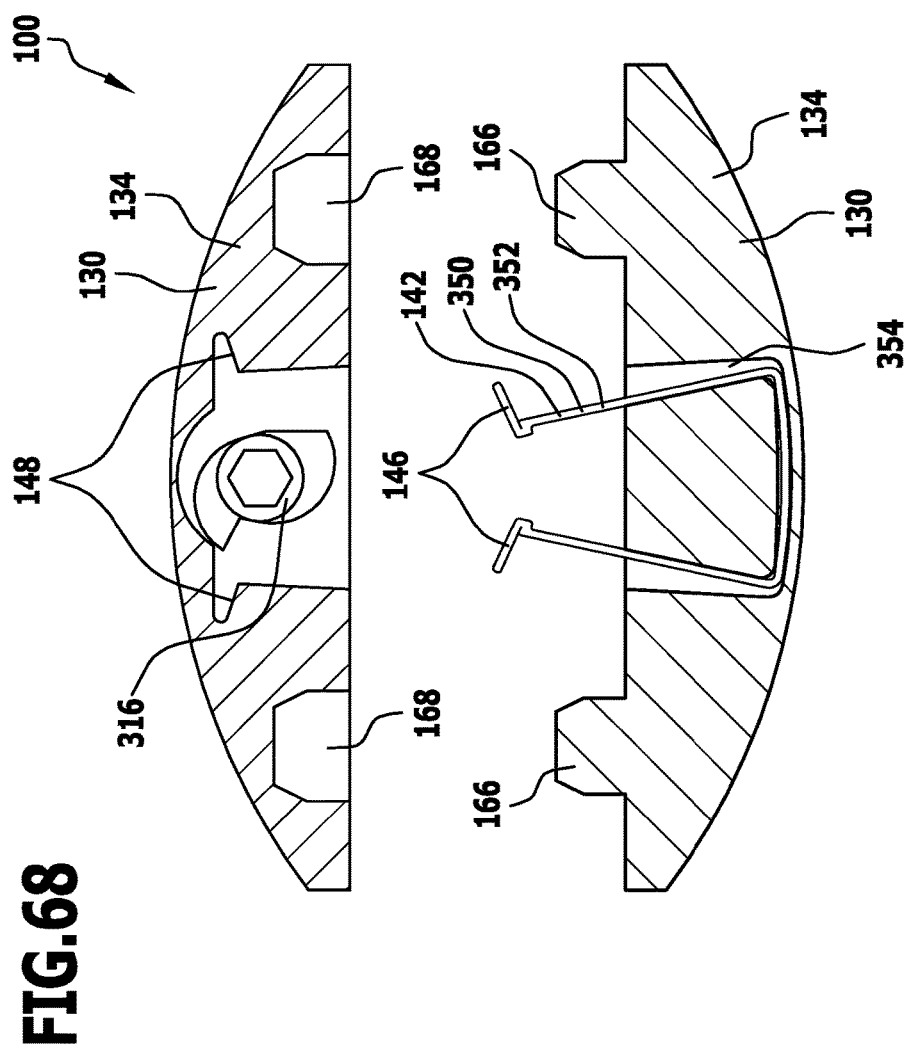
FIG. 68 a schematic vertical longitudinal section through a twenty-third embodiment of a connecting device in which a connecting element provided with a retaining element and a further connecting element provided with an actuating element for actuating the retaining element are provided.
Figure 69:
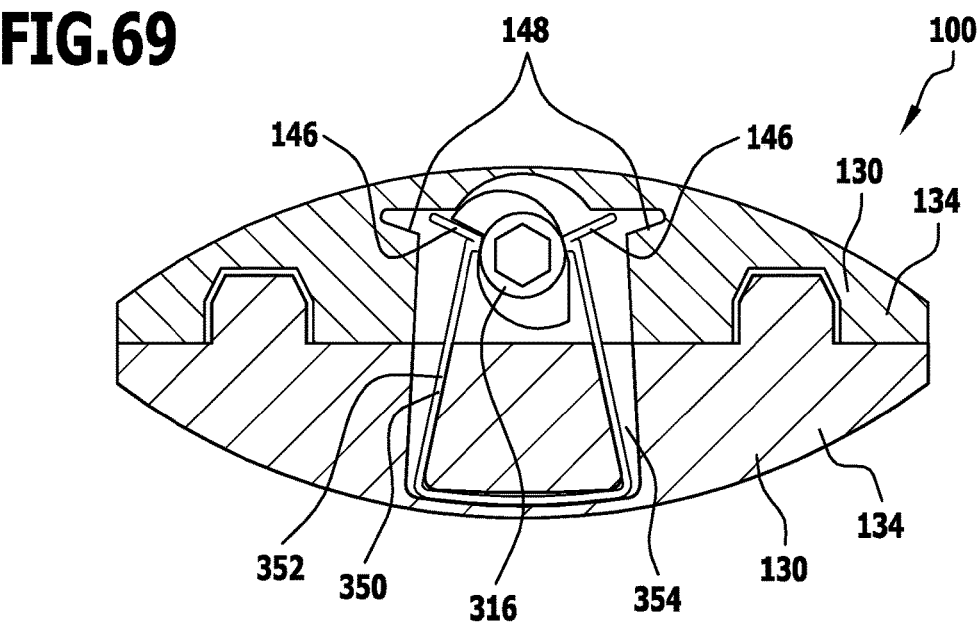
FIG. 69 a schematic illustration corresponding to FIG. 68 of the connecting device depicted in FIG. 68, wherein the connecting elements are placed on one another.
Figure 70:
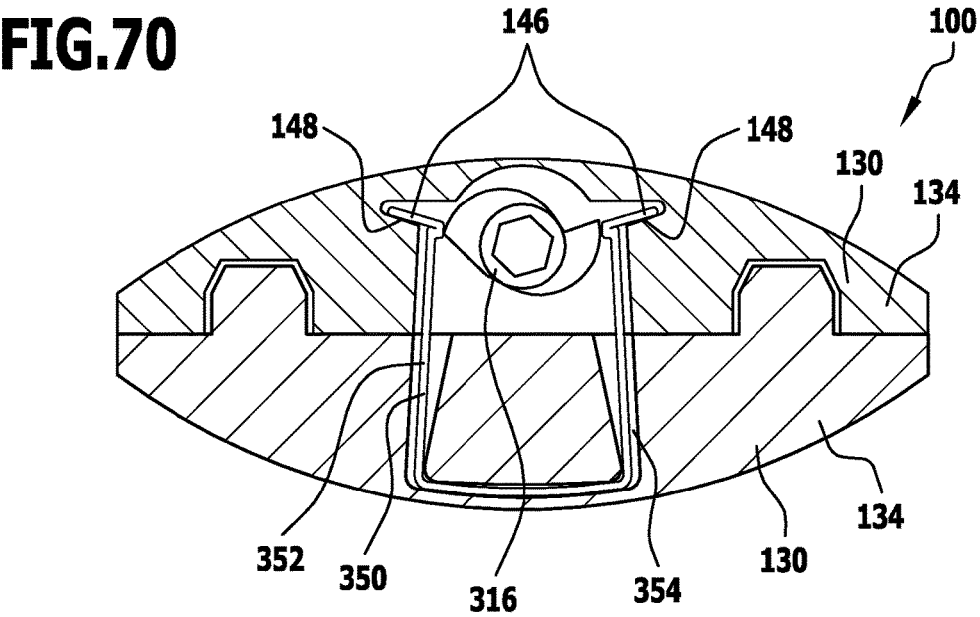
FIG. 70 a schematic illustration corresponding to FIG. 68 of the connecting device depicted in FIG. 68 in the connected state of the connecting elements.
Figure 73:
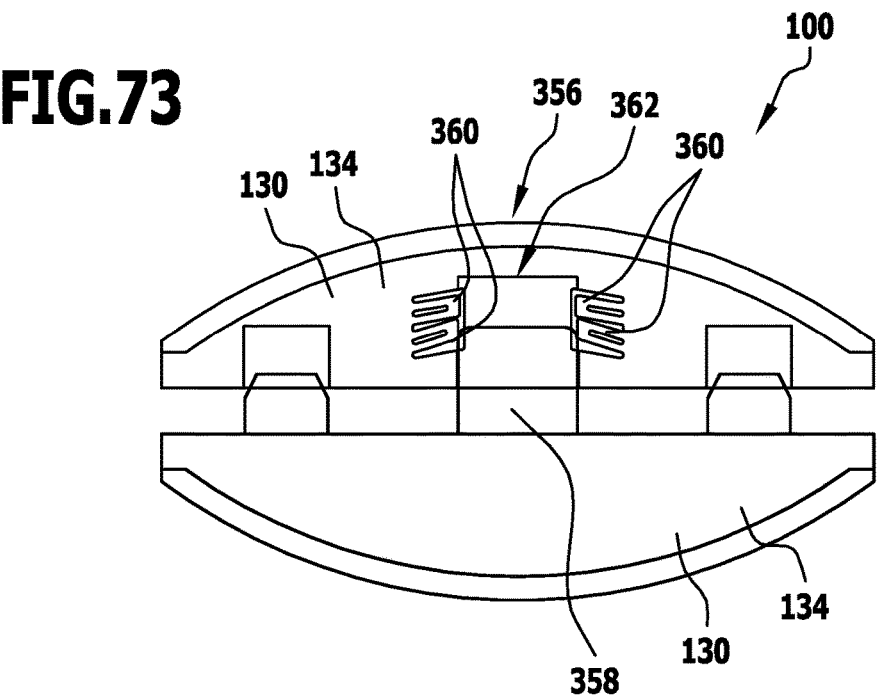
FIG. 73 a schematic illustration corresponding to FIG. 71 of the connecting device depicted in FIG. 71 when pushing-in the clamping projection between the clamping elements.
Figure 74:
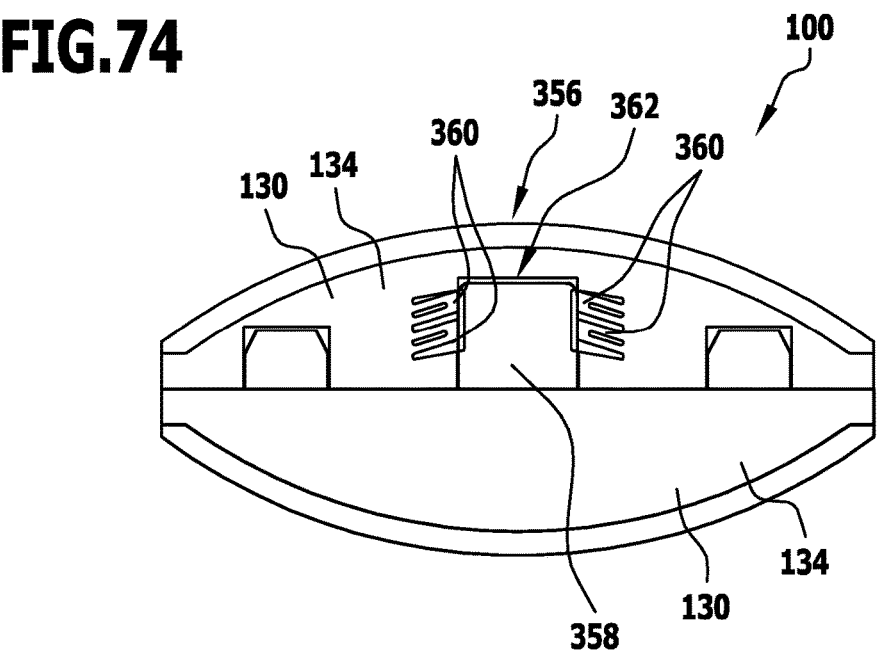
FIG. 74 a schematic illustration corresponding to FIG. 71 of the connecting device depicted in FIG. 71 in the connected state of the connecting elements.

A twenty-third embodiment of a connecting device 100 that is illustrated in FIGS. 68 to 70 differs from the twenty-first embodiment illustrated in FIGS. 61 and 62 substantially in that one or more locking elements 350 are provided in place of the latching elements 340.

In particular, a locking element 350 forms a retaining element 142.

Hereby, the locking element 350 can be in the form of a metallic bent part 352 for example.

As can be perceived from FIG. 68 in particular, the locking element 350 is receivable in a seating 354 of a connecting element 130.

The locking element 350 is preferably an element which is different from the main body 134 of the connecting element 130 and which, in particular, is fixable to the main body 134 in releasable manner.

For example, the locking element 350 comprises two engagement projections 146 which are formed and/or arranged such as to be movable relative to the main body 134 of the connecting element 130.

The further connecting element 130 comprises an actuating element 316 for actuating the locking element 350.

The actuating element 316 is in the form of an eccentric cam element for example.

The actuating element 316 is preferably accessible through a lateral access boring 128 in one of the parts 102, 104 particularly in order to rotate the actuating element 316 by means of a wrench and hence actuate the locking element 350.

As can be perceived from FIGS. 69 and 70 in particular, the locking element 350 can be actuated by means of the actuating element 316, in particular, by moving the engagement projections 146 away from each other by means of the actuating element 316 and thereby introduced into the engagement sections 148 in the connecting element 130 upon which the actuating element 316 is arranged.

Due to the fact that the locking element 350 and the actuating element 316 are arranged on mutually differing connecting elements 130, the lever arm ratios for actuating the locking element 350 can be optimized. The mechanical loading of the connecting device 100 during the process of locking it can thereby be reduced, whilst the stability and reliability of the connection is preferably retained or even improved.

In all other respects, the twenty-third embodiment of a connecting device 100 that is illustrated in FIGS. 68 to 70 coincides in regard to the construction and functioning thereof with the twenty-first embodiment illustrated in FIGS. 61 and 62 so that, to that extent, reference is made to the preceding description thereof.

A twenty-fourth embodiment of a connecting device 100 that is illustrated in FIGS. 71 to 74 differs from the twenty-first embodiment illustrated in FIGS. 61 and 62 substantially in that a clamping device 356 is provided in place of the latching elements 340.

The clamping device 356 comprises one or more clamping projections 358 and one or more clamping elements 360.

A clamping projection 358 is arranged on one of the connecting elements 130 that are insertable into a groove 110 for example.

The clamping elements 360, four clamping elements 360 for example, are arranged on the further connecting element 130.

In particular, the clamping elements 360 are arranged on mutually opposite sides of a clamping seating 362.

The clamping projection 358 is substantially parallelepipedal.

The clamping elements 360 are preferably provided with a material having a high coefficient of friction at the ends thereof coming into contact with the clamping projection 358 or are formed from a material having a high coefficient of friction.

The clamping elements 360 are preferably formed in yielding, resilient and/or spring-like manner and/or are arranged on the main body 134 of the connecting element 130.

The clamping elements 360 preferably project into the clamping seating 362 at an angle to the bearing surface 152.

In addition, the clamping elements 360 are preferably directed away from the bearing surface 152.

The clamping elements 360 can easily be moved to the side when pushing the clamping projection 358 into the clamping seating 362. The clamping projection 358 can thus be inserted into the clamping seating 362 without substantial resistance (see FIGS. 73 and 74).

The connection between the connecting elements 130 and thus the connection between two parts 102, 104 can thus be established in a simple manner.

The clamping projection 358 has to be withdrawn from the clamping seating 362 in order to release the connection.

Due to the shape and design of the clamping elements 360 here however, there is a greater resistance due, in particular, to the fact that the clamping elements 360 are moved onto the clamping projection 358 by the inclined arrangement and alignment and as a result the clamping force is reinforced still more.

It follows therefore that the clamping device 356 is a self-locking clamping device 356.

The clamping elements 360 can be formed by thrust collars for example.

In particular, the clamping projection 358 is a substantially parallelepipedal spigot.

In all other respects, the twenty-fourth embodiment of the connecting device 100 that is illustrated in FIGS. 71 to 74 coincides in regard to the construction and functioning thereof with the twenty-first embodiment illustrated in FIGS. 61 and 62 so that, to that extent, reference is made to the preceding description thereof.

Figure 75:
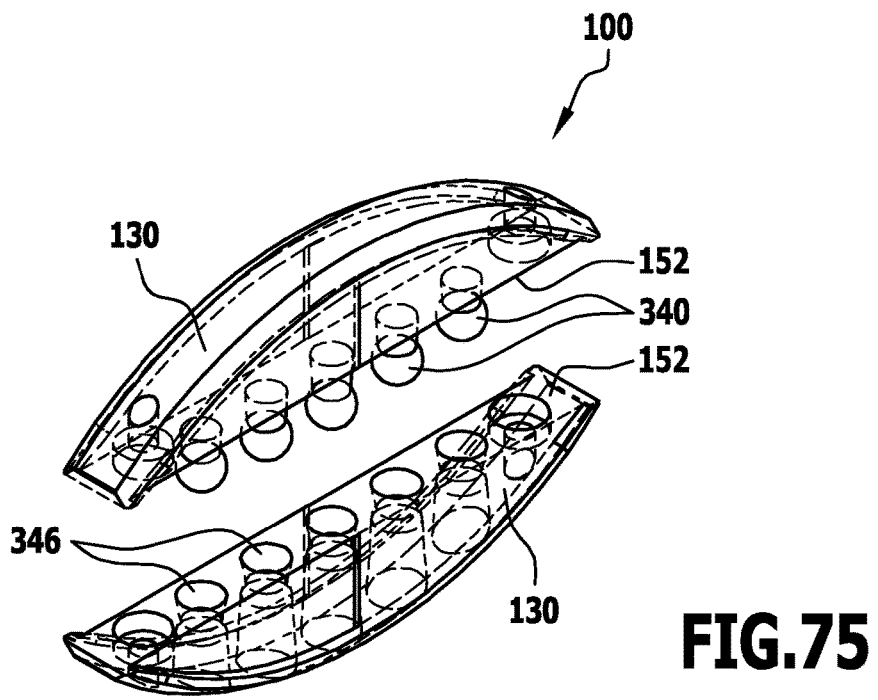
FIG. 75 a schematic perspective transparent illustration of a twenty-fifth embodiment of a connecting device in which spherical latching elements are provided.

A twenty-fifth embodiment of a connecting device 100 that is illustrated in FIG. 75 differs from the twenty-first embodiment illustrated in FIGS. 61 and 62 substantially in that the latching elements 340 and the seatings 346 for the latching elements 340 are substantially spherical.

Hereby, the latching elements 340 and/or the seatings 346 for the latching elements 340 are preferably resilient and/or yielding.

For example, provision may be made for the spherical latching elements 340 to be deformable in order to enable them to be inserted into the likewise spherical seatings 346.

In the twenty-fifth embodiment of the connecting device 100 that is illustrated in FIG. 75, the latching elements 340 and the seatings 346 are provided on mutually differing connecting elements 130.

Hereby, the spherical latching elements 340 are arranged at different spacings from the bearing surface 152. Optimal latching of the parts 102, 104 to one another can thereby be achieved.

In particular in the case where the seatings 346 for the latching elements 340 are always arranged at the same spacing from the bearing surface 152 of the connecting element 130 concerned, provision may be made for the spherical latching elements 340 to be introduced successively into the seatings 346 and latched thereto.

Preferably, latching of the connecting device 100 in different positions and in particular, at different spacings from the bearing surfaces 152 of the connecting elements 130 can thereby be realized.

In all other respects, the twenty-fifth embodiment of a connecting device 100 that is illustrated in FIG. 75 coincides in regard to the construction and functioning thereof with the twenty-first embodiment illustrated in FIGS. 61 and 62 so that, to that extent, reference is made to the preceding description thereof.

Figure 76:
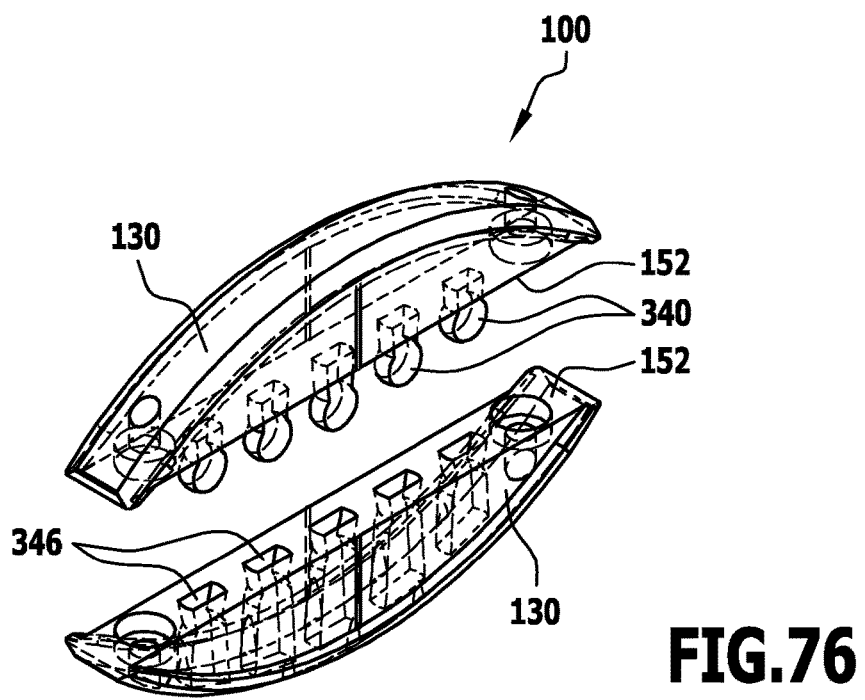
FIG. 76 a schematic perspective transparent illustration of a twenty-sixth embodiment of a connecting device in which latching elements in the form of a circular cylinder are provided.
Figure 77:
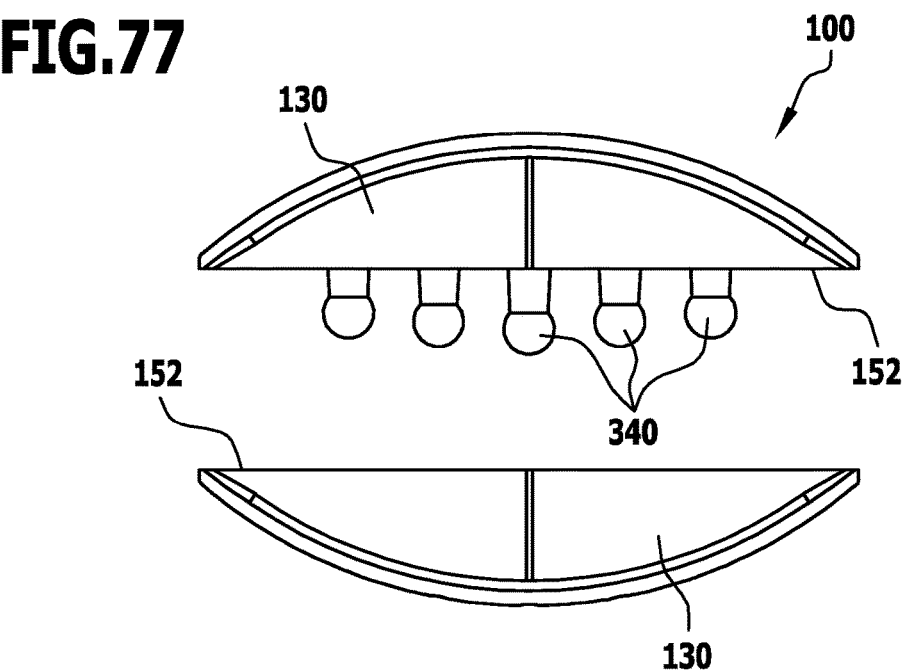
FIG. 77 a schematic side view of the connecting device depicted in FIG. 76.
Figure 78:
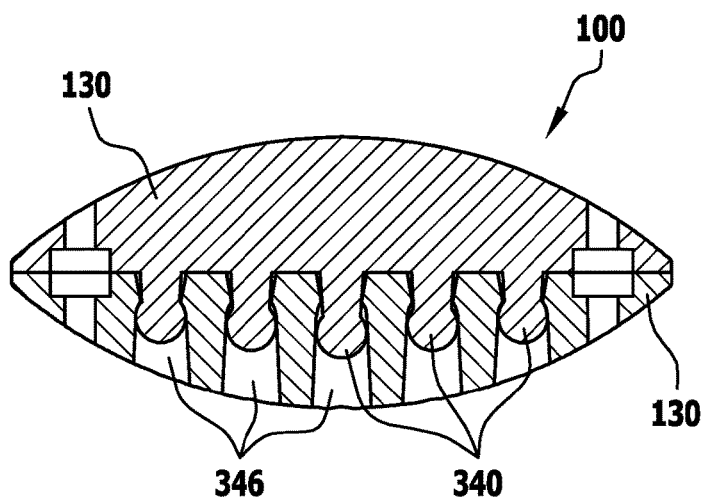
FIG. 78 a schematic longitudinal section through the connecting device depicted in FIG. 76 in the connected state of the connecting elements.

A twenty-sixth embodiment of a connecting device 100 that is illustrated in FIGS. 76 to 78 differs from the twenty-fifth embodiment illustrated in FIG. 75 substantially in that the latching elements 340 are substantially in the form of a section of a circular cylinder and are introducible into seatings 346 corresponding thereto that are substantially in the form of a section of a circular cylinder.

In all other respects, the twenty-sixth embodiment of a connecting device 100 that is illustrated in FIGS. 76 to 78 coincides in regard to the construction and functioning thereof with the twenty-fifth embodiment illustrated in FIG. 75 so that, to that extent, reference is made to the preceding description thereof.

Figure 79:
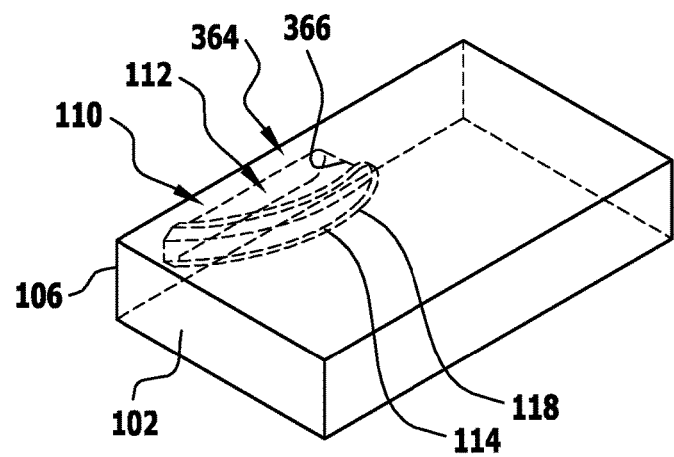
FIG. 79 a schematic perspective partially transparent illustration of a part which is provided with a partial groove.
Figure 80:
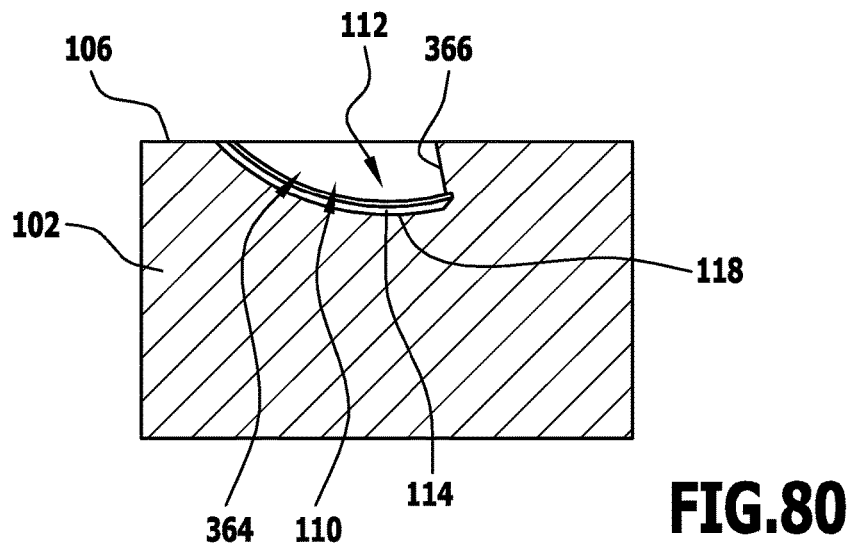
FIG. 80 a schematic longitudinal section through the part depicted in FIG. 79.

An alternative design of a groove 110 is illustrated in FIGS. 79 and 80.

This groove 110 is in the form of a partial groove 364.

The bottom surface of the groove 118 in this partial groove 364 actually extends in the form of an arc of a circle from the contact surface 106 of the part 102 into the part 102. However, the bottom surface of the groove 118 does not end again at the contact surface 106, but rather, within the part 102 or else at a side surface 310 of the part 102 (not illustrated in the drawings).

In the case of the embodiment of a groove 110 that is illustrated in FIGS. 79 and 80, the bottom surface 118 of the groove ends at a stop surface 366 of the groove 110.

In particular, the stop surface 366 runs transversely to the contact surface 106.

The stop surface 366 preferably bounds the base section 112 and the undercut sections 114.

By suitably shortening the construction of the connecting elements 130, preferably all of the connecting elements 130 that are arrangeable in a groove 110 in accordance with FIGS. 1 to 4 are also arrangeable in a partial groove 364 in accordance with FIGS. 79 and 80.

The partial groove 364 is producible by means of a (not illustrated) end-milling cutter for example.

Figure 81:
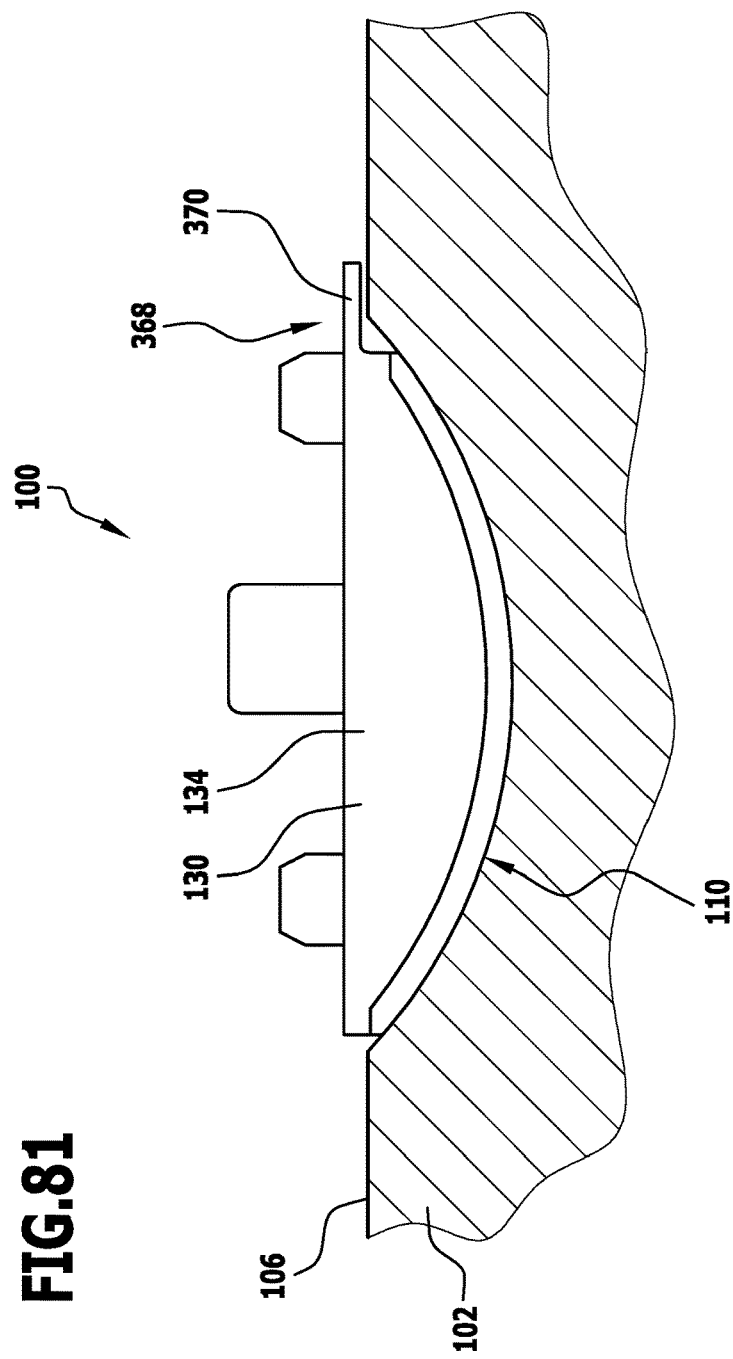
FIG. 81 a schematic longitudinal section through a twenty-seventh embodiment of a connecting device in which a securing element of a securing device in the form of a bearing element is provided.
Figure 82:
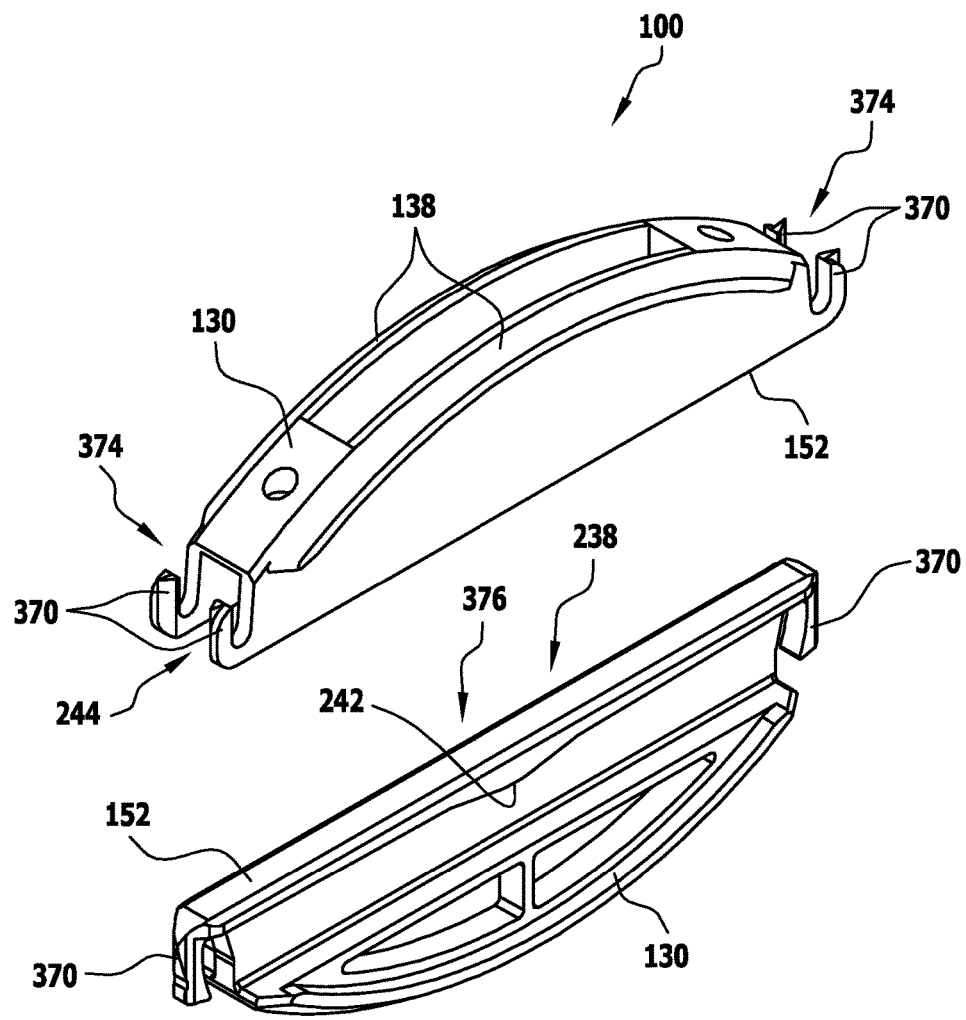
FIG. 82 a schematic perspective illustration of a twenty-eighth embodiment of a connecting device in which two connecting elements that are insertable into grooves and are fixable relative to each other by means of a camming guide are provided.
Figure 85:
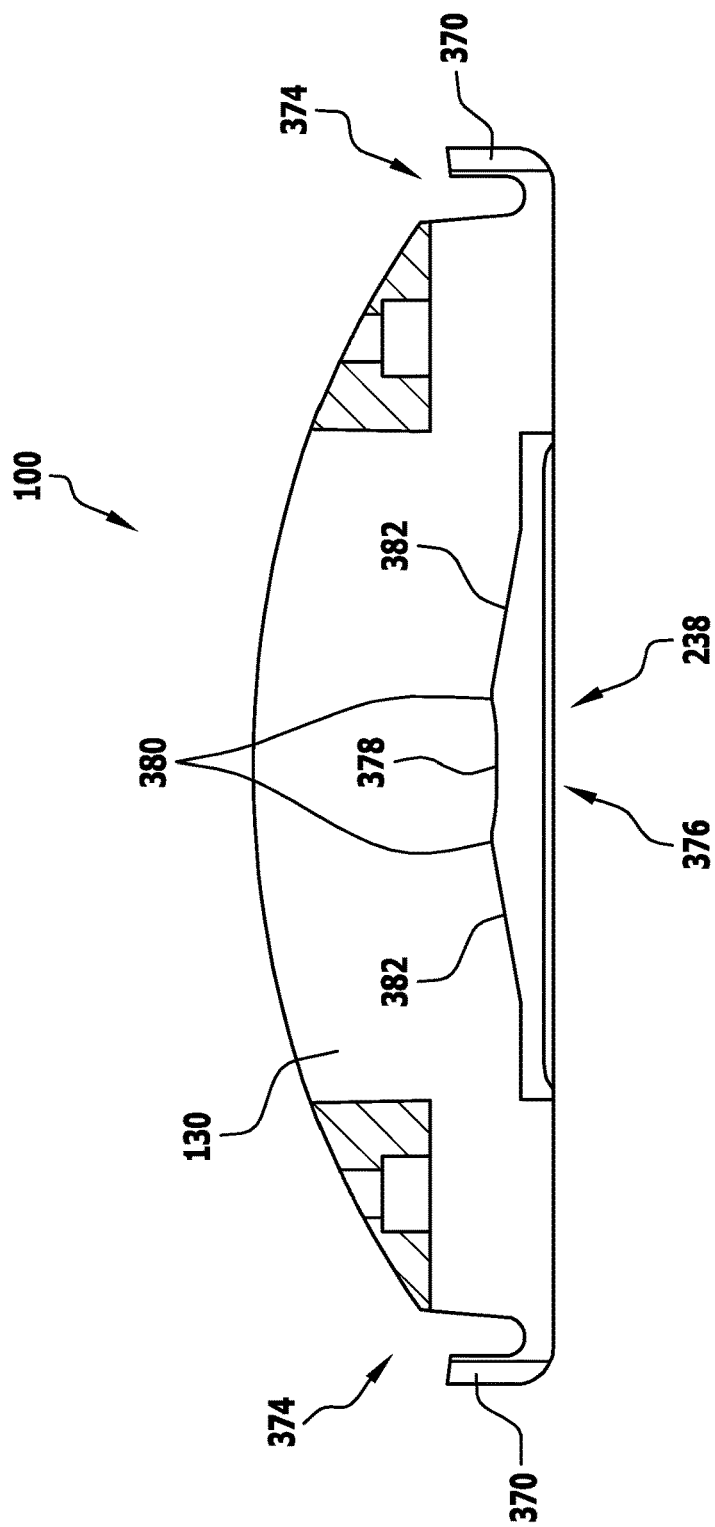
FIG. 85 a schematic longitudinal section through a connecting element of the connecting device depicted in FIG. 82 which comprises a camming guide.
Figure 88:
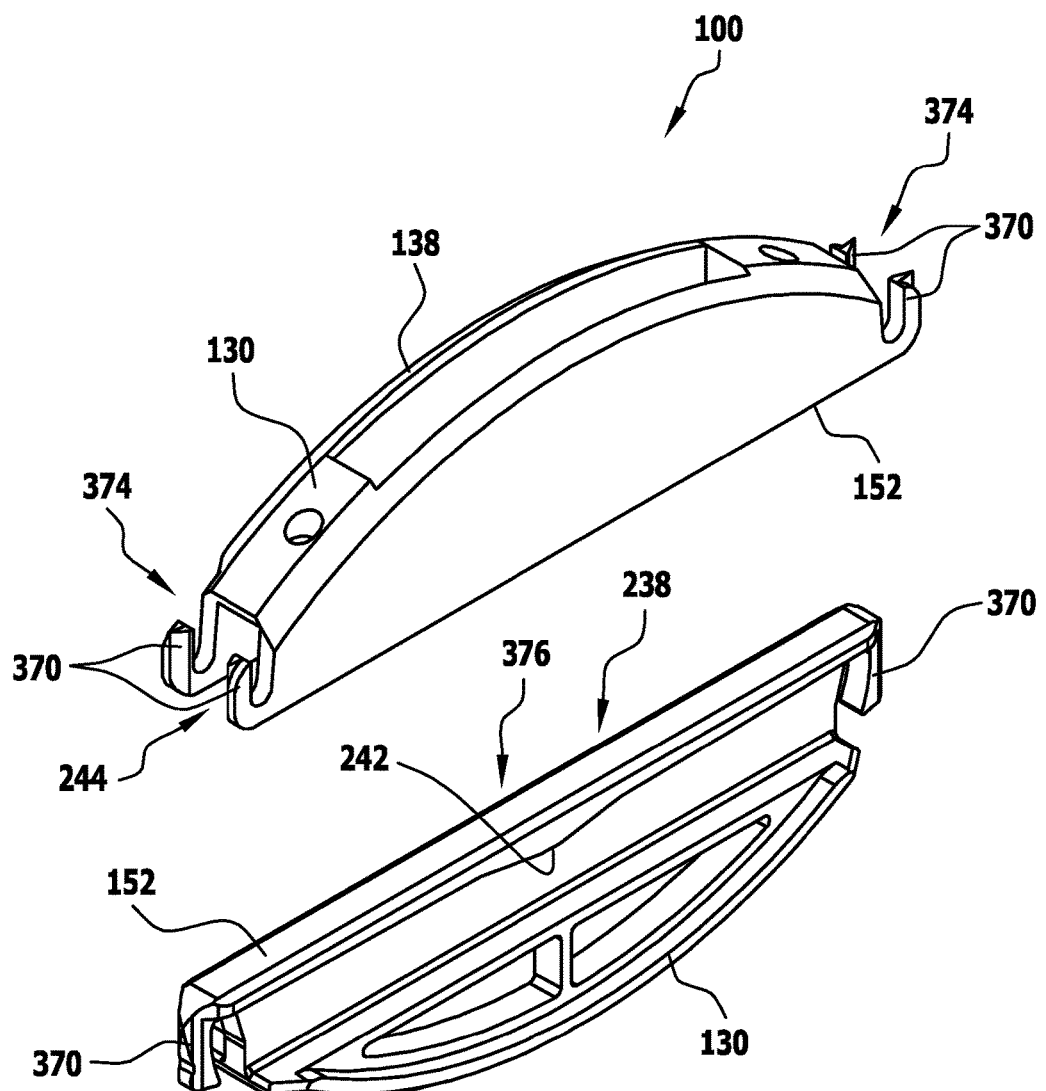
FIG. 88 a schematic perspective illustration corresponding to FIG. 82 of a twenty-ninth embodiment of a connecting device in which a connecting element that is provided with only one retaining projection is provided.
Figure 93:
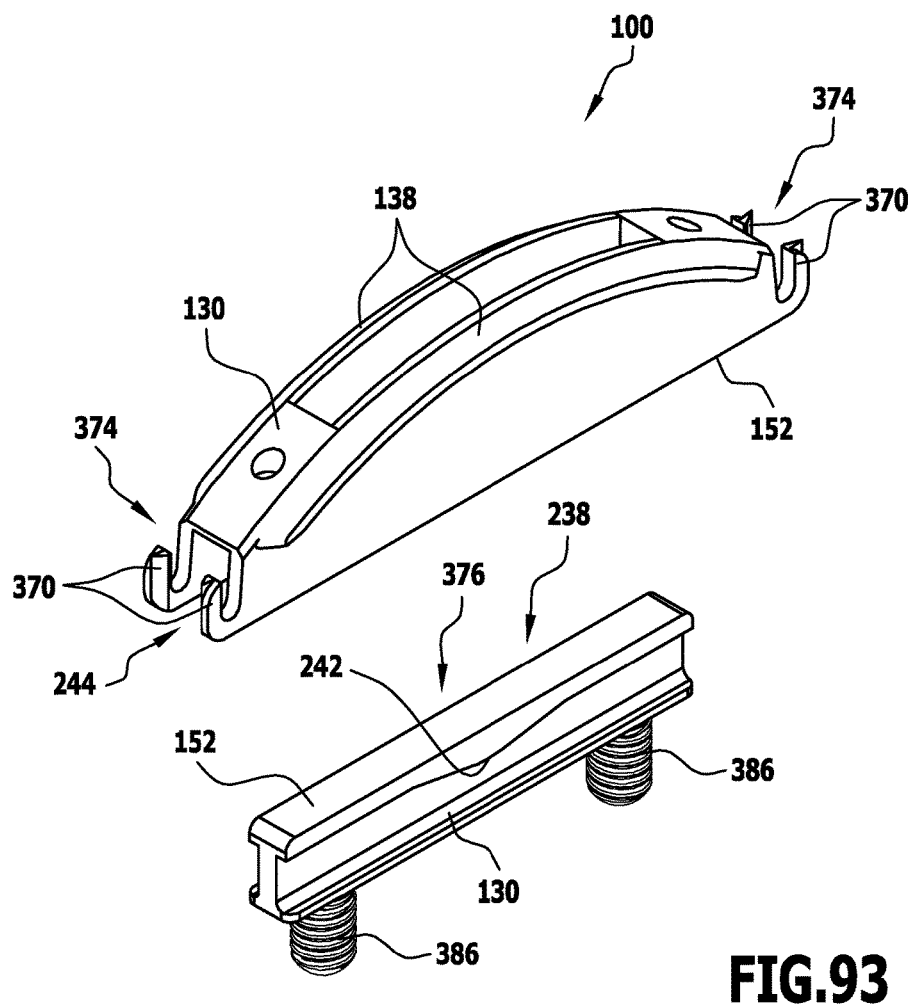
FIG. 93 a schematic perspective illustration corresponding to FIG. 82 of a thirtieth embodiment of a connecting device in which a connecting element that is insertible into a part is provided.
Figure 97:
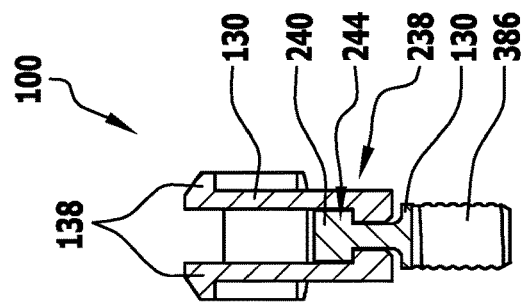
FIG. 97 a schematic cross section through the connecting device depicted in FIG. 93 along the line 97-97 in FIG. 96.
Figure 96:
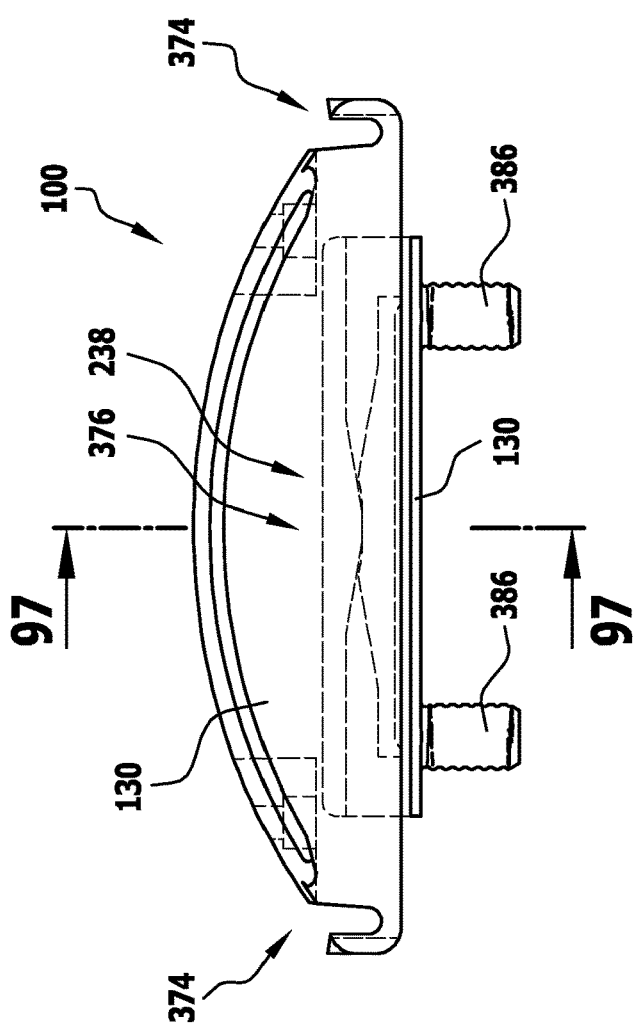
FIG. 96 an illustration corresponding to FIG. 86 of the connecting device depicted in FIG. 93.

A twenty-seventh embodiment of a connecting device 100 that is illustrated in FIG. 81 differs from the twenty-fourth embodiment illustrated in FIGS. 71 to 74 substantially in that the connecting device 100 comprises a securing device 368.

The connecting element 130 is preferably securable from unwanted displacement thereof within and/or along the groove 110 by means of the securing device 368.

In particular, the securing device 368 comprises a securing element 370 in the form of a securing projection which, in the installed state of the connecting element 130, comes into abutment, in particular, on a contact surface 106, 108 of a part 102, 104 and thereby secures the connecting element 130 against unwanted displacement within and/or along the groove 110.

In particular, the securing element 370 can be clamped between the parts 102, 104, between the contact surfaces 106, 108 of the parts 102, 104 for example, in order to secure the connecting element 130.

In all other respects, the twenty-seventh embodiment of a connecting device 100 that is illustrated in FIG. 81 coincides in regard to the construction and functioning thereof with the twenty-fourth embodiment illustrated in FIGS. 71 to 74 so that, to that extent, reference is made to the preceding description thereof.

A twenty-eighth embodiment of a connecting device 100 that is illustrated in FIGS. 82 to 87 differs from the twenty-seventh embodiment illustrated in FIG. 81 in particular in that the securing device 368 comprises two pairs of securing elements 370 which are arranged at mutually opposite end regions 374 of the respective connecting element 130 taken with respect to a direction of insertion 372 of the connecting elements 130.

In particular hereby, the securing elements 370 are securing elements 370 that are in the form of and/or are arranged in resilient, yielding and/or spring-like manner.

The securing elements 370 are preferably moved automatically into a release position when inserting the connecting elements 130 into the grooves 110.

As soon as the connecting elements 130 are arranged in the given position in the groove 110 and in particular as soon as the bearing surface 152 of the connecting element 130 is oriented in parallel with and in particular is flush with the contact surface 106, 108 of the part 102, 104, the securing elements 370 preferably automatically reach a retaining position in which further displacement of the connecting element 130 within and/or along the groove 110 is effectively prevented.

The securing elements 370 are then supported, in particular, on the contact surface 106, 108 of at least one of the parts 102, 104.

In the case of the twenty-eighth embodiment of the connecting device 100 that is illustrated in FIGS. 82 to 87, the actual connection of the two connecting elements 130 and the parts 102, 104 to one another is effected by a guidance device 238.

The guidance device 238 comprises a guidance element 240 which is arranged on a connecting element 130 and comprises one or more guidance projections 242.

In particular, the guidance element 240 is introducible into a guidance groove 244 of the further connecting element 130.

This guidance groove 244 comprises a guidance section 250 which is inter-engageable by the guidance element 240 by means of the guidance projections 242.

In particular, the guidance device 238 comprises a camming guide 376 which is formed by the guidance groove 244.

The camming guide 376 serves, in particular, for guiding the guidance element 240 along a given guide path.

This guide path has varying spacings along the guidance groove 244 from the contact surfaces 106, 108 of the parts 102, 104 and/or from the bearing surfaces 152 of the connecting elements 130.

In particular, the camming guide 376 provides a local minimum region 378 which is surrounded by two local or global maximum regions 380.

The maximum regions 380 are surrounded by run out regions 382 on the side thereof remote from the minimum region 378.

For the purposes of connecting the connecting elements 130 as well as the parts 102, 104 to one another, the connecting elements 130 are firstly arranged on the parts 102, 104.

In a next step, the parts 102, 104 together with the connecting elements 130 arranged thereon are displaced relative to one another so that the guidance element 240 of the one connecting element 130 enters into the guidance groove 244 of the further connecting element 130.

In particular thereby, the parts 102, 104 and the connecting elements 130 are displaced in parallel with the contact surfaces 106, 108 of the parts 102, 104.

Hereby, the guidance projection 242 firstly comes into engagement with a run out region 382 and is then fed across the maximum region 380 into the minimum region 378.

Due to the further maximum region 380 following this minimum region 378, this minimum region 378 is a stable position for the guidance projection 242 along the guide path formed by means of the camming guide 376.

The connecting elements 130 are thus connected to one another in stable manner when the guidance projection 242 is arranged in the minimum region 378 of the camming guide 376 (see in particular, FIG. 86).

If so required, the guidance projection 242 together with the appertaining connecting element 130 and the appertaining part 102, 104 can also be pushed over the further maximum region 380 as well as out of the further run out region 382.

The connecting elements 130 are thus displaceable entirely past each other if necessary.

As can be perceived from FIGS. 83 and 86 in particular, an indentation 384 in a region remote from the bearing surface 152 can be provided in one or more connecting elements 130.

This indentation 384 is in the form of an arc of a circle for example.

Such an indentation 384 can be advantageous, in particular, when the connecting element 130 is intended to be arranged in a flat part 102, 104 and further guidance elements 240 are provided on the same part 102, 104 in addition to this connecting element 130.

For example, if two grooves 110 for accommodating connecting elements 130 are arranged on mutually opposite sides of a part 102, 104 and the grooves 110 project so far into the part 102, 104 that the grooves 110 intersect within the region of the bottom surfaces of the grooves 118, the indentation 384 can make it possible for two connecting elements 130 to be arranged in the part 102, 104 despite such an intersection.

In all other respects, the twenty-eighth embodiment of a connecting device 100 that is illustrated in FIGS. 82 to 87 coincides in regard to the construction and functioning thereof with the twenty-seventh embodiment illustrated in FIG. 81 so that, to that extent, reference is made to the preceding description thereof.

A twenty-ninth embodiment of a connecting device 100 that is illustrated in FIGS. 88 to 92 differs from the twenty-eighth embodiment illustrated in FIGS. 82 to 87 substantially in that one of the connecting elements 130 and in particular the connecting element 130 comprising the guidance groove 244 is provided with a retaining projection 138 on only one side.

In particular, this connecting element 130 can thus be inserted into a groove 110 which comprises only one undercut section 114 that extends away from the base section 112.

Such a groove 110 can be advantageous when using thin and less sturdy parts 102, 104 for example.

In principle, the reduction of the groove 110 and/or the connecting elements 130 to only one undercut section 114 and/or only one retaining projection 138 can be advantageous in all of the described and conceivable variants of grooves 110 and connecting elements 130.

In all other respects, the twenty-ninth embodiment of a connecting device 100 that is illustrated in FIGS. 88 to 92 coincides in regard to the construction and functioning thereof with the twenty-eighth embodiment illustrated in FIGS. 82 to 87 so that, to that extent, reference is made to the preceding description thereof.

A thirtieth embodiment of a connecting device 100 that is illustrated in FIGS. 93 to 97 differs from the twenty-eighth embodiment illustrated in FIGS. 82 to 87 substantially in that one of the connecting elements 130, the connecting element 130 comprising the guidance element 240 for example, is not envisaged for insertion into a groove 110, but rather it comprises two plug-in sections 386 for plugging the connecting element 130 into mutually corresponding (not illustrated) seatings of a part 102, 104.

The plug-in sections 386 can, for example, be provided with ribbing, lamella and/or other retaining elements in order to connect the connecting element 130 to the corresponding part 102, 104 in a stable manner.

In all other respects, the thirtieth embodiment of a connecting device 100 that is illustrated in FIGS. 93 to 97 coincides in regard to the construction and functioning thereof with the twenty-eighth embodiment illustrated in FIGS. 82 to 87 so that, to that extent, reference is made to the preceding description thereof.

A thirty-first embodiment of a connecting device 100 that is illustrated in FIGS. 98 and 99 differs from the fifteenth embodiment illustrated in FIGS. 47 to 49 substantially in that the connecting elements 130 themselves form hinge elements 272 of the hinge device 274.

Hereby, the connecting elements 130 are formed in such a way that they are receivable in partial grooves 364 (see FIGS. 79 and 80).

In the case of these partial grooves 364 in particular, provision is made for the bottom surfaces of the grooves 118 of the respective partial groove 364 to border on a contact surface 106, 108 at one side and on a side surface 310 of the respective part 102, 104 at the other side.

The connecting elements 130 arranged in the partial grooves 364 are fixable in the partial grooves 364 and thus in the parts 102, 104 by means of screws 162.

The connecting elements 130 and thus too the parts 102, 104 are pivotal about the pivotal axis 284 by means of the hinge device 274.

As is apparent from a comparison of FIGS. 98 and 99 in particular, a pivotal movement of the parts 102, 104 relative to each other through approximately 90° in particular can be effected. The connecting device 100 is thus suitable, in particular, for fixing doors to a carcass of a cabinet.

In particular, the partial grooves 364 in the thirty-first embodiment of a connecting device 100 that is illustrated in FIGS. 98 and 99 are producible by placing the parts 102, 104 directly on one another and then providing a single continuous groove 110 in accordance with FIGS. 1 to 4.

Hereby, the groove 110 is preferably formed in the parts 102, 104 in such a way that this groove 110 extends to substantially a half into the one part 102 and to substantially a half into the other part 104.

The partial grooves 364 are thus preferably half grooves, i.e. a half of a groove 110 in accordance with FIGS. 1 to 4.

In particular, a very stable and highly precise connection of two parts 102, 104 that are to be pivoted relative to each other can be established by means of a connecting device 100 in accordance with the thirty-first embodiment that is illustrated in FIGS. 98 and 99.

In all other respects, the thirty-first embodiment of a connecting device 100 that is illustrated in FIGS. 98 and 99 coincides in regard to the construction and functioning thereof with the fifteenth embodiment illustrated in FIGS. 47 to 49 so that, to that extent, reference is made to the preceding description thereof.

In further (not illustrated) embodiments of a connecting device 100, particular ones or a plurality of the features of the previously described embodiments can be combined with one another as desired.

For example, provision may be made for the connecting elements 130 of the twenty-first embodiment of the connecting device 100 that is illustrated in FIGS. 61 and 62 to be arrangeable in a respective partial groove 364 in the parts 102, 104. In addition for example, magnetic actuation of the locking element 350 of the twenty-third embodiment of a connecting device 100 that is illustrated in FIGS. 68 to 70 is also conceivable.

Preferred embodiments are the following:

1. A connecting device (100) for connecting two parts (102, 104), in particular for connecting furniture or machine parts, and/or for fixing an object to a part (102, 104)

comprising one or more connecting elements (130) which are arranged on at least one of the parts (102, 104) in a connected state and/or anchored state, wherein at least one connecting element (130) comprises one or more non-self-cutting retaining projections (138) each of which has a curved supporting surface (140) that is in the form of an arc of a circle in longitudinal section, wherein the one or the plurality of retaining projections (138) are introducible into a groove (110) having a curved undercut surface (122) which is provided in one of the parts (102, 104) and is in the form of an arc of a circle in longitudinal section, wherein the groove (110) comprises a base section (112) and one or more undercut sections (114) which extend away from the base section (112) in a thickness direction (116) and wherein the one or the plurality of retaining projections (138) engage in the one or the plurality of undercut sections (114) of the groove (110) in the connected state and/or the anchored state.

2. A connecting device (100) in accordance with embodiment 1, characterized in that one or more connecting elements (130) comprise one or more screw elements (132) or are in the form of one or more screw elements (132).

3. A connecting device (100) in accordance with either of the embodiments 1 or 2, characterized in that one or more connecting elements (130) comprise one or more retaining elements (142) which are arranged partially or entirely and/or temporarily or permanently within an outer contour of a main body (134) or housing of the one or the plurality of connecting elements (130).

4. A connecting device (100) in accordance with any of the embodiments 1 to 3, characterized in that one or more connecting elements (130) comprise one or more retaining elements (142) which are arranged partially or entirely and/or temporarily or permanently outside an outer contour of a main body (134) or housing of the one or the plurality of connecting elements (130).

5. A connecting device (100) in accordance with any of the embodiments 1 to 4, characterized in that one or more connecting elements (130) comprise one or more moveable retaining elements (142), in particular, retaining elements (142) which are moveable relative to a main body (134) or housing.

6. A connecting device (100) in accordance with any of the embodiments 1 to 5, characterized in that one or more connecting elements (130) comprise one or more retaining elements (142) which, in the connected state of the parts (102, 104), project beyond a contact surface (106, 108) of a part (102, 104) that is arranged to face the further part (104, 102) and/or upon which the further part (104, 102) abuts.

7. A connecting device (100) in accordance with any of the embodiments 1 to 6, characterized in that one or more connecting elements (130) comprise a securing device (184, 368) by means of which the connecting element (130) or the connecting elements (130) are securable from displacement and/or rotation thereof relative to a part (104, 102).

8. A connecting device (100) in accordance with any of the embodiments 1 to 7, characterized in that one or more connecting elements (130) comprise a securing device (184, 368) by means of which the connecting element (130) or the connecting elements (130) are securable from displacement thereof in and/or along a groove (110) having a curved undercut surface (122) which is in the form of an arc of a circle in longitudinal section.

9. A connecting device (100) in accordance with either of the embodiments 7 or 8, characterized in that the securing device (184, 368) comprises one or more securing elements (370) that are placeable and/or placed on a contact surface (106, 108) of a part (102, 104) which is arranged to face the further part (104, 102) and/or upon which the further part (104, 102) abuts for the purposes of securing one or more connecting elements (130) from displacement and/or rotation thereof.

10. A connecting device (100) in accordance with any of the embodiments 7 to 9, characterized in that the securing device (184, 368) comprises one or more securing elements (370) which are configured to be moveable, resilient, reversibly deformable and/or spring-like.

11. A connecting device (100) in accordance with any of the embodiments 7 to 10, characterized in that the securing device (184, 368) comprises at least two securing elements (370) which are arranged at mutually opposite ends of a connecting element (130).

12. A connecting device (100) in accordance with any of the embodiments 1 to 11, characterized in that one or more connecting elements (130), in particular a main body (134) or a housing of one or more connecting elements (130), comprise one or more through openings (188) for accommodating fastening elements and/or securing elements.

13. A connecting device (100) in accordance with any of the embodiments 1 to 12, characterized in that one or more retaining elements (142) of one or more connecting elements (130) are accessible and/or operable through one or more access openings (128) in one part (102, 104) or in both parts (102, 104).

14. A connecting device (100) in accordance with any of the embodiments 1 to 13, characterized in that one or more retaining elements (142) of one or more connecting elements (130) are accessible and/or operable through one or more solid walls of one part (102, 104) or both parts (102, 104) by means of a magnet device.

15. A connecting device (100) in accordance with any of the embodiments 1 to 14, characterized in that at least one connecting element (130) is positionable or positioned on a contact surface (106, 108) of a part (102, 104), in particular is screwed to a contact surface (106, 108) of a part (102, 104) for the purposes of connecting the parts (102, 104) to one another.

16. A connecting device (100) in accordance with any of the embodiments 1 to 15, characterized in that one or more connecting elements (130) comprise one or more plug-in projections (166) and/or one or more seating pockets (168) for one or more plug-in projections (166).

17. A connecting device (100) in accordance with any of the embodiments 1 to 16, characterized in that the connecting device (100) comprises two or more connecting elements (130) for arrangement on and/or in a first part (102) and/or two or more connecting elements (130) for arrangement on and/or in a second part (104), wherein, for the purposes of connecting the parts (102, 104) to one another, at least one connecting element (130) on and/or in the first part (102) is moveable into engagement with the second part (104), in particular with at least one connecting element (130) on and/or in the second part (104).

18. A connecting device (100) in accordance with any of the embodiments 1 to 17, characterized in that the connecting device (100) comprises two or more connecting elements (130) which are arrangeable on or in one of the parts (102, 104) and are moveable into engagement with one another.

19. A connecting device (100) in accordance with any of the embodiments 1 to 18, characterized in that the connecting device (100) comprises two or more connecting elements (130) which are arrangeable in mutually overlapping grooves (110) in one of the parts (102, 104).

20. A connecting device (100) in accordance with any of the embodiments 1 to 19, characterized in that the connecting device (100) comprises two or more substantially identically shaped connecting elements (130) for arrangement in one of the parts (102, 104) or for arrangement in both parts (102, 104) and for the connection of the parts (102, 104) to one another.

21. A connecting device (100) in accordance with any of the embodiments 1 to 20, characterized in that a connecting element (130) for arrangement on or in a first part (102) and a connecting element (130) for arrangement on or in a second part (104) are provided with through openings (188) in such a manner that they overlap in a connected state of the parts (102, 104), in particular in a retaining position of the connecting elements (130), and in particular are in alignment with one another.

22. A connecting device (100) in accordance with embodiment 21, characterized in that the through openings (188) are accessible in the connected state of the parts (102, 104).

23. A connecting device (100) in accordance with embodiment 22, characterized in that, in the connected state of the parts (102, 104), the through openings (188) are accessible through a side wall which extends transversely and in particular, at least approximately perpendicularly to a contact surface (106, 108) of the parts (102, 104).

24. A connecting device (100) in accordance with any of the embodiments 1 to 23, characterized in that the connecting device (100) comprises a magnet element (190) which is drivable by means of a time varying magnetic drive field that is effective on the magnet element (190) from outside the connecting device (100) into a rotary movement and/or into a linear movement within the connecting device (100).

25. A connecting device (100) in accordance with embodiment 24, characterized in that at least one retaining element (142) is drivable by means of the magnet element (190) into a rotary movement and/or into a linear movement relative to a housing or a main body (134) of a connecting element (130).

26. A connecting device (100) in accordance with either of the embodiments 24 or 25, characterized in that the magnet element (190) is drivable periodically so that at least one retaining element (142) of the connecting device (100) is operable by means of the magnet element (190), in particular is movable into a release position and/or into a retaining position.

27. A connecting device (100) in accordance with any of the embodiments 1 to 26, characterized in that a connecting element (130) comprises a seating (200) for a retaining element (142) of the connecting device (100), wherein the seating (200) is movable relative to a housing or a main body (134) of the connecting element (130), in particular is mounted in displaceable manner.

28. A connecting device (100) in accordance with any of the embodiments 1 to 27, characterized in that one or more connecting elements (130) are arrangeable substantially entirely in a groove (110) of one part (102, 104) so that the connecting element (130) or the connecting elements (130) do not project beyond a contact surface (106, 108) of the part (102, 104).

29. A connecting device (100) for connecting two parts (102, 104), in particular in accordance with any of the embodiments 1 to 28, comprising at least one connecting element (130) which comprises a retaining element (142) for establishing a connection between the two parts (102, 104) and a storage device (218) for storing a retaining energy of the retaining element (142).

30. A connecting device (100) in accordance with embodiment 29, characterized in that retaining energy is suppliable to the storage device (218) before the establishment of a connection between the two parts (102, 104) and in that the supplied retaining energy is storable by means of the storage device (218) until the establishment of the connection.

31. A connecting device (100) in accordance with any of the embodiments 29 or 30, characterized in that the storage device (218) is actuatable when establishing the connection between the two parts (102, 104) and/or for establishing the connection between the two parts (102, 104) so that the retaining element (142) is moveable into a retaining position by utilizing the retaining energy.

32. A connecting device (100) in accordance with any of the embodiments 29 to 31, characterized in that the storage device (218) comprises an arresting device for holding a spring device in a pre-loaded disposition.

33. A connecting device (100) in accordance with any of the embodiments 29 to 32, characterized in that retaining energy is suppliable to the storage device (218) before, whilst and/or after installing the connecting element (130) into the part (102, 104).

34. A connecting device (100) in accordance with any of the embodiments 1 to 33, characterized in that the connecting device (100) comprises two or more connecting elements (130) which form a tongue-and-groove device (224), in particular a self-latching tongue-and-groove device (224) that is operable by a pivotal movement.

35. A connecting device (100) in accordance with any of the embodiments 1 to 34, characterized in that the connecting device (100) comprises one or more connecting elements (130) which are adapted to pass through openings (232) in one part (102, 104) from a side remote from the further part (104, 102) to a further connecting element (130) and which are connectable thereto, in particular screwable thereto.

36. A connecting device (100) in accordance with any of the embodiments 1 to 35, characterized in that the connecting device (100) forms a guidance device (238) for guiding the parts (102, 104) relative to each other, wherein a connecting element (130) comprises a guidance groove (244) and wherein the further connecting element (130) comprises a guidance element (240), wherein the guidance element (240) together with the appertaining part (102, 104) is movable and in particular linearly displaceable along the guidance groove (244) relative to the further part (104, 102).

37. A connecting device (100) in accordance with embodiment 36, characterized in that the guidance groove (244) is substantially linear.

38. A connecting device (100) in accordance with either of the embodiments 36 or 37, characterized in that the guidance groove (244) comprises a guidance section (250) in which the guidance element (240) inter-engages with the guidance groove (244).

39. A connecting device (100) in accordance with any of the embodiments 36 to 38, characterized in that the guidance groove (244) comprises a camming guide (376) for the guidance of the guidance element (240) along a predetermined guide path, wherein the guide path is at varying spacings from a contact surface (106, 108) of the part (102, 104) and/or from a bearing surface (152) of the connecting element (130) along the guidance groove (244).

40. A connecting device (100) in accordance with embodiment 39, characterized in that the guide path has two maximum regions (380) having an at least local, in particular global, maximum spacing from a contact surface (106, 108) of the part (102, 104) and/or from a bearing surface (152) of the connecting element (130).

41. A connecting device (100) in accordance with embodiment 40, characterized in that the guide path comprises a minimum region (378) having a local or global minimum spacing from a contact surface (106, 108) of the part (102, 104) and/or from a bearing surface (152) of the connecting element (130).

42. A connecting device (100) in accordance with either of the embodiments 40 or 41, characterized in that the guide path comprises a minimum region (378) which is arranged between the maximum regions (380) and is at a locally minimum distance from a contact surface (106, 108) of the part (102, 104) and/or from a bearing surface (152) of the connecting element (130), and also comprises run out regions (382) which are arranged such as to border the maximum regions (380) and to be remote from the minimum region (378) and which exhibit a reducing spacing from a contact surface (106, 108) of the part (102, 104) and/or from a bearing surface (152) of the connecting element (130).

43. A connecting device (100) in accordance with any of the embodiments 36 to 42, characterized in that the guidance element (240) and/or the guidance groove (244) comprise bearing elements (246), in particular roller elements (248) for the displaceable mounting of the parts (102, 104) upon one another.

44. A connecting device (100) in accordance with any of the embodiments 1 to 43, characterized in that the connecting device (100) comprises at least one sliding element and/or at least one roller element (248) which slides along a part (102, 104) and/or rolls on a part (102, 104) upon a movement of the parts (102, 104) relative to each other.

45. A connecting device (100) in accordance with any of the embodiments 1 to 44, characterized in that one connecting element (130) is in the form of a running surface (252) of a part (102, 104) along which a movement element (246, 248) of a connecting element (130) of the further part (104, 102) is movable.

46. A connecting device (100) in accordance with any of the embodiments 1 to 45, characterized in that the connecting device (100) comprises a positioning device (254) for positioning two parts (102, 104), in particular two connecting elements (130) relative to each other.

47. A connecting device (100) in accordance with embodiment 46, characterized in that the positioning device (254) comprises at least one moveable, yielding, resilient and/or spring-mounted positioning element (256).

48. A connecting device (100) in accordance with either of the embodiments 46 or 47, characterized in that at least one part (102, 104) and/or at least one connecting element (130) comprises at least one positioning element seating (258) for accommodating the at least one positioning element (256).

49. A connecting device (100) in accordance with any of the embodiments 46 to 48, characterized in that at least one positioning element (256) extends into the at least one positioning element seating (258) in a retaining position in which the parts (102, 104) are positioned relative to each other by means of the positioning device (254).

50. A connecting device (100) in accordance with any of the embodiments 46 to 49, characterized in that the parts (102, 104) are displaceable relative to one another by means of and/or upon actuation of at least one positioning element (256) of the positioning device (254).

51. A connecting device (100) in accordance with any of the embodiments 1 to 50, characterized in that the connecting device (100) comprises a hinge element (272) which is fixed or fixable at one side to a first part (102), in particular to a connecting element (130), which is fixed or fixable to the first part (102), and at the other side to a second part (104), in particular to a connecting element (130) which is fixed or fixable to the second part (104).

52. A connecting device (100) in accordance with any of the embodiments 1 to 51, characterized in that at least one connecting element (130) comprises a displaceable locking bar element (286) which is displaceable relative to a main body (134) of the connecting element (130).

53. A connecting device (100) in accordance with embodiment 52, characterized in that the locking bar element (286) is displaceable magnetically, in particular by magnetic driving of a drive shaft (288) which is coupled to the locking bar element (286).

54. A connecting device (100) in accordance with any of the embodiments 1 to 53, characterized in that the connecting device (100) comprises at least two connecting elements (130) which are arranged or arrangeable on mutually different parts (102, 104) and each of which comprises at least one magnet element (190) and/or at least one magnetizable element, wherein the parts (102, 104) are connectable to one another by magnetic attraction between the at least two magnet elements (190) or between the at least one magnet element (190) and the at least one magnetizable element.

55. A connecting device (100) in accordance with any of the embodiments 1 to 54, characterized in that one connecting element (130) comprises an angle-driven screw device (318).

56. A connecting device (100) in accordance with any of the embodiments 1 to 55, characterized in that the connecting device (100) comprises a moveable retaining element (142) which is movable by the application of force into a release position in a transverse direction (326) running transversely, in particular perpendicularly to a direction of connection (170).

57. A connecting device (100) in accordance with embodiment 56, characterized in that the retaining element (142) is in the form of a latch hook (320).

58. A connecting device (100) in accordance with any of the embodiments 1 to 57, characterized in that at least one connecting element (130) is introducible into a groove (110) which is provided in one of the parts (102, 104) and which has a curved undercut surface (122) that is in the form of an arc of a circle in longitudinal section, and in that the at least one connecting element (130) comprises an embracing section (334) which embraces the part (102, 104) at a side face of the part (102, 104) running transversely, in particular substantially perpendicularly to a contact surface (106, 108).

59. A connecting device (100) in accordance with any of the embodiments 1 to 58, characterized in that one or more connecting elements (130) each comprise a plurality of spring elements (338) and/or a plurality of latching elements (340) of different lengths.

60. A connecting device (100) in accordance with any of the embodiments 1 to 59, characterized in that the connecting device (100) comprises two connecting elements (130) each of which comprises one or more spring elements (338) and/or latching elements (340) and/or one or more spring element seatings (346) and/or latching element seatings (346).

61. A connecting device (100) in accordance with either of the embodiments 59 or 60, characterized in that mutually adjacent spring elements (338) and/or latching elements (340) comprise spring noses (342) and/or latch noses (344) which project away from the spring elements (338) and/or latching elements (340) in mutually different directions, in particular in mutually opposite directions.

62. A connecting device (100) in accordance with any of the embodiments 1 to 61, characterized in that the connecting device (100) comprises at least one connecting element (130) which comprises one or more rows (348) of spring elements (338) and/or latching elements (340).

63. A connecting device (100) in accordance with embodiment 62, characterized in that the spring elements (338) and/or latching elements (340) of at least one row (348) of spring elements (338) and/or latching elements (340) comprise spring noses (342) and/or latch noses (344) which are arranged along a path in the form of an arc of a circle.

64. A connecting device (100) in accordance with any of the embodiments 1 to 63, characterized in that the connecting device (100), in particular one or more connecting elements (130), comprises a self-locking spring device and/or clamping device (356).

65. A connecting device (100) in accordance with embodiment 64, characterized in that the self-locking spring device and/or clamping device (356) comprises one or more clamping elements (360) which are oriented at an inclination to the direction of connection (170) and/or which, commencing from a main body (134) of the connecting element (130), are directed away from a bearing surface (152) of the connecting element (130).

66. A connecting device (100) in accordance with either of the embodiments 64 or 65, characterized in that the one clamping element (360) or the plurality of clamping elements (360) are yielding, resilient and/or spring-like and/or are arranged in yielding, resilient and/or spring-like manner on a main body (134) or a housing of a connecting element (130).

67. A connecting device (100) in accordance with any of the embodiments 1 to 66, characterized in that the connecting device (100) comprises at least one locking element (350) and at least one actuating element (316) for actuating the at least one locking element (350), wherein the at least one locking element (350) and the at least one actuating element (316) are arranged on mutually differing parts (102, 104) and/or connecting elements (130).

68. A connecting device (100) in accordance with embodiment 67, characterized in that the at least one actuating element (316) comprises an eccentric cam element.

69. A connecting device (100) in accordance with either of the embodiments 67 or 68, characterized in that the at least one actuating element (316) is accessible from a side of the connecting element (130).

70. A connecting device (100) in accordance with any of the embodiments 1 to 69, characterized in that at least one connecting element (130) comprises one or more latching elements (340) and/or clamping elements (360) having a cross section that is substantially circular or in the form of a section of a circle taken parallel to the direction of connection (170).

71. A connecting device (100) in accordance with embodiment 70, characterized in that the latching elements (340) and/or the clamping elements (360) are at mutually differing spacings from a bearing surface (152) of the connecting element (130) and/or from a contact surface (106, 108) of a part (102, 104).

72. A connecting device (100) in accordance with any of the embodiments 1 to 71, characterized in that the connecting device (100) comprises at least one connecting element (130) which is introducible into a groove (110) in a part (102, 104) that has a curved supporting surface (140) in the form of an arc of a circle in longitudinal section, wherein the supporting surface (140) borders a contact surface (106, 108) of the part (102, 104) at only one side.

73. Method for connecting two parts (102, 104), in particular furniture or machine parts, comprising the following:
- providing a connecting device (100), in particular, a connecting device (100) in accordance with any of the embodiments 1 to 72;
- introducing a connecting element (130) into one of the parts (102, 104);
- connecting the connecting element (130) to the further part (104, 102), in particular to a further connecting element (130) that is arranged on or in the further part (104, 102).

REFERENCE SYMBOL LIST 100 connecting device
102 part
104 part
106 contact surface
108 contact surface
110 groove
112 base section
114 undercut section
116 thickness direction
118 bottom surface of the groove
120 bottom surface
122 undercut surface
124 boundary surface
126 boundary wall
128 access boring
129 major face
130 connecting element
132 screw element
134 main body
136 base part
138 retaining projection
140 supporting surface
142 retaining element
144 rotational axis
146 engagement projection
148 engagement section
150 stop
152 bearing surface
154 through opening
156 recess
158 seating opening
160 wrench seating
162 screw
164 engagement channel
166 plug-in projection
168 seating pocket
170 connecting direction
172 parallelepipedal section
174 suspension element
176 suspension element seating
178 inclined surface
180 securing projection
182 securing recess
184 securing device
186 end region
188 through opening
190 magnet element
192 seating (for magnet element)
194 slot-like guide
196 locking surface
198 unlocking surface
200 seating (for retaining element)
202 spring element
204 cover element
206 interior space
208 projection
210 recess
212 ridge
214 flute
216 spring element
218 storage device
220 storage element
222 blocking element
224 tongue-and-groove device
226 groove part
228 tongue part
230 screw seating
232 through opening
234 side
236 screw head
238 guidance device
240 guidance element
242 guidance projection
244 guidance groove
246 bearing element
248 roller element
250 guidance section
252 running surface
254 positioning device
256 positioning element
258 positioning element seating
260 steel ball
262 through opening
264 spring element
266 closure element
268 set-screw
270 retaining projection
272 hinge element
274 hinge device
276 section (of the hinge element)
278 elongate hole
280 recess
282 latch
284 pivotal axis
286 locking bar element
288 drive shaft
292 opening (in the locking bar element)
294 toothed rack section
296 rack-and-pinion device
298 pinion
300 rotational axis
302 locking direction
304 locking bar element seating
306 shaft seating
308 recess
310 side surface
312 end face
314 cover element
316 actuating element
318 screw device
320 latch hook
322 latch seating
324 inclined surface
326 transverse direction
328 base construction
330 part
332 projection
334 embracing section
336 recess 338 spring element
340 latching element
342 spring nose
344 latch nose
346 seating
348 row
350 locking element
352 metallic bent part
354 seating (for locking element)
356 clamping device
358 clamping projection
360 clamping element
362 clamping seating
364 partial groove
366 stop surface
368 securing device
370 securing element
372 direction of insertion
374 end region
376 camming guide
378 minimum region
380 maximum region
382 run out region
384 indentation
386 plug-in section
A spacing
$A_1$ spacing
$A_2$ spacing
g the direction of the force of gravity
h height
b width
T groove depth
B groove width

The invention claimed is:

1. A connecting device for connecting a first part and a second part, in particular for connecting furniture or machine parts, and/or for fixing an object to a part, the connecting device comprising:
  a first connecting element which is configured to be arrangeable on the first part in a connected state and/or an anchored state, and
  a second connecting element which is configured to be arrangeable on the second part in a connected state and/or an anchored state,
  wherein the first connecting element comprises one or more non-self-cutting retaining projections each of which has a curved supporting surface that is in the form of an arc of a circle in longitudinal section,
  wherein the one or the plurality of retaining projections are configured to be insertable into a groove provided in the first part and which has a curved undercut surface that is in the form of an arc of a circle in longitudinal section, and wherein the groove comprises a base section and one or more undercut sections which extend away from the base section in a thickness direction,
  wherein the one or the plurality of retaining projections are configured to engage in the one or the plurality of undercut sections of the groove in the connected state and/or the anchored state,
  wherein the second connecting element is configured to be connectable to the second part by means of a screw connection,
  and wherein the first connecting element comprises one or more moveable retaining elements by means of which the first connecting element and the second connecting element are configured to draw the first part and the second part towards one another and/or press the first part and the second part against each other.

2. The connecting device in accordance with claim 1, wherein the one or more retaining elements arranged partially or entirely and/or temporarily or permanently within an outer contour of a main body or housing of the first connecting element.

3. The connecting device in accordance with claim 1, wherein the one or more retaining elements are arranged partially or entirely and/or temporarily or permanently outside an outer contour of a main body or housing of the first connecting element.

4. The connecting device in accordance with claim 1, wherein the one or more retaining elements are moveable relative to a main body or a housing of the first connecting element.

5. The connecting device in accordance with claim 1, wherein the one or more retaining elements, in the connected state of the parts, project beyond a contact surface of the first part that is arranged to face the second part.

6. The connecting device in accordance with claim 1, wherein the one or more retaining elements are accessible and/or operable through one or more access openings in at least one of the first part and the second part.

7. The connecting device in accordance with claim 1, wherein the one or more retaining elements are accessible and/or operable through one or more solid walls of at least one of the first part and the second part by means of a magnet device.

8. The connecting device in accordance with claim 1, wherein the second connecting element is configured to be screwable to a contact surface of the second part.

9. The connecting device in accordance with claim 1, wherein the first connecting element comprises a seating for the one or more retaining elements, wherein the seating is movable relative to a housing or a main body of the first connecting element.

10. A connecting device in accordance with claim 1, wherein the first connecting element is arrangeable substantially entirely in the groove of the first part so that the first connecting element does not project beyond a contact surface of the first part.

11. The connecting device in accordance with claim 1, wherein the second connecting element comprises an angle-driven screw device.

12. The connecting device in accordance with claim 1, wherein at least one of the one or more moveable retaining element is in the form of a screw element which is operable by means of a drive screw that is operable through a lateral access point.

13. The connecting device in accordance with claim 1, wherein the connecting device comprises at least one locking element and at least one actuating element for actuating the at least one locking element, wherein the at least one actuating element comprises an eccentric cam element.

14. A method for connecting two parts, in particular furniture or machine parts, comprising the following:
  providing a connecting device, in particular a connecting device in accordance with claim 1;
  introducing the first connecting element into the first part;
  connecting the first connecting element to the second connecting element which is arranged on or in the second part.

* * * * *